US011496949B2

(12) United States Patent
Ng et al.

(10) Patent No.: US 11,496,949 B2
(45) Date of Patent: Nov. 8, 2022

(54) METHODS AND APPARATUS FOR DISCOVERY SIGNALS FOR LTE ADVANCED

(71) Applicant: Samsung Electronics Co., Ltd, Suwon-si (KR)

(72) Inventors: Boon Loong Ng, Dallas, TX (US); Thomas Novlan, Dallas, TX (US); Aris Papasakellariou, Houston, TX (US); Young-Han Nam, Plano, TX (US); Gerardus Johannes Petrus van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/105,816

(22) Filed: Aug. 20, 2018

(65) Prior Publication Data
US 2019/0007897 A1    Jan. 3, 2019

Related U.S. Application Data

(63) Continuation of application No. 14/500,192, filed on Sep. 29, 2014, now Pat. No. 10,057,839.
(Continued)

(51) Int. Cl.
*H04L 5/00*      (2006.01)
*H04W 48/16*    (2009.01)
(Continued)

(52) U.S. Cl.
CPC ......... *H04W 48/16* (2013.01); *H04J 11/0069* (2013.01); *H04L 27/2692* (2013.01);
(Continued)

(58) Field of Classification Search
CPC . H04L 5/0053; H04L 5/0048; H04L 27/2655; H04L 27/2692; H04W 48/16; H04J 11/0069
See application file for complete search history.

(56) References Cited

U.S. PATENT DOCUMENTS

2011/0235743 A1*   9/2011  Lee ................. H04L 5/0048
                                                          375/295
2012/0134273 A1    5/2012  Bhattad et al.
(Continued)

FOREIGN PATENT DOCUMENTS

CN    102823168 A    12/2012
CN    103053196 A     4/2013
(Continued)

OTHER PUBLICATIONS

China National Intellectual Property Administration, "The First Office Action," Application No. CN201811114582.0, dated Oct. 10, 2019, 24 pages.
(Continued)

*Primary Examiner* — Abdelillah Elmejjarmi

(57) ABSTRACT

A system and method for enhanced cell detection by a User Equipment (UE) is provided. The UE includes a transceiver configured to receive a discovery reference signal (DRS) occasion from at least one transmission point. The DRS occasion comprising a set of consecutive DRS sub-frames. The UE also includes processing circuitry configured to: in response to detecting a physical cell identity (PCID) of a Primary Synchronization Signal (PSS)/Secondary Synchronization Signal (SSS)/Cell-Specific Reference Signal (CRS) that is the same as a reference PCID for a configured Channel State Information-Reference Signal (CSI-RS) resource, the processing circuitry attempts to detect or measure the CSI-RS using the timing obtained from the PSS/SSS/CRS; and in response to not detecting a PCID of PSS/SSS/CRS that is the same as the reference PCID for a configured CSI-RS resource (TP), the processing circuitry does not attempt to detect or measure the CSI-RS.

14 Claims, 26 Drawing Sheets

Related U.S. Application Data

(60) Provisional application No. 62/024,326, filed on Jul. 14, 2014, provisional application No. 61/990,485, filed on May 8, 2014, provisional application No. 61/955,585, filed on Mar. 19, 2014, provisional application No. 61/924,059, filed on Jan. 6, 2014, provisional application No. 61/888,408, filed on Oct. 8, 2013, provisional application No. 61/883,876, filed on Sep. 27, 2013.

(51) Int. Cl.
 *H04L 27/26* (2006.01)
 *H04J 11/00* (2006.01)

(52) U.S. Cl.
 CPC .......... *H04L 5/0048* (2013.01); *H04L 5/0053* (2013.01); *H04L 27/2655* (2013.01)

(56) References Cited

U.S. PATENT DOCUMENTS

| | | | |
|---|---|---|---|
| 2013/0039199 A1 | 2/2013 | Liao et al. | |
| 2013/0194931 A1 | 8/2013 | Lee et al. | |
| 2013/0223264 A1* | 8/2013 | Miki | H04J 11/005 370/252 |
| 2013/0242778 A1* | 9/2013 | Geirhofer | H04L 5/0057 370/252 |
| 2014/0226649 A1 | 8/2014 | Webb et al. | |
| 2015/0063253 A1* | 3/2015 | Barbieri | H04L 5/0048 370/329 |
| 2015/0236801 A1* | 8/2015 | Sun | H04B 7/024 370/328 |
| 2015/0358848 A1* | 12/2015 | Kim | H04L 5/0048 370/252 |
| 2017/0064613 A1* | 3/2017 | Harada | H04W 48/12 |
| 2017/0070312 A1* | 3/2017 | Yi | H04J 11/0069 |

FOREIGN PATENT DOCUMENTS

| | | |
|---|---|---|
| CN | 103250455 A | 8/2013 |
| WO | 2011140264 A1 | 11/2011 |
| WO | 2013113361 A1 | 8/2013 |

OTHER PUBLICATIONS

Alcatel-Lucent, et al., "Further Discussion of Quasi-co-located antenna ports," R1-122458, 3GPP TSG-RAN1 Meeting #69, Prague, Czech Republic, May 21-25, 2012, 3 pages.

Nokia et al., "Considerations on Small Cell Discovery," R1-132309, 3GPP TSG-RAN WG1 Meeting #73, Fukuoka, Japan, May 20-24, 2013, 3 pages.

The Second Office Action in connection with Chinese Application No. 201811114582.0 dated May 29, 2020, 15 pages.

European Search Report in connection with European Application No. 20167154.2 dated Jun. 30, 2020, 10 pages.

Intel Corporation, "Discussion and evaluation on small cell discovery," R1-132934, 3GPP TSG-RAN WG1 #74, Barcelona, Spain, Aug. 19-23, 2013, 12 pages.

Office Action dated Feb. 25, 2021 in connection with Korean Application No. 10-2016-7008077, 14 pages.

Huawei, et al., "Network assistance for small cell discovery," R1-141127, 3GPP TSG RAN WG1 Meeting #76bis, Shenzhen, China, Mar. 13-Apr. 4, 2014, 3 pages.

NTT DOCOMO, "Views on Small Cell On/Off Mechanisms," R1-133456, 3GPP TSG RAN WG1 Meeting #74, Barcelona, Spain, Aug. 19-23, 2013, 7 pages.

NTT DOCOMO, "Views on network assistance for Rel. 12 discovery procedure," R1-141465, 3GPP TSG RAN WG1 Meeting #76bis, Shenzhen, China, Mar. 13-Apr. 4, 2014, 4 pages.

Samsung, "Discussions on small cell discovery procedure," R1-141289, 3GPP TSG RAN WG1 Meeting #76bis, Shenzhen, China, Mar. 13-Apr. 4, 2014, 4 pages.

Pantech, "Enhancements on CSI-RS sequence for CoMP", 3GPP TSG RAN WG1 Meeting #68, Feb. 6-10, 2012, R1-20321, 3 pages.

Alcatel-Lucent et al., "Scrambling sequence for CSI-RS", 3GPP TSG RAN WG1 meeting#68, Feb. 6-10, 2012, R1-120498, 4 pages.

Intel Corporation, "Configuration of CSI-RS based CoMP RRM measurements", 3GPP TSG-RAN WG2 #77bis, Mar. 26-30, 2012, R2-121749, 5 pages.

"3rd Generation Partnership Project; Technical Specification Group Radio Access Network; Evolved Universal Terrestrial Radio Access (E-UTRA); Physical Channels and Modulation (Release 10)", 3GPP TS 36.211 v10.4.0 (Dec. 2011), 101 pages.

Office Action dated Aug. 15, 2021 in connection with Korean Patent Application No. 10-2016-7008077, 8 pages.

* cited by examiner

METHODS AND APPARATUS FOR DISCOVERY SIGNALS FOR LTE ADVANCED

CROSS-REFERENCE TO RELATED APPLICATION(S) AND CLAIM OF PRIORITY

This application is a continuation of U.S. Non-Provisional patent application Ser. No. 14/500,192 filed Sep. 29, 2014 and entitled METHODS AND APPARATUS FOR DISCOVERY SIGNALS FOR LTE ADVANCED, and claims priority to U.S. Provisional Patent Application Ser. No. 61/883,876 filed Sep. 27, 2013 and entitled "METHODS AND APPARATUS FOR DISCOVERY SIGNALS FOR LTE ADVANCED"; U.S. Provisional Patent Application Ser. No. 61/888,408, filed Oct. 8, 2013, entitled "METHODS AND APPARATUS FOR ENHANCED MEASUREMENT FOR LTE ADVANCED"; U.S. Provisional Patent Application Ser. No. 61/924,059, filed Jan. 6, 2014, entitled "METHODS AND APPARATUS FOR DISCOVERY SIGNALS FOR LTE ADVANCED"; U.S. Provisional Patent Application Ser. No. 61/955,585, filed Mar. 19, 2014, entitled "METHODS AND APPARATUS FOR ENHANCED CELL DISCOVERY AND HIGH ORDER MODULATION FOR ADVANCED WIRELESS SYSTEMS"; U.S. Provisional Patent Application Ser. No. 61/990,485, filed May 8, 2014, entitled "METHODS AND APPARATUS FOR DISCOVERY SIGNALS FOR LTE ADVANCED"; AND U.S. Provisional Patent Application Ser. No. 62/024,326, filed Jul. 14, 2014, entitled "METHODS AND APPARATUS FOR DISCOVERY SIGNALS FOR LTE ADVANCED". The contents of the above-identified patent documents are incorporated herein by reference.

TECHNICAL FIELD

The present application relates generally to wireless communications systems and, more specifically, to a system and method for discovery of signals for long term evolution advanced communications systems.

BACKGROUND

In certain wireless communications systems, a user equipment (UE) initiates cell search by scanning for Primary Synchronization Signals (PSS) and then Secondary Synchronization Signals (SSS) to identify a set of candidate cell identities (cell ID). Given a candidate cell ID, the UE then attempts to detect and measure the Cell-Specific Reference Signals (CRS) of the candidate cell. If the signal quality (signal power, Reference Signal Received Power (RSRP)) of the cell meets a certain criteria, the UE attempts to access the cell or if the UE has already connected to a serving cell, the UE may report its measurement result as well as the identity of the cell to the network.

SUMMARY

In a first embodiment, a User Equipment (UE) is provided. The UE includes a transceiver configured to receive a discovery reference signal (DRS) occasion from at least one transmission point. The DRS occasion comprising a set of consecutive DRS sub-frames. The UE also includes processing circuitry. The processing circuitry is configured to: receive a DRS configuration information including synchronization assistance information for each transmission point, the synchronization assistance information configured by a network and comprising a physical cell identity (PCID) for transmission point identification, assume that a DRS corresponding to the PCID are Quasi-co-located (QCL) with respect to average delay and Doppler shift, perform DRS measurement according to the DRS configuration information to determine a reference signal received power (RSRP) of the at least one transmission point, and transmit, via the transceiver, a report of the DRS measurement.

In a second embodiment, a User Equipment (UE) is provided. The UE includes a transceiver configured to receive a discovery reference signal (DRS) occasion from at least one transmission point. The DRS occasion comprising a set of consecutive DRS sub-frames. The UE also includes processing circuitry. The processing circuitry is configured to: in response to detecting a physical cell identity (PCID) of a Primary Synchronization Signal (PSS)/Secondary Synchronization Signal (SSS)/Cell-Specific Reference Signal (CRS) that is the same as a reference PCID for a configured Channel State Information-Reference Signal (CSI-RS) resource, the processing circuitry attempts to detect or measure the CSI-RS using the timing obtained from the PSS/SSS/CRS; and in response to not detecting a PCID of PSS/SSS/CRS that is the same as the reference PCID for a configured CSI-RS resource (TP), the processing circuitry does not attempt to detect or measure the CSI-RS.

In a third embodiment, a User Equipment (UE) is provided. The UE includes a transceiver configured to receive a discovery reference signal (DRS) occasion from at least one transmission point. The DRS occasion comprising a set of consecutive DRS sub-frames, wherein, for FDD, a first sub-frame of a DRS occasion carries the PSS and the SSS and for TDD, the first sub-frame of a DRS occasion carries the SSS and the second sub-frame of a DRS occasion carries the PSS. The UE also includes a processing circuitry. The processing circuitry is configured to: perform DRS measurement according to the DRS configuration information to determine a reference signal received power (RSRP) of the at least one transmission point, and transmit, via the transceiver, a report of the DRS measurement.

In a fourth embodiment, a method is provided. The method includes receiving a discovery reference signal (DRS) occasion from at least one transmission point, the DRS occasion comprising a set of consecutive DRS sub-frames. The method also includes, in response to detecting a PCID of PSS/SSS/CRS that is the same as the reference PCID for a configured CSI-RS resource (TP), attempting to detect or measure the CSI-RS using the timing obtained from the PSS/SSS/CRS. The method also includes, in response to not detecting a PCID of PSS/SSS/CRS that is the same as the reference PCID for a configured CSI-RS resource (TP), not attempting to detect or measure the CSI-RS.

In a fifth embodiment, a method is provided. The method includes receiving a discovery reference signal (DRS) occasion from at least one transmission point. The DRS occasion comprising a set of consecutive DRS sub-frames, wherein, for Frequency Division Duplexing (FDD), a first sub-frame of a DRS occasion carries a Primary Synchronization Signal (PSS) and a Secondary Synchronization Signal (SSS). For Time Division Duplexing (TDD), the first sub-frame of a DRS occasion carries the SSS and the second sub-frame of a DRS occasion carries the PSS. The method also includes performing, by processing circuitry, DRS measurement according to the DRS configuration information to determine a reference signal received power (RSRP) of the at least one transmission point. The method further includes transmitting, via a transceiver, a report of the DRS measurement.

In a sixth embodiment, a base station is provided. The user equipment includes a transceiver configured to transmit a discovery reference signal (DRS) occasion to at least one user equipment. The DRS occasion comprising a set of consecutive DRS sub-frames. For Frequency Division Duplexing (FDD), a first sub-frame of a DRS occasion carries a Primary Synchronization Signal (PSS) and a Secondary Synchronization Signal (SSS). For Time Division Duplexing (TDD), the first sub-frame of a DRS occasion carries the SSS and the second sub-frame of a DRS occasion carries the PSS In a seventh embodiment, a method is provided. The method includes transmitting a discovery reference signal (DRS) occasion to at least one user equipment. The DRS occasion includes a set of consecutive DRS sub-frames. For Frequency Division Duplexing (FDD), a first sub-frame of a DRS occasion carries a Primary Synchronization Signal (PSS) and a Secondary Synchronization Signal (SSS). For Time Division Duplexing (TDD), the first sub-frame of a DRS occasion carries the SSS and the second sub-frame of a DRS occasion carries the PSS.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1A:
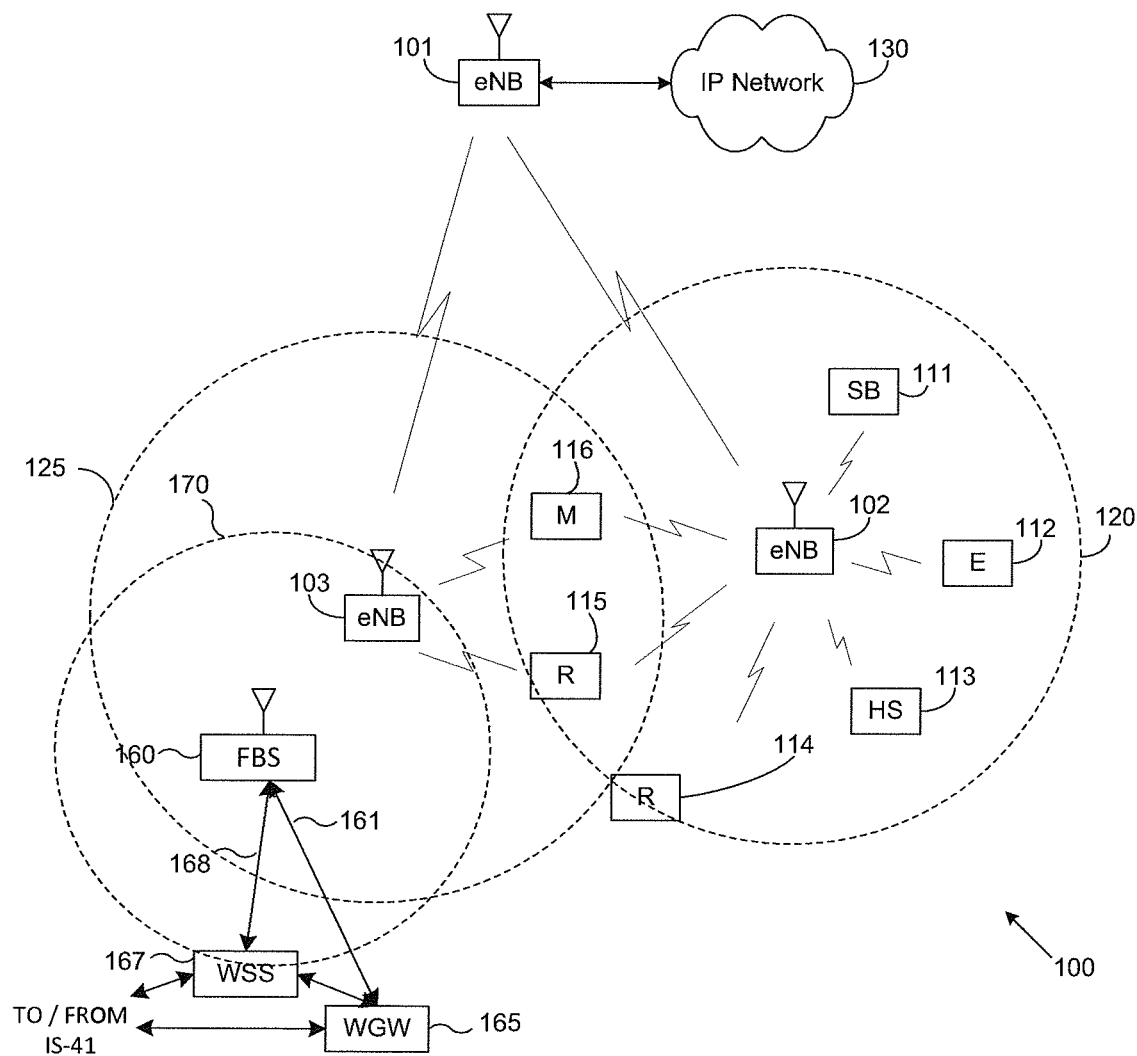
FIG. 1A illustrates an example wireless network according to this disclosure.

FIGS. 1 through 38, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TS 36.214 v11.1.0, "E-UTRA, Physical Layer Measurement" (REF 4); 3GPP TS 36.300 V11.5.0, "E-UTRA and E-UTRAN, Overall description. Stage 2" (REF 5); 3GPP TS 36.321 V11.2.0, "E-UTRA, MAC protocol specification" (REF 6); 3GPP TS 36.331 V11.3.0, "E-UTRA, RRC Protocol specification." (REF 7); 3GPP TS 36.133 V11.4.0, "E-UTRA, Requirements for support of radio resource management" (REF 8); 3GPP TR 36.814 V9.0.0, "E-UTRA, Further advancements for E-UTRA physical layer aspects" (REF 9); WD-201111-007-1-US0, "Design of Time-Tracking Reference Signal" (REF 10); and 3GPP TR 36.819 V11.1.0, "Coordinated multi-point operation for LTE physical layer aspects" (REF 11). The contents of which are hereby incorporated by reference in their entirety.

When small cells, such as pico cells, femto cells, and nano cells, are deployed in a cluster in order to handle the traffic in a hotzone, such as would exist in a crowded shopping mall, stadium, arena and the like, there is a need to enhance a UE's capability for detecting the small cells. Due to the relatively small distance among the small cells, severe inter-cell interference may occur to the PSS/SSS of the cells, degrading the detectability of cells in the hotzone. Enhancing the UE's capability for detecting the small cells is necessary because when small cells are deployed in a cluster, severe inter-cell interference may occur to the PSS/SSS CRS of the cells to be detected by the UE, making it more challenging for the UE to detect these cells.

In certain embodiments, enhancement to cell discovery/detection can be achieved by introducing a new physical signal for cell detection. The new physical signal is a new, not possibly not yet named, physical signal that is designed after Long Term Evolution (LTE)-Advanced (LTE-A) release 11. New procedures can also be introduced to use an existing legacy physical signal such as Channel State Information Reference Signal (CSI-RS) and Position Reference Signals (PRS) for cell detection and measurement. Therefore, certain embodiments of the present disclosure illustrate procedures and methods that use CSI-RS or modified CSI-RS for cell detection and measurement. The principles disclosed here can also be applied to other physical signals for cell detection. Embodiments of the present disclosure also can be used to enhance cell detection as well as Coordinated Multi-Point (CoMP) transmission point detection. Embodiments of the present disclosure provide an enhanced cell discovery mechanism.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The wireless network 100 includes a DownLink (DL) that conveys signals from transmission points (TPs), such as eNBs to UEs and an UpLink (UL) that conveys signals from UEs to reception points such as eNBs. DL signals include data signals conveying information content, control signals conveying DL Control Information (DCI), and Reference Signals (RS), which are also known as pilot signals. The eNB transmits data information or DCI through respective Physical DL Shared CHannels (PDSCHs) or Physical DL Control CHannels (PDCCHs). Possible DCI formats used for downlink assignment include DCI format 1A, 1B, 1C, 1D, 2, 2A, 2B, 2C and 2D. A UE can be configured with a transmission mode which determines the downlink unicast reception method for the UE. For a given transmission mode, a UE can receive unicast downlink assignment using DCI format 1A and one of DCI format 1B, 1D, 2, 2A, 2B, 2C or 2D. An eNB transmits one or more of multiple types of RS including a UE-Common RS (CRS), a Channel State Information RS (CSI-RS), and a DeModulation RS (DMRS). A CRS is transmitted over a DL system Bandwidth (BW) and can be used by UEs to demodulate data or control signals or to perform measurements. To reduce CRS overhead, an eNB may transmit a CSI-RS with a smaller density in the time and/or frequency domain than a CRS. For channel measurement, Non-Zero Power CSI-RS (NZP CSI-RS) resources can be used. For Interference Measurement Resources (IMRs), CSI Interference Measurement (CSI-IM) resources associated with a Zero Power CSI-RS (ZP CSI-RS) can be used as stated in REF 3. A UE can determine the CSI-RS transmission parameters through higher layer signaling from an eNB. The DMRS is transmitted only in the BW of a respective PDSCH and a UE can use the DMRS to demodulate information in a PDSCH.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one of more of eNBs 101, 102 and 103 are configured to perform for measurement and discovery for LTE Advanced signals. In addition, one of more of eNBs 101, 102 and 103 are configured to perform low overhead synchronization for beam-formed systems.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

In some embodiments, the wireless network 100 includes a pico cells, femto cells, and nano cells, such as femto-cell base station (FBS) 160. The illustration of a femto-cell in the wireless network 100 is for illustration only. The wireless network 100 can include a pico cell, nano cell and the like without departing from the scope of the present disclosure.

FMB 160 includes components analogous to those found in macro base stations BS 101, BS 102 and BS 103. As such, FBS 160 comprises a femto base station controller (FBSC) and one or more femto base transceiver subsystem(s) (FBTS). FBS 160 communicates with mobile stations in its served area using OFDMA, IS-95, CDMA or any other wireless communications standard.

Voice bearer traffic is transferred between the FBS 160 and the IS-41 network (e.g., PSTN) via communication line 161, Wireless Gateway (WGW) 165. Signaling/control traffic are transferred between the FBS 160 and the IS-41 network via communication line 168 and Wireless Soft Switch (WSS) 167. The WGW 165 and WSS 167 are coupled via a backhaul connection (not shown), e.g., the IS-41, to the MSC 140. The WGW 165 provides a bearer path between FBS 160 and MSC 140 via the IS-41. The WSS 167 provides a signaling path FBS 160 and WGW 165 as well as to the MSC 140 via the IS-41.

A dotted line shows the approximate boundary of cell 170 in which FBS 160 is located. The cell is shown approximately circular for the purposes of illustration and explanation only. It should be clearly understood that the cell may have an irregular shape, depending on the cell configuration selected and natural and man-made obstructions.

Figure 1B:
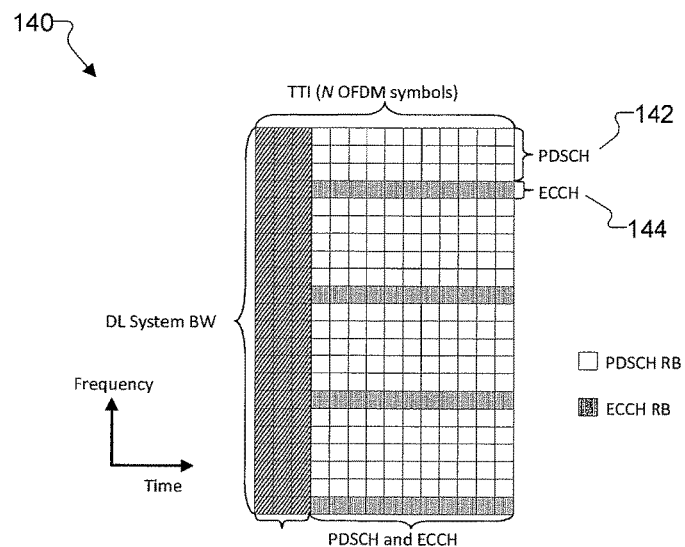
FIG. 1B illustrates a structure of a DL Transmission Time Interval (TTI) according to this disclosure.

FIG. 1B illustrates a structure of a DL Transmission Time Interval (TTI) according to this disclosure. The embodiment of the DL Transmission TTI 140 shown in FIG. 1b is for illustration only. Other embodiments could be used without departing from the scope of the present disclosure.

DL signaling uses Orthogonal Frequency Division Multiplexing (OFDM) and a DL TTI includes N=14 OFDM symbols in the time domain and K Resource Blocks (RBs) in the frequency domain. A first type of Control CHannels (CCHs) is transmitted in a first $N_1$ OFDM symbols 110 (including no transmission, $N_1$=0). A remaining $N-N_1$ OFDM symbols are used primarily for transmitting PDSCHs 142 and, in some RBs of a TTI, for transmitting a second type of CCHs (ECCHs) 144.

An eNB, such as the eNB 103, also transmits Primary Synchronization Signals (PSS) and Secondary Synchronization Signals (SSS), so that a UE, such as UE 116, can synchronize with the eNodeB and perform cell identification. There are 504 unique physical-layer cell identities. The physical-layer cell identities are grouped into 168 unique physical-layer cell-identity groups, each group containing three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables the UE 116 to determine the physical-layer identity as well as the slot timing of the cell transmitting the PSS. Detecting a SSS enables the UE 116 to determine the radio frame timing, the physical-layer cell identity, the cyclic prefix length as well as the cell uses Frequency Division Duplexing (FDD) or a Time Division Duplexing (TDD) scheme.

Figure 1C:
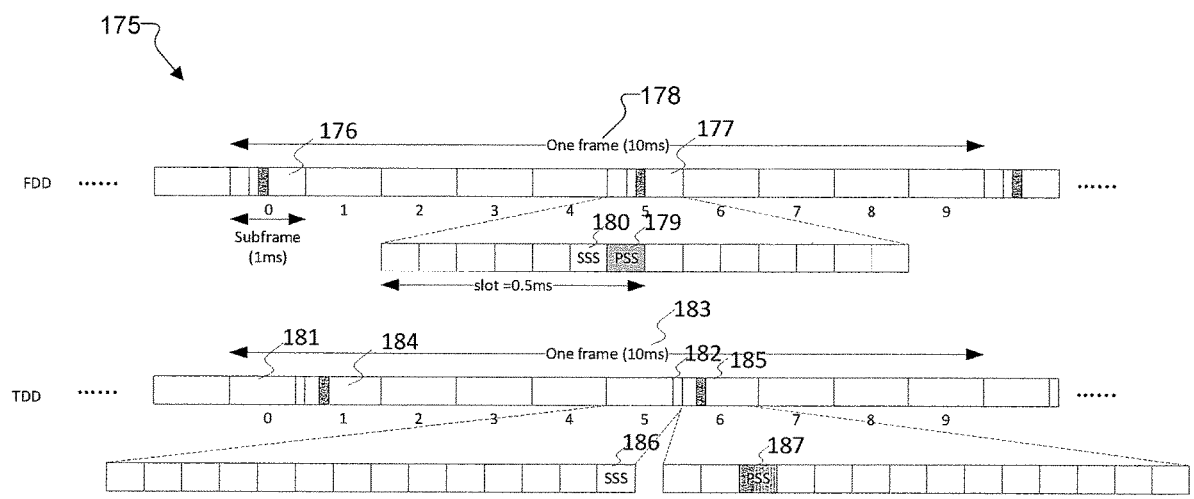
FIG. 1C illustrates the PSS and SSS locations in a radio frame for FDD and TDD assuming normal cyclic prefix according to this disclosure.

FIG. 1C illustrates the PSS and SSS locations in a radio frame for FDD and TDD assuming normal cyclic prefix according to this disclosure. The embodiment of the PSS and SSS locations 175 shown in FIG. 1C is for illustration only. Other embodiments could be used without departing from the scope of the present disclosure.

The PSS and the SSS of a FDD system is transmitted in sub-frame #0 176 and sub-frame #5 177 in a frame 178. In particular, the PSS is transmitted in the $7^{th}$ OFDM symbol 179 of the first slot of sub-frame #0 176 and sub-frame #5 177 and the SSS is transmitted in the 6$^{th}$ OFDM symbol 180 of the first slot of sub-frame #0 176 and sub-frame #5 177.

In a TDD system, the SSS of a TDD system is transmitted in sub-frame #0 181 and sub-frame #5 182 in a frame 183. The PSS of a TDD system is transmitted in sub-frame #1 184 and sub-frame #6 185 in a frame 183. In particular, the SSS is transmitted in the last OFDM symbol 186 of the second slot of sub-frame #0 181 and sub-frame #5 182 and the PSS is transmitted in the 2$^{nd}$ OFDM symbol 187 of the first slot of sub-frame #1 184 and sub-frame #6 185.

The PSS is generated from a Zadoff-Chu sequence of length 63 with the middle element punctured to avoid transmitting on the direct current (dc) subcarrier. Each PSS is generated using one of three root sequence indices. The SSS is generated from M-sequences. Each SSS sequence is constructed by interleaving, in the frequency-domain, two length-31 BPSK-modulated secondary synchronization codes. These two codes are two different cyclic shifts of a single length-31 M-sequence. The cyclic shift indices of the M-sequences are derived from a function of the physical layer cell identity group. Further details of PSS and SSS generation can be found in as stated in REF 1.

Figure 1D:
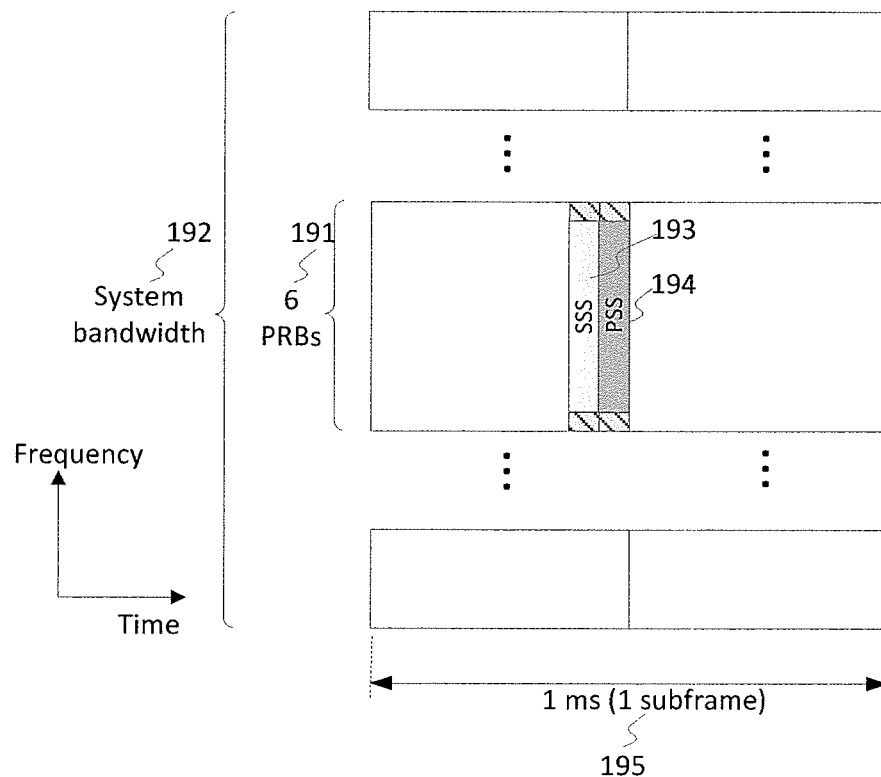
FIG. 1D illustrates PSS and SSS resource element mapping in a sub-frame according to this disclosure.

FIG. 1D illustrates a resource element mapping for PSS and SSS in a sub-frame for FDD according to this disclosure. The embodiment of the resource element mapping 190 shown in FIG. 1D is for illustration only. Other embodiments could be used without departing from the scope of the present disclosure.

The PSS and the SSS is mapped to the center 6 physical resource blocks (72 subcarriers) 191 in the system bandwidth 192 of the last OFDM symbol of the first slot 193 and the second last OFDM symbol of the first slot 194 of sub-frame #0 and sub-frame #5 195, respectively. As the PSS and SSS only occupy 62 resource elements each, there are five unused resource elements 196 on each side of the PSS and the SSS.

Figure 1E:
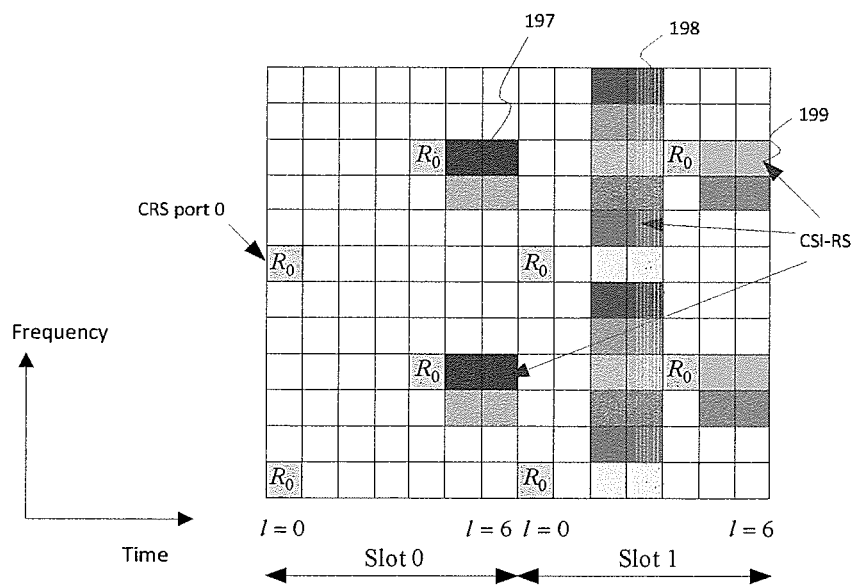
FIG. 1E illustrates CSI-RS resource element mapping according to this disclosure.

FIG. 1E illustrates the resource element mapping for possible CSI-RS resources according to this disclosure. The embodiment of the resource element mapping shown in FIG. 1E is for illustration only. Other embodiments could be used without departing from the scope of the present disclosure. The CSI-RS resources include NZP CSI-RS and ZP CSI-RS, that can be configured to the UE 116. A ZP CSI-RS resource is configured as a 4-port CSI-RS resource.

One or more ZP CSI-RS resources can be configured to a UE through higher layer signaling, such as resources 197, 198, 199. For example, it is possible to configure all resource elements in the 3$^{rd}$ OFDM symbol and the 4$^{th}$ OFDM symbol of the second slot of a subframe to be ZP CSI-RS resources (up to six ZP CSI-RS resources can be configured in the 3$^{rd}$ and the 4$^{th}$ OFDM symbols of the second slot).

A DCI for downlink assignment contains downlink scheduling information such as the rank of transmission and the Modulation and Coding Scheme (MCS) (5 bits) for each transport block that a UE shall assume for decoding the scheduled transport block. The MCS indicated by an eNB for a transport block enables the UE 116 to determine the modulation order (one of QPSK, 16QAM and 64QAM) as well as the Transport Block Size (TBS), through a Modulation and TBS index table for PDSCH (Table 7.1.7.1-1 in REF 3) and one of the predefined transport block size tables depending on the number of spatial multiplexing layers (Table 7.1.7.2.1-1, Table 7.1.7.2.2-1, Table 7.1.7.2.4-1, Table 7.1.7.2.5-1 in REF 3). The eNB 103 can determine a rank of transmission and a MCS/TBS associated with a TB for a UE based on UE Channel State Information (CSI) measurement feedbacks, such as Rank Indicator (RI), Precoder Matrix Indicator (PMI) and Channel Quality Indicator (CQI). To feedback CQI, a CQI index is transmitted by the UE which indicates the recommended modulation order and code rate according to a 4-bit CQI table (Table 7.2.3-1 in REF 3).

High order modulation 256 QAM is introduced for LTE for spectral efficiency enhancement. A PDSCH can be transmitted using 256QAM when the signal-to-noise-and-interference ratio is high (e.g. >20 dB). To enable support for 256 QAM, a new Modulation and TBS index table for PDSCH table that include entries corresponding to 256QAM is to be defined. Upon configuration by the eNB 103, the UE 116 uses the new table to interpret the MCS field in a DCI for PDSCH assignment. In addition, new TBS tables and a new CQI table include entries corresponding to 256QAM are to be defined to enable higher data rate.

However, the UE 116 should not assume the new interpretation of MCS field in a DCI for all possible downlink assignment DCI formats. For example, DCI formats that are used for the so-called "fallback" operation may not utilize the new table. "Fallback" operation allows an eNB to maintain communication with a UE regardless of the present transmission mode configuration at the UE. "Fallback" operation is also needed whenever there is an ambiguity about a UE's current RRC configurations which occurs naturally during a RRC reconfiguration process.

Embodiments of the present disclosure define conditions that determine when the UE is and is not allowed to assume new interpretation of MCS field in a DCI. Embodiments of the present disclosure also define conditions that determine when the UE is and is not allowed to use the new CQI table for a CQI reporting.

Figure 2A:
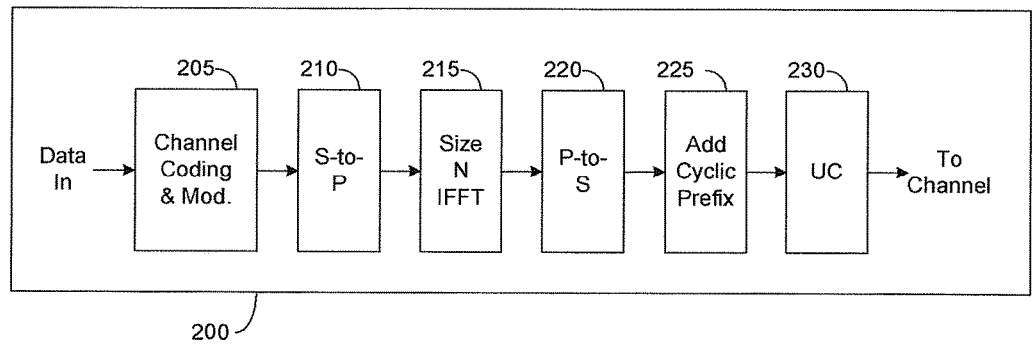
FIGS. 2A and 2B illustrate example wireless transmit and receive paths according to this disclosure.
Figure 2B:
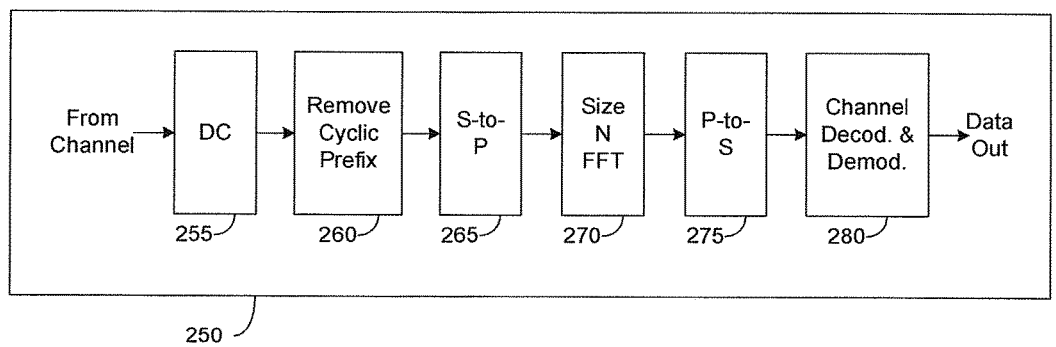

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured for measurement and discovery for LTE Advanced signals.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding or turbo coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
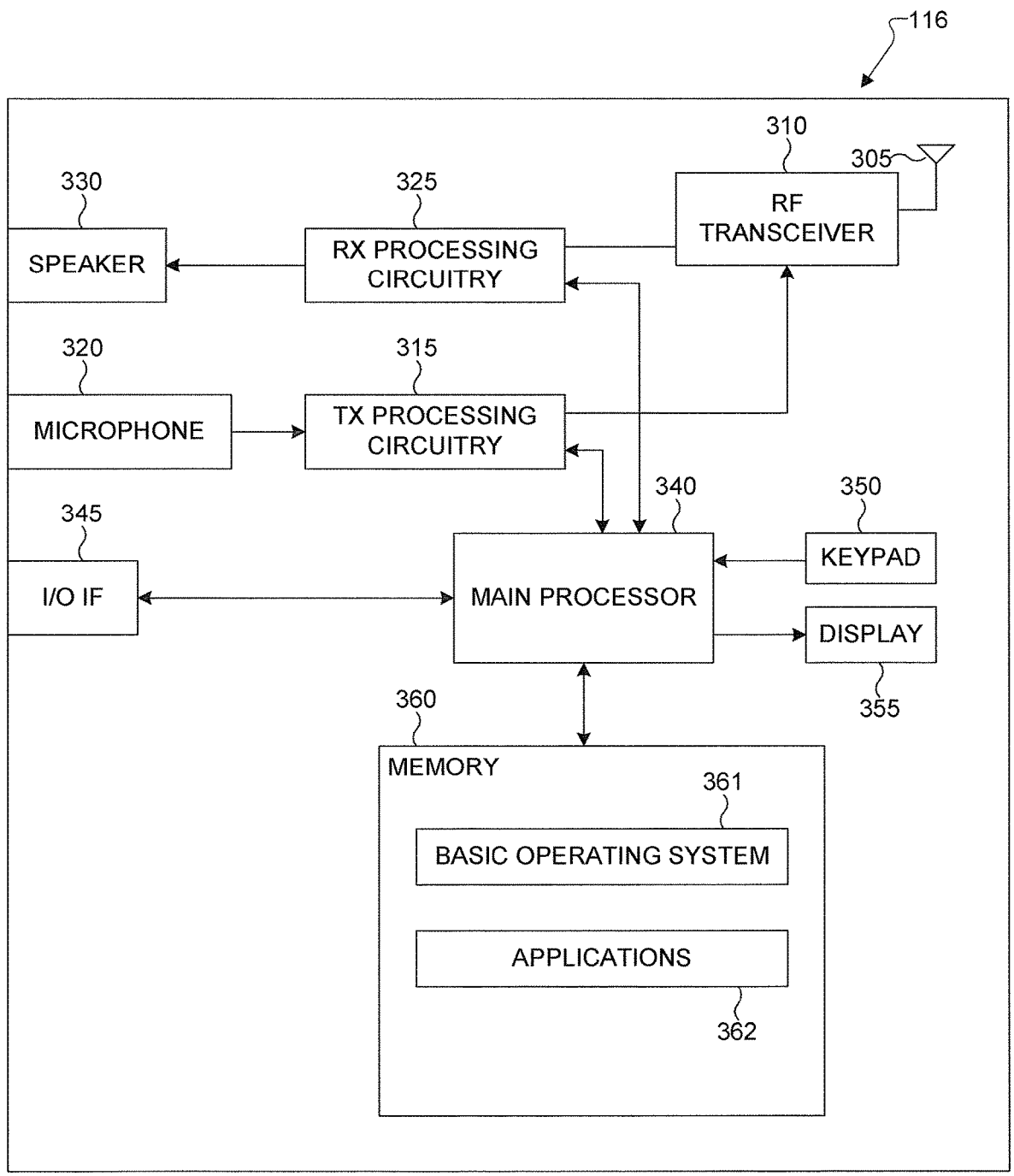
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for measurement and discovery for LTE Advanced signals and performing low overhead synchronization for beam-formed systems. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

CSI-RS is a physical signal measured by the UE to generate short term CSI. Examples of short term CSI include a Precoding Type Indicator (PTI), Rank Indicator (RI), Precoding Matrix Indicator (PMI) and Channel Quality Indicator (CQI). Short term CSI can be configured by the network when the UE is in Radio Resource Control (RRC) connected mode. Configuration information for CSI-RS in LTE Rel-10, as described in REF 3 and REF 7, includes the number of antenna ports, the resource configuration (also called CSI RS configuration or CSI configuration, used to indicate resources within a sub-frame), the sub-frame configuration (used to indicate the sub-frames used for CSI-RS transmission by providing the periodicity and the sub-frame offset) and the parameter $P_C$. Configuration for CSI-RS in LTE Rel-11 includes a CSI-RS identity, the number of antenna ports, the resource configuration, the sub-frame configuration, scrambling identity and information about CRS that is quasi co-located with the CSI-RS. (See REF 3 and REF 7). The RE mapping of CSI-RS is specified in REF 1 and is provided for the case of normal cyclic prefix, where (k',l') as defined in REF 1 represents the subcarrier index and the OFDM symbol index within a physical resource block (a block of 12 subcarriers and 0.5 ms (1 slot) duration).

TABLE 1

Mapping from CSI reference signal configuration to (k', l') for normal cyclic prefix

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 4:
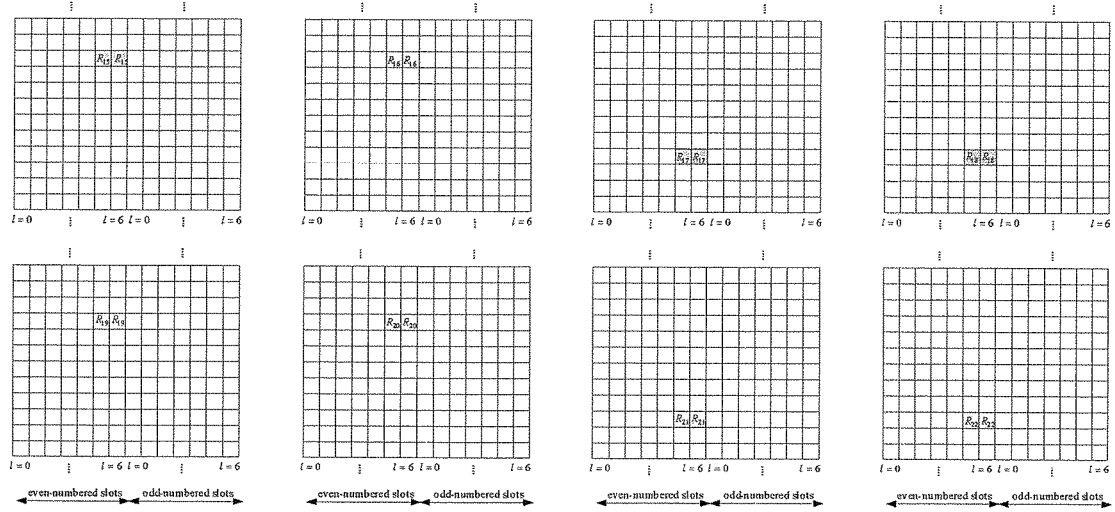
FIG. 4 illustrates a mapping of CSI Reference Signals according to this disclosure.

FIG. 4 illustrates a mapping of CSI Reference Signals according to embodiments of this disclosure. The embodiment of the CSI Reference Signal mapping 400 shown in FIG. 4 is for illustration only. Other embodiments could be used without departing from the scope of the present disclosure. The RE mapping of CSI-RS ports (labelled as port 15 to 22 in REF 1) for CSI-RS configuration 0 (i.e. resource configuration 0) is illustrated for the normal cyclic prefix.

Certain embodiments provide new and enhanced discovery and detection methods in order to assist UE 116 to discover, or detect, and measure cells. The cells, such as one or more of eNB 103 and FBS 160, to be detected by UE 116 are assumed to transmit signals that are then measured by UE 116. A candidate signal is the Channel State Information Reference Signal (CSI-RS). Other candidate signals are the Positioning Reference Signal (PRS), a modified PSS/SSS/CRS, or a newly designed physical signal, or a combination of the aforementioned signals. Cell or TP detection using discovery reference signal (DRS) includes the procedure of DRS measurement according to configuration by the network and reporting according to a predetermined or configured reporting criterion.

The term, transmission points (TP), also is used herein to denote "cells" that share the same Physical Cell Identity (PCI) for common signals transmissions but uses unique virtual cell id for unicast transmissions are deployed. Additional terms to which TP applies are: "cell identity", "cell detection", "cell measurement", in which "cell" is replaced by "TP", such as "TP identity", "TP detection", "TP measurement".

FIGS. 5, 6, 7, 8 and 9 illustrate Discovery Reference Signal (DRS) occasions according to embodiments of this disclosure. The embodiments of the DRS occasions shown in FIGS. 5, 6, 7, 8 and 9 are for illustration only. Other embodiments could be used without departing from the scope of the present disclosure. For example, in the illustrated examples, the transmission point is eNB 103, however, the transmission point can be FBS 160 or another cell, such as a nano cell, femto cell and the like. In the example shown in FIG. 5, N=1 for DRS occasion 500. In the example shown in FIG. 6, N=2 for DRS occasion 600. In the example shown in FIG. 7, N>2 for DRS occasion 700 for FDD. In the example shown in FIG. 8, N>2 for DRS occasion 800 for TDD. In the example shown in FIG. 9, the DRS occasion 900 with a measurement gap 905. The embodiments described with respect to FIGS. 5 through 9 are also referenced herein as Embodiment 1.

In certain embodiments, UE 116 uses discovery signals 505 for cell or transmission point detection that includes one or more of: PSS, SSS, CRS and, if configured, CSI-RS. A discovery reference signal (DRS) occasion 500 of a cell or TP is defined as a set of consecutive DRS sub-frames (N sub-frames), transmitted periodically by eNB 103 or FBS 160, where each DRS sub-frame contains at least one of: PSS, SSS, CRS and, if configured, CSI-RS. The DRS occasion 500 for multiple cells or TP may or may not overlap in time. Aligning multiple DRS occasions in time especially for cells or TPs on the same frequency is beneficial from UE power saving perspective. DRS timing configuration can include indication of the start of a DRS occasion. If the first sub-frame of the DRS occasion always has PSS+SSS for FDD, and SSS for TDD, the DRS timing configuration can include indication of the sub-frame location of PSS+SSS for FDD, and SSS for TDD.

Figure 5:
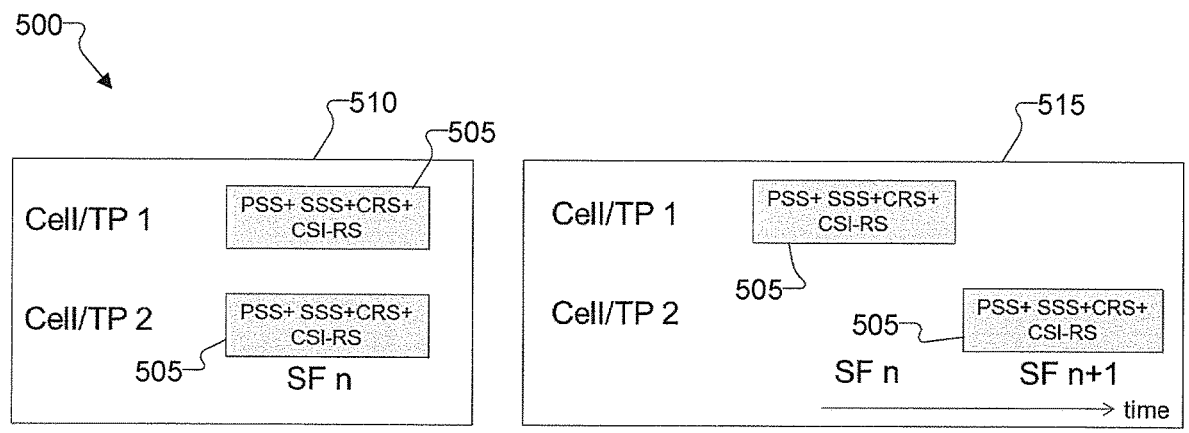
FIGS. 5, 6, 7, 8 and 9 illustrate Discovery Reference Signal (DRS) occasions according to this disclosure.

For a Case in which N=1 (FDD), as shown in the example shown in FIG. 5, the PSS, SSS, CRS, and CSI-RS are all transmitted in one sub-frame 510. DRS occasions of multiple cells or TPs on the same frequency can coincide in the same sub-frame or time multiplexed over at least two sub-frames 515. The sub-frames for DRS occasions of multiple cells/TPs can fit in a legacy measurement gap configuration. The DRS occasions of multiple cells or TPs in the same sub-frame can be configured (such as by RRC) for cell/TP identification and RRM measurement (CRS or CSI-RS based RSRP/RSRQ) with a DRS timing configuration. One DRS timing configuration may include information of only one starting sub-frame of a DRS occasion, in which case the UE 116 can be configured with multiple DRS timing configurations. In another option, one DRS timing configuration may also include information of more than one starting sub-frame of DRS occasions. For CoMP scenario 4 (or shared cell id deployment scenario), multiple CSI-RSs by the same cell (each CSI-RS corresponds to a TP) can exist.

Figure 6:
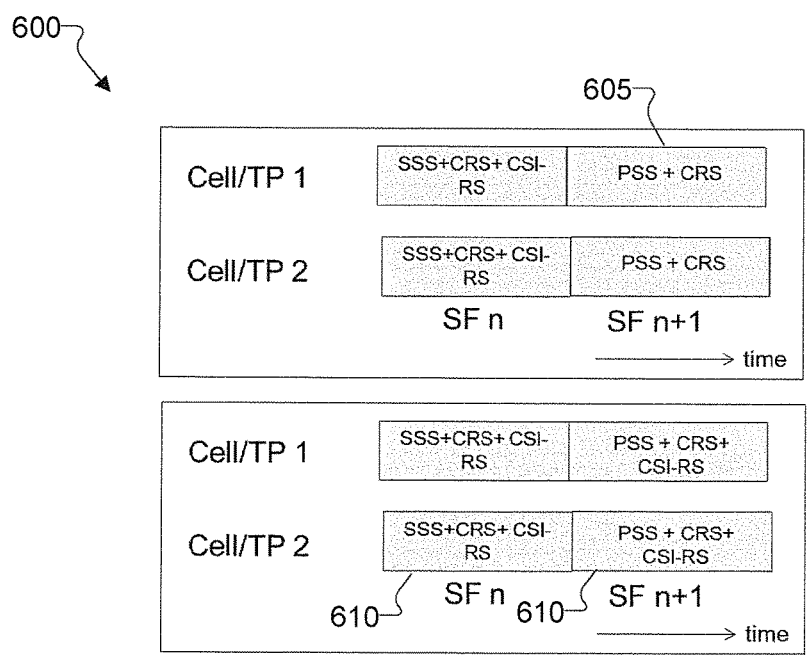

For a Case in which N=2 (TDD), as shown in the example shown in FIG. 6, since legacy PSS and SSS are assumed, PSS and SSS 605 are in different sub-frames for TDD. The UE 116 determines (or assumes) that the PSS sub-frame, which can be a special sub-frame for an ON cell, does not contain CSI-RS. Similar to the FDD (N=1) case, DRS occasions 600 of multiple cells or TPs on the same frequency can coincide in the same sub-frame or time multiplexed over sub-frames. For CoMP scenario 4, multiple CSI-RSs 610 by the same cell (each CSI-RS corresponds to a TP) can exist. The DRS timing configuration can indicate SF n and for TDD, the DRS occasions include SF n and SF n+1.

Figure 7:
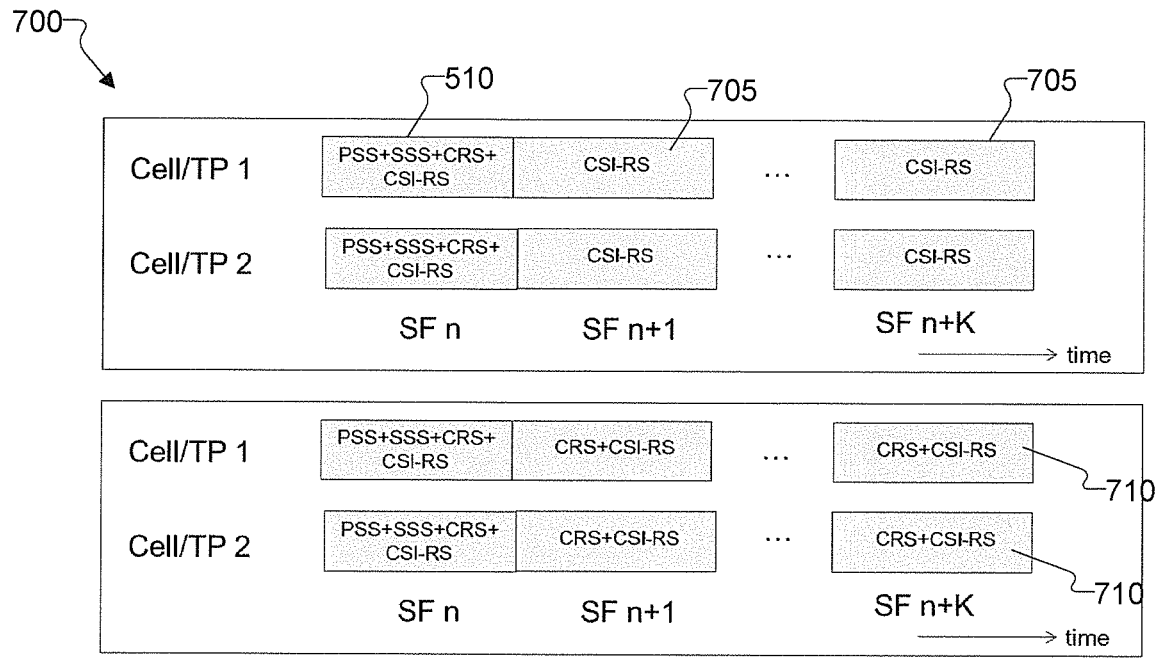
Figure 8:
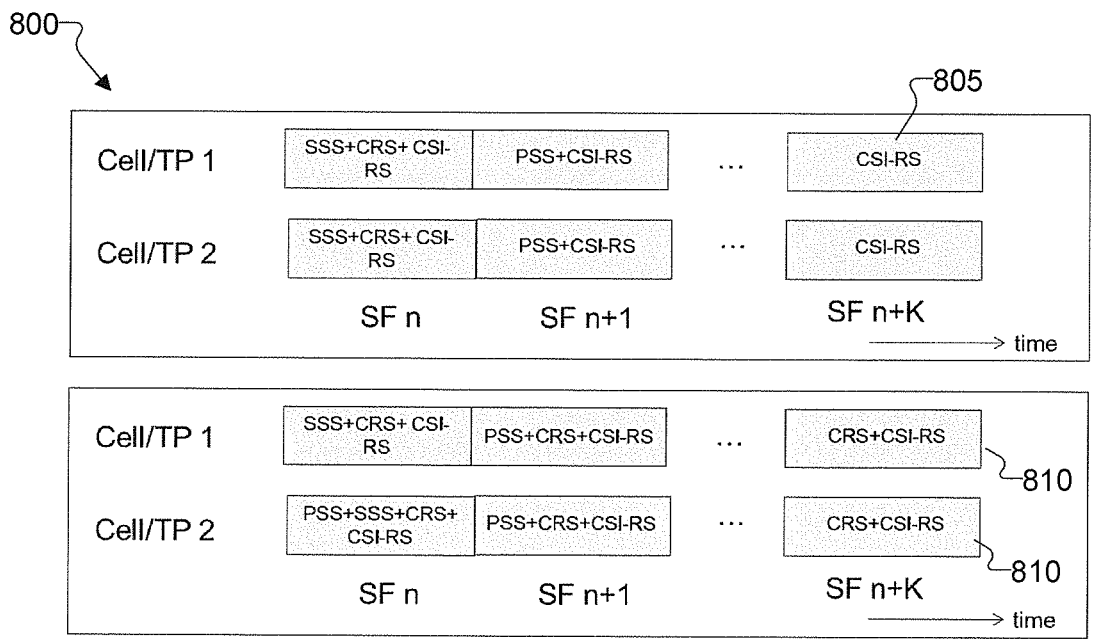
Figure 9:
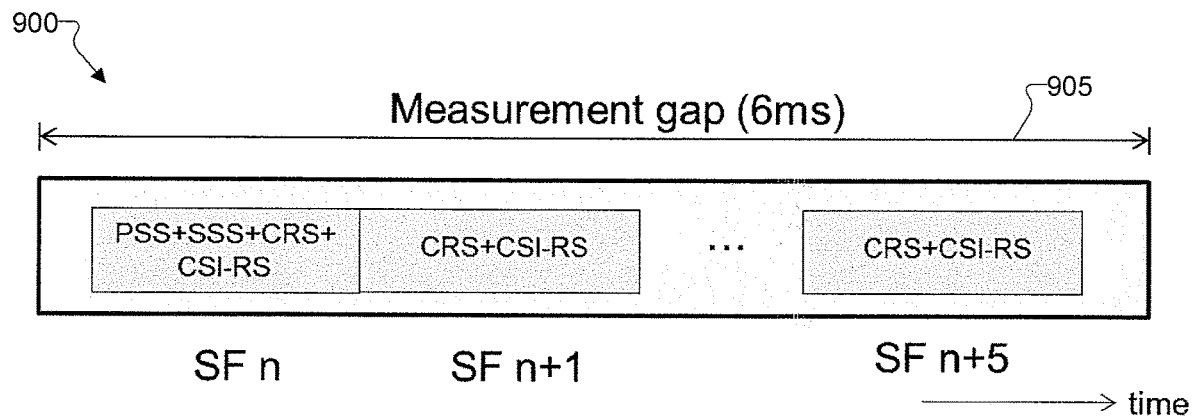

For a Case in which N>1, as shown in the example shown in FIGS. 7 and 8: in a use case for improved measurement accuracy, the eNB 103 increases a number of measurement samples. In one option, the eNB 103 applies a transmission of a physical signal in multiple sub-frame of a DRS occasion to CSI-RS only, which is advantageous for improving the CSI-RS measurement accuracy (in the DRS occasion 705 in FIG. 7 for FDD and in the DRS occasion 805 in FIG. 8 for TDD). In another option, the eNB 103 transmits the CRS and, if configured, the CSI-RS, in multiple sub-frames of a DRS occasion, such as 5 ms or 6 ms of consecutive sub-frames (in the DRS occasion 710 in FIG. 7 for FDD and in the DRS occasion 810 in FIG. 8 for TDD). In yet another option, the eNB 103: 1) transmits the CRS of the same cell/TP in multiple sub-frames of a DRS occasion; 2) but only transmits the CSI-RS of the same cell or TP in a subset of sub-frames, such as one sub-frame out of the DRS occasion sub-frames. In this option, the DRS timing configuration can also include the timing offset (ms or sub-frame) of the start of CSI-RS sub-frame relative to the starting sub-frame of the DRS occasion. In certain embodiments, if a sub-frame is a special sub-frame for TDD, eNB 103 does not transmit CSI-RS or the UE 116 assumes that eNB 103 does not transmit CSI-RS. The DRS timing configuration can indicate the first sub-frame of DRS occasions (i.e. SF n). DRS timing configuration can also include duration information or the number N. A DRS occasion can also consists of all sub-frames within the measurement gap 905 (as shown in FIG. 9), in which case the measurement gap configuration can indicate the start of a DRS occasion. For FDD, the first sub-frame of a DRS occasion can carry the PSS and the SSS. For TDD, the first sub-frame of a DRS occasion can carry the SSS and the second sub-frame of a DRS occasion can carry the PSS. This is advantageous to enable the UE 116 to perform synchronization with the PSS/SSS first before receiving CRS and/or CSI-RS. For CoMP scenario 4, multiple CSI-RSs by the same cell (each CSI-RS corresponds to a TP) can exist.

In the examples shown in FIGS. 5 through 8, sub-frame n ($SF_n$) can either be sub-frame 0 or sub-frame 5, such that the location of PSS or SSS indicates the possible sub-frame index of the cell or TP detected. For TDD, $SF_n+_1$ is a special sub-frame. In a second option, the $SF_n$ can be assumed to be always sub-frame 5, that is n=5. As a result, when the PBCH is transmitted in sub-frame 0, a collision between the PBCH and CSI-RS is avoided in the resource blocks in which the PBCH is transmitted. In addition, $SF_n+_1$ can also be the DL sub-frame for certain TDD configurations such as configuration 3, 4, and 5, hence CSI-RS can be transmitted in $SF_n+_1$ as well. In a third option, if DRS occasion overlaps with sub-frame 0, UE assumes that CSI-RS is not present in the sub-frame or in the resource blocks where PBCH may be present. In a fourth option, if DRS occasion overlaps with sub-frame 0, UE 116 determines (or assumes) that CSI-RS is present as in other sub-frames and the PBCH is determined (or assumed) to not be present. In a fifth option, the network explicitly indicates a presence of CSI-RS in $SF_n$, by higher layer signaling, such as RRC. When the absence of CSI-RS is indicated for $SF_n$, then UE 116 skips $SF_n$ when receiving CSI-RS. Alternatively, when the absence of CSI-RS is indicated for $SF_n$, UE 116 also receives CSI-RS in $SF_n$.

In certain embodiments, when a DRS occasion contains multiple sub-frames with CSI-RS, eNB 103 enables configuration of multiple (consecutive) Zero-Power CSI-RS sub-frames with a single ZP-CSI-RS resource or configuration. In this way, when a eNB 103 configures this new ZP-CSI-RS configuration according to the CSI-RS patterns of DRS of its neighboring cells or TPs, the CSI-RS of DRS of neighboring cells/TPs is protected from interference of eNB 103, the configuring cell/TP. The UE 116, configured with this new ZP-CSI-RS configuration, is configure to assume that the corresponding ZP-CSI-RS REs are not used for data transmission and can be skipped when performing rate matching operation. The maximum number of ZP CSI-RS configurations that can be configured to a UE can be kept the same at 4 (as specified in Rel-11 LTE). The new ZP-CSI-RS configuration can be realized by introducing a new RRC information element (IE) to the existing ZP-CSI-RS configuration IE (CSI-RS-ConfigZP-r11). The new RRC ID is configured to indicate a duration or length of the ZP-CSI-RS sub-frames (e.g. 1 ms or 2 ms or 5 ms). In another alternative, the maximum number of ZP CSI-RS configurations that can be configured to a UE can be increased from 4 (as specified in Rel-11 LTE) to a larger number, such as, 20.

Figure 10:
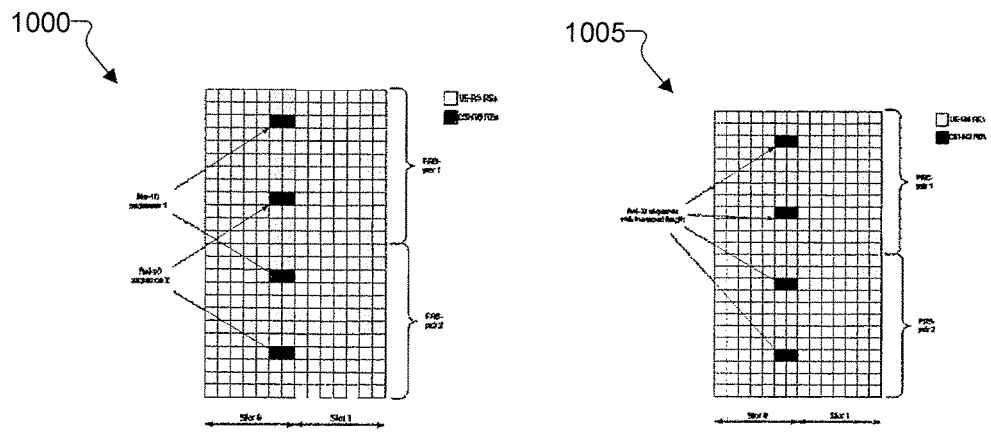
FIG. 10 illustrates an enhanced CSI-RS with 4 resource elements per physical resource block pair according to this disclosure.

FIG. 10 illustrates an enhanced CSI-RS with 4 resource elements per physical resource block pair according to embodiments of the present disclosure. The embodiments of the enhanced CSI-RS structures 1000, 1005 shown in FIG. 10 are for illustration only. Other embodiments could be used without departing from the scope of the present disclosure.

Figure 11:
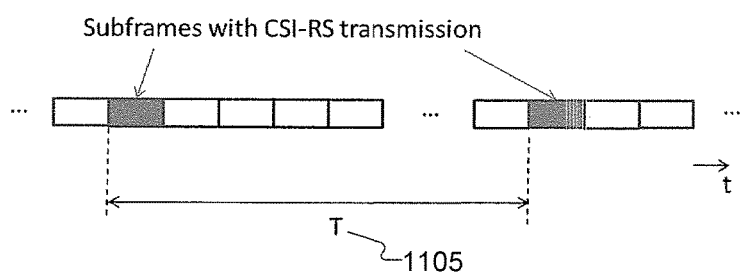
FIG. 11 illustrates a CSI-RS transmission with low duty cycle according to this disclosure.

Hereafter, the CSI-RS (for example, the CSI-RS of the DRS occasion) is assumed as the signal used for cell detection, transmit point (TP) detection, or a combination of cell and TP detection, for descriptions of the embodiments of the present disclosure, unless stated otherwise. It is noted that the principles of the embodiments of the present disclosure are applicable also to other type of signals used for cell detection, including the CRS of DRS occasion and any enhanced CSI-RS design, such as described in REF 10, where the density of the CSI-RS is proposed to be increased in the frequency domain to 4 REs per PRB-pair (resembling 4-port mapping) or 8 REs per PRB-pair (resembling 8-port mapping) as shown in FIG. 10. In certain embodiments, the periodicity of the enhanced CSI-RS transmission is modified to have lower duty cycle T 1105 so as to minimize network and UE power consumption as shown in FIG. 11. Using the enhanced CSI-RS design with higher frequency density, as described in REF 10, improves a detection performance due to a larger number of samples. Additionally, using the enhanced CSI-RS also minimizes a performance impact to the legacy UEs since the enhanced CSI-RS resources can be configured as zero power CSI-RS resources. Additional methods to enhance CSI-RS for the purpose of cell detection and discovery are described in herein below with respect to FIG. 17. In the following embodiments, description of the discovery signal with reference to the CSI-RS does not necessarily imply that a respective structure will be same as for a conventional CSI-RS. For example, an enhanced CSI-RS structure 1000, 1005 can be used.

The network can configure UE 116 to detect and measure CSI-RSs from multiple cells that include neighboring cells, such as small cells, eNB 102 and eNB 101, and optionally, one or more serving cells, such as FBS 160 or eNB 103, to generate a signal quality measurement such as RSRP and/or Reference Signal Received Quality (RSRQ) and/or SINR of each cell. The cells to be detected and measured by the UE 116 can be from a same cluster of small cells or can be from multiple clusters of small cells. The UE 116 reports measurement results to the network when a reporting criterion is met. For example, UE 116 can be triggered to transmit a measurement reporting when a RSRP value is greater than a threshold. In certain embodiments, the threshold is configured by the network. In certain embodiments, the threshold is pre-configured. In certain embodiments, when the UE 116 does not have a PUSCH transmission, UE 116 transmits a service request, in a PUCCH, requesting a scheduling from a network for a PUSCH transmission in order to report measurement results for discovery signals. In certain embodiments, the UE 116 is configured by the network with a PUCCH resource or a PUSCH resource to use for reporting measurement results of discovery signals. The PUCCH or PUSCH resource is valid only for a sub-frame occurring after sub-frame(s) of transmissions of discovery signals and, therefore, an associated overhead for reporting measurement results is low.

Embodiments of the present disclosure specify CSI-RS resource configuration method for cell detection purpose. Embodiments of the present disclosure also enable UE 116 to determine the identity of a cell transmitting a CSI-RS the UE detects. In certain embodiments, the UE 116 includes the identity of the cell in the measurement report so that the network is able to associate the measurement report with the corresponding cell identity. When the UE 116 detects multiple cells, the UE 116 reports a predetermined maximum number of the detected cells. The report from UE 116 can always include measurements for the predetermined maximum number of cells or a header can inform the network of the number of reported cells.

In one method of CSI-RS detection configuration (Method 1), the network configures the UE 116 to detect and measure multiple CSI-RS resources. The network can configure the UE 116 by higher layer signaling such as RRC signaling or MAC signaling. Each CSI-RS resource configuration consists of an identity of a CSI-RS resource, a resource configuration, a sub-frame configuration and a scrambling identity (used for generating a scrambling sequence for the CSI-RS). In certain embodiments, the UE 116 is configured to assume that a number of CSI-RS ports is one. In certain embodiments, a number of CSI-RS ports are also signaled to the UE 116. In certain embodiments, when CSI-RS ports of multiple cells can be transmitted in the same set of time-frequency resources, the network can also signal an index ([0, 1]) of a length-2 Orthogonal Cover Code (OCC). In certain embodiments, when the OCC index is not signaled, the UE 116 blindly detects an index for an OCC applied to a CSI-RS. In either case, the UE 116 is configured to recognize a cell with a single CSI-RS port that is spread with an OCC [1-1] over consecutive symbols. When the CSI-RS ports of multiple cells cannot be transmitted in the same set of time-frequency resources, the UE 116 is configured to assume that no OCC is applied or assumes a fixed OCC is applied, such as [1 1].

An example ASN.1 code for RRC configuration of each CSI-RS resource is illustrated below, where csi-RS-ConfigNZPId-rxy represents the identity of the CSI-RS resource, resourceConfig-rxy represents the resource configuration (also called CSI RS configuration or CSI configuration), sub-frameConfig-rxy represents the sub-frame configuration and scramblingIdentity-rxy represents the scrambling identity (may also be called the physical cell identity (PCID), virtual cell id (VCID), cell id (CID)):

```
-- ASN1START
    CSI-RS-ConfigNZP-rxy ::=        SEQUENCE {
        csi-RS-ConfigNZPId-rxy          CSI-RS-ConfigNZPId-rxy,
        resourceConfig-rxy              INTEGER (0..31),
        sub-frameConfig-rxy             INTEGER (0..154),
        scramblingIdentity-rxy          INTEGER (0..503),
        orthogonalCoverCodeIndex-rxy    INTEGER (0..1),
        ...
}
-- ASN1STOP
```

In certain embodiments, a list of CSI-RS resources is configured for detection of multiple CSI-RSs or cells, as illustrated by an example ASN.1 code below, by configuring the UE 116 with csi-RS-ConfigNZPToAddModList-rxy.

```
    csi-RS-ConfigNZPToAddModList-rxy
    CSI-RS-ConfigNZPToAddModList-rxy
            OPTIONAL, -- Need
    CSI-RS-ConfigNZPToAddModList-rxy ::= SEQUENCE (SIZE
    (1..maxCSI-RS-NZP-rxy)) OF
            CSI-RS-ConfigNZP-rxy
```

In certain embodiments, to enable discovery signal detection, the discovery signals of multiple cells are transmitted in a same sub-frame or same set of OFDM symbols so as to minimize the wake up time for the UE 116 to detect the discovery signals, which in turn saves UE power consumption. Therefore, it can be typical that the same sub-frame configuration is applied for the CSI-RS resources of multiple cells. In certain embodiments, to save signalling overhead, the sub-frame configuration for a group of cells with a same configuration is signalled only once, while the other configuration fields are signalled per CSI-RS resource, for example, as shown in an example ASN.1 code below, where CSI-RS-CommonConfigNZP-rxy is the container for common configuration (in this case, sub-frameConfig-rxy) of multiple CSI-RS resources and CSI-RS-ConfigNZPList-rxy specifies a list of CSI-RS resources where the common configuration is applicable. If the common configuration is always applicable for all CSI-RS resources configured, the indication of a list may not be needed.

```
-- ASN1START
CSI-RS-CommonConfigNZP-rxy ::=      SEQUENCE {
    csi-RS-CommonConfigNZPId-rxy        CSI-RS-
                                        CommonConfigNZPId-rxy,
    csi-RS-ConfigNZPList-rxy            SEQUENCE
                                        (1..maxCSI-RS-NZP-rxy)) OF
    CSI-RS-ConfigNZP-rxy
    sub-frameConfig-rxy                 INTEGER (0..154),
    ...
}
CSI-RS-ConfigNZP-rxy ::=            SEQUENCE {
    csi-RS-ConfigNZPId-rxy              CSI-RS-ConfigNZPId-rxy,
    resourceConfig-rxy                  INTEGER (0..31),
    scramblingIdentity-rxy              INTEGER (0..503),
    orthogonalCoverCodeIndex-rxy        INTEGER (0..1),
    ...
}
-- ASN1STOP
```

```
-- ASN1START
    CSI-RS-CommonConfigNZPId-rxy ::=    INTEGER (1..maxCSI-RS-
                                                common-NZP-rxy)
-- ASN1STOP
```

In another option for CSI-RS common signalling, the scrambling identity is included as part of the common signalling. The UE 116 uses the indicated scrambling identity to detect the set CSI-RS resources configured. Common scrambling identity reduces CSI-RS detection complexity and improves detection performance. An example ASN.1 code is given below.

```
-- ASN1START
CSI-RS-CommonConfigNZP-rxy ::=      SEQUENCE {
    csi-RS-CommonConfigNZPId-rxy        CSI-RS-CommonConfigNZPId-rxy,
    csi-RS-ConfigNZPList-rxy            SEQUENCE (SIZE (1..maxCSI-RS-NZP-rxy)) OF CSI-
    RS-ConfigNZP-rxy
    sub-frameConfig-rxy                     INTEGER (0..154),
    scramblingIdentity-rxy                  INTEGER (0..503),
    ...
}
CSI-RS-ConfigNZP-rxy ::=            SEQUENCE {
    csi-RS-ConfigNZPId-rxy              CSI-RS-ConfigNZPId-rxy,
    resourceConfig-rxy                      INTEGER (0..31),
    orthogonalCoverCodeIndex-rxy INTEGER (0..1),
    ...
}
-- ASN1STOP
```

Figure 12:
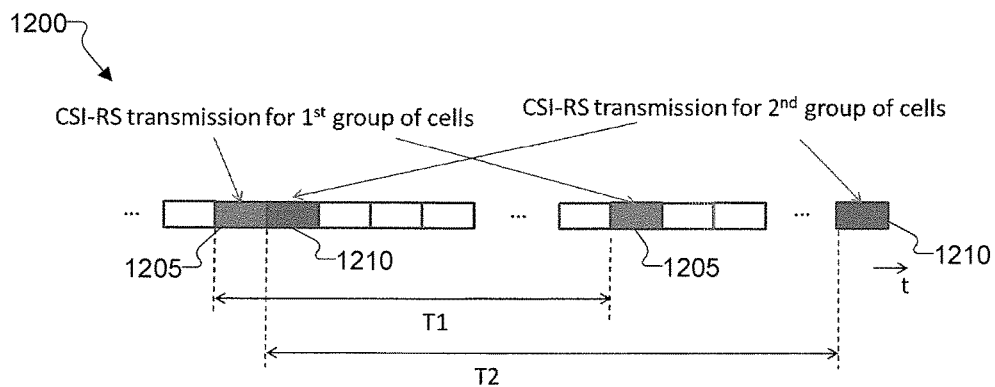
FIG. 12 illustrates different sub-frame configurations for different groups of small cells according to this disclosure.

FIG. 12 illustrates different sub-frame configurations for different groups of small cells according to this disclosure. The embodiment of the sub-frame configurations 1200 shown in FIG. 12 is for illustration only. Other embodiments could be used without departing from the scope of the present disclosure.

In certain embodiments, the UE 116 may need to detect cells that do not share a same CSI-RS common configuration. For example, different sub-frame configurations can be configured for different groups or clusters of small cells as shown in FIG. 12. For example, a first CSI-RS transmission 1205 can be configured for a first group of cells while a second CSI-RS transmission 1210 is configured for a second group of cells. To allow for such flexibility, the UE 116 can be configured with multiple CSI-RS common configurations, each being applied to a separate set of CSI-RS resources.

In another method of CSI-RS detection configuration (Method 2), the network configures a sub-frame configuration for CSI-RS(s) to be detected by the UE 116 but not their resource configurations or OCC indices. A difference with respect to Method 1 is that the UE 116 is not informed which REs of the CSI-RS sub-frames (determined by resource configuration) contain CSI-RS. The UE 116 is required to try to detect the presence of a CSI-RS in the CSI-RS sub-frames determined by the sub-frame configuration. For example, 40 possible CSI-RS resources can exist in a sub-frame for normal CP that the UE 116 needs to try to detect (each cell's CSI-RS occupies one CSI-RS port, there are 20 unique time-frequency RE-pair locations and 2 time-domain orthogonal cover code for each time-frequency RE-pair). In another example, 20 possible CSI-RS resources exist in a sub-frame for normal CP that the UE 116 needs to try to detect (each cell's CSI-RS occupies one CSI-RS port, there are 20 unique time-frequency RE-pair locations and only one time-domain orthogonal cover code is used for each time-frequency RE-pair, such as [1 1]).

In one option, all the CSI-RS resources corresponding to the sub-frame configuration can have the same scrambling identity for sequence generation. In this case, the scrambling identity can also be provided as shown in the example ASN.1 code below. Scrambling identity can be seen as a group-common scrambling identity.

```
-- ASN1START
CSI-RS-GroupConfigNZP-rxy ::=      SEQUENCE {
    csi-RS-GroupConfigNZPId-rxy        CSI-RS-GroupConfigNZPId-
                                       rxy,
    subframeConfig-rxy                 INTEGER (0..154),
    scramblingIdentity-rxy             INTEGER (0..503),
    ...
}
-- ASN1STOP
```

In another option, all the CSI-RS resources corresponding to the sub-frame configuration can have different scrambling identities. The scrambling identity is not provided as shown in the example ASN.1 code below.

```
-- ASN1START
    CSI-RS-GroupConfigNZP-rxy ::=      SEQUENCE {
    csi-RS-GroupConfigNZPId-rxy        CSI-RS-GroupConfigNZPId-
                                       rxy,
    subframeConfig-rxy                 INTEGER (0..154),
    ...
}
-- ASN1STOP
```

```
-- ASN1START
    CSI-RS-GroupConfigNZPId-rxy ::=                 INTEGER
    (1..maxCSI-RS-group-NZP-rxy)
-- ASN1STOP
```

For both options, the CSI-RS detection configuration can also include a CSI-RS group identity (csi-RS-GroupConfigNZPId-rxy). A CSI-RS group can consist of a group of CSI-RS resources to be detected by the UE 116. A CSI-RS group can correspond to the CSI-RS transmitted by small cells in the same cluster as shown in FIG. 12. For example, the CSI-RS transmitted by small cells in the same cluster can correspond to the first CSI-RS transmission 1205 for the first group of cells. Alternatively, the CSI-RS transmitted by small cells in the same cluster can correspond to the second CSI-RS transmission 1210 for the second group of cells. Each CSI-RS group can be associated with or configured with a set of PCIs of which the corresponding PSS/SSS can be assumed by the UE 116 for coarse time and frequency synchronization (as illustrated in Embodiment 2 herein below).

The coordination among cells regarding the CSI-RS transmission have the advantage of only needing to involve the sub-frames used for CSI-RS transmissions, but not the actual RE locations of the CSI-RS; therefore eNB 103 is free to reconfigure a resource configuration of its own CSI-RS without informing other eNodeBs, such as eNB 101 or eNB 102. The network also can signal multiple CSI-RS sub-frame configurations, such as by signaling a list of CSI-RS configurations, if the number of CSI-RS resources to be searched exceeds the maximum number of CSI-RS resources for a sub-frame configuration. The possible CSI-RS resources defined by the CSI-RS sub-frame configuration constitute the CSI-RS search space.

For all methods of CSI-RS detection configuration, the neighboring eNodeBs, such as eNB 101 and eNB 102, can exchange information on the respective CSI-RS configurations so that each eNodeB can configure to their respective UEs the appropriate CSI-RS configurations.

For CSI-RS detection configuration Method 2, a large CSI-RS search space increases UE signal processing time. The large CSI-RS search space also increases false alarm probability.

In one approach to reduce the CSI-RS search space for the UE, the network signals a reduced set of resources to be searched by UE 116. For example, the network can indicate to the UE 116 that a total number of CSI-RS resources to be searched is 20 and the UE 116 only searches in the first 20 CSI-RS resource locations. In certain embodiments, the network additionally signals a starting position for CSI-RS resources to be searched. To facilitate such signaling methods, embodiments of the present disclosure define an ordering/labeling of CSI-RS resources (CSI-RS resource indexing) so that UE 116 is able to understand the signaling by the network.

In one alternative of CSI-RS resource indexing, the ordering of CSI-RS resources is such that the first CSI-RS resource is the resource with the smallest OFDM symbol index and the smallest subcarrier index and the first OCC (that is, $[w_0 \ w_1]=[1, 1]$); and ordering for the rest is done in the increasing frequency direction first and then the increasing time direction assuming the same OCC. After all orthogonal time-frequency resources have been considered (20 for the case of 1 CSI-RS port) and there are still remaining CSI-RS resources to be mapped, the ordering is repeated from a smallest OFDM symbol index and a smallest subcarrier index with the second OCC (that is, $[w_0 \ w_1]=[1 \ -1]$). The ordered CSI-RS resources are labeled with an index, called CSI-RS index. This mapping of CSI-RS index and physical resource is represented in TABLE 2. This ordering or mapping method minimizes the use of code-division multiplexing for CSI-RS resources, which helps to improve detection robustness for CSI-RS resources detection considering a time or a frequency offset. When the OCC or port is not used to differentiate CSI-RS resources, only CSI-RS index 1-20 are applicable.

TABLE 2

Example of first alternative of CSI-RS resource indexing for normal CP, frame structure type 1 and 2

| CSI-RS | Frequency and time location | | OCC |
|---|---|---|---|
| index | (k', l') | $n_s$ mod 2 | $[w_0 \ w_1]$ |
| 1 | (2, 5) | 0 | [1 1] |
| 2 | (3, 5) | 0 | [1 1] |
| 3 | (8, 5) | 0 | [1 1] |

TABLE 2-continued

Example of first alternative of CSI-RS resource indexing for normal CP, frame structure type 1 and 2

| CSI-RS index | Frequency and time location (k', l') | $n_s$ mod 2 | OCC [$w_0$ $w_1$] |
|---|---|---|---|
| 4 | (9, 5) | 0 | [1 1] |
| 5 | (0, 2) | 1 | [1 1] |
| 6 | (1, 2) | 1 | [1 1] |
| 7 | (2, 2) | 1 | [1 1] |
| 8 | (3, 2) | 1 | [1 1] |
| 9 | (4, 2) | 1 | [1 1] |
| 10 | (5, 2) | 1 | [1 1] |
| 11 | (6, 2) | 1 | [1 1] |
| 12 | (7, 2) | 1 | [1 1] |
| 13 | (8, 2) | 1 | [1 1] |
| 14 | (9, 2) | 1 | [1 1] |
| 15 | (10, 2) | 1 | [1 1] |
| 16 | (11, 2) | 1 | [1 1] |
| 17 | (2, 5) | 1 | [1 1] |
| 18 | (3, 5) | 1 | [1 1] |
| 19 | (8, 5) | 1 | [1 1] |
| 20 | (9, 5) | 1 | [1 1] |
| 21 | (2, 5) | 0 | [1 −1] |
| 22 | (3, 5) | 0 | [1 −1] |
| 23 | (8, 5) | 0 | [1 −1] |
| 24 | (9, 5) | 0 | [1 −1] |
| 25 | (0, 2) | 1 | [1 −1] |
| 26 | (1, 2) | 1 | [1 −1] |
| 27 | (2, 2) | 1 | [1 −1] |
| 28 | (3, 2) | 1 | [1 −1] |
| 29 | (4, 2) | 1 | [1 −1] |
| 30 | (5, 2) | 1 | [1 −1] |
| 31 | (6, 2) | 1 | [1 −1] |
| 32 | (7, 2) | 1 | [1 −1] |
| 33 | (8, 2) | 1 | [1 −1] |
| 34 | (9, 2) | 1 | [1 −1] |
| 35 | (10, 2) | 1 | [1 −1] |
| 36 | (11, 2) | 1 | [1 −1] |
| 37 | (2, 5) | 1 | [1 −1] |
| 38 | (3, 5) | 1 | [1 −1] |
| 39 | (8, 5) | 1 | [1 −1] |
| 40 | (9, 5) | 1 | [1 −1] |

To reduce UE power used for receiving discovery signals, it is beneficial to minimize a number of OFDM symbols the UE 116 needs to receive while allowing a large number of discovery signals to be transmitted. There is benefit in ordering the CSI-RS from OFDM symbols according to a number of supported CSI-RS starting from the largest number. An example of this design in illustrated in TABLE 3. When the OCC or port is not used to differentiate CSI-RS resources, only CSI-RS index 1-20 are applicable.

TABLE 3

Second example of the first alternative of CSI-RS resource indexing for normal CP, frame structure type 1 and 2

| CSI-RS index | Frequency and time location (k', l') | $n_s$ mod 2 | OCC [$w_0$ $w_1$] |
|---|---|---|---|
| 1 | (0, 2) | 1 | [1 1] |
| 2 | (1, 2) | 1 | [1 1] |
| 3 | (2, 2) | 1 | [1 1] |
| 4 | (3, 2) | 1 | [1 1] |
| 5 | (4, 2) | 1 | [1 1] |
| 6 | (5, 2) | 1 | [1 1] |
| 7 | (6, 2) | 1 | [1 1] |
| 8 | (7, 2) | 1 | [1 1] |
| 9 | (8, 2) | 1 | [1 1] |
| 10 | (9, 2) | 1 | [1 1] |
| 11 | (10, 2) | 1 | [1 1] |
| 12 | (11, 2) | 1 | [1 1] |
| 13 | (2, 5) | 0 | [1 1] |

TABLE 3-continued

Second example of the first alternative of CSI-RS resource indexing for normal CP, frame structure type 1 and 2

| CSI-RS index | Frequency and time location (k', l') | $n_s$ mod 2 | OCC [$w_0$ $w_1$] |
|---|---|---|---|
| 14 | (3, 5) | 0 | [1 1] |
| 15 | (8, 5) | 0 | [1 1] |
| 16 | (9, 5) | 0 | [1 1] |
| 17 | (2, 5) | 1 | [1 1] |
| 18 | (3, 5) | 1 | [1 1] |
| 19 | (8, 5) | 1 | [1 1] |
| 20 | (9, 5) | 1 | [1 1] |
| 21 | (0, 2) | 1 | [1 −1] |
| 22 | (1, 2) | 1 | [1 −1] |
| 23 | (2, 2) | 1 | [1 −1] |
| 24 | (3, 2) | 1 | [1 −1] |
| 25 | (4, 2) | 1 | [1 −1] |
| 26 | (5, 2) | 1 | [1 −1] |
| 27 | (6, 2) | 1 | [1 −1] |
| 28 | (7, 2) | 1 | [1 −1] |
| 29 | (8, 2) | 1 | [1 −1] |
| 30 | (9, 2) | 1 | [1 −1] |
| 31 | (10, 2) | 1 | [1 −1] |
| 32 | (11, 2) | 1 | [1 −1] |
| 33 | (2, 5) | 0 | [1 −1] |
| 34 | (3, 5) | 0 | [1 −1] |
| 35 | (8, 5) | 0 | [1 −1] |
| 36 | (9, 5) | 0 | [1 −1] |
| 37 | (2, 5) | 1 | [1 −1] |
| 38 | (3, 5) | 1 | [1 −1] |
| 39 | (8, 5) | 1 | [1 −1] |
| 40 | (9, 5) | 1 | [1 −1] |

In another alternative of CSI-RS resource indexing, an ordering of CSI-RS resources is such that the first CSI-RS resource is the resource with the smallest OFDM symbol index and the smallest subcarrier index and the first OCC (that is, [$w_0$ $w_1$]=[1, 1]); and ordering for the rest is done in the code domain first, then the increasing frequency direction, then the increasing time direction. The ordering is represented in TABLE 4. The advantage of this alternative is that the CSI-RS resource overhead can be minimized and, as a result, more resources are available for the other physical channels such as PDSCH and EPDCCH.

TABLE 4

Example of second alternative of CSI-RS resource indexing for normal CP, frame structure type 1 and 2

| CSI-RS index | Frequency and time location (k', l') | $n_s$ mod 2 | OCC [$w_0$ $w_1$] |
|---|---|---|---|
| 1 | (2, 5) | 0 | [1 1] |
| 2 | (2, 5) | 0 | [1 −1] |
| 3 | (3, 5) | 0 | [1 1] |
| 4 | (3, 5) | 0 | [1 −1] |
| 5 | (8, 5) | 0 | [1 1] |
| 6 | (8, 5) | 0 | [1 −1] |
| 7 | (9, 5) | 0 | [1 1] |
| 8 | (9, 5) | 0 | [1 −1] |
| 9 | (0, 2) | 1 | [1 1] |
| 10 | (0, 2) | 1 | [1 −1] |
| 11 | (1, 2) | 1 | [1 1] |
| 12 | (1, 2) | 1 | [1 −1] |
| 13 | (2, 2) | 1 | [1 1] |
| 14 | (2, 2) | 1 | [1 −1] |
| 15 | (3, 2) | 1 | [1 1] |
| 16 | (3, 2) | 1 | [1 −1] |
| 17 | (4, 2) | 1 | [1 1] |
| 18 | (4, 2) | 1 | [1 −1] |
| 19 | (5, 2) | 1 | [1 1] |
| 20 | (5, 2) | 1 | [1 −1] |

TABLE 4-continued

Example of second alternative of CSI-RS resource indexing for normal CP, frame structure type 1 and 2

| CSI-RS index | Frequency and time location (k', l') | $n_s$ mod 2 | OCC [$w_0$ $w_1$] |
|---|---|---|---|
| 21 | (6, 2) | 1 | [1 1] |
| 22 | (6, 2) | 1 | [1 −1] |
| 23 | (7, 2) | 1 | [1 1] |
| 24 | (7, 2) | 1 | [1 −1] |
| 25 | (8, 2) | 1 | [1 1] |
| 26 | (8, 2) | 1 | [1 −1] |
| 27 | (9, 2) | 1 | [1 1] |
| 28 | (9, 2) | 1 | [1 −1] |
| 29 | (10, 2) | 1 | [1 1] |
| 30 | (10, 2) | 1 | [1 −1] |
| 31 | (11, 2) | 1 | [1 1] |
| 32 | (11, 2) | 1 | [1 −1] |
| 33 | (2, 5) | 1 | [1 1] |
| 34 | (2, 5) | 1 | [1 −1] |
| 35 | (3, 5) | 1 | [1 1] |
| 36 | (3, 5) | 1 | [1 −1] |
| 37 | (8, 5) | 1 | [1 1] |
| 38 | (8, 5) | 1 | [1 −1] |
| 39 | (9, 5) | 1 | [1 1] |
| 40 | (9, 5) | 1 | [1 −1] |

As mentioned, to reduce UE power used for receiving discovery signals, it is beneficial to minimize a number of OFDM symbols the UE 116 needs to receive while still allowing a large number of discovery signals to be transmitted. There is benefit in ordering the CSI-RS from OFDM symbols according to a number of supported CSI-RS starting from the largest number. An example of this design in illustrated in TABLE 5.

TABLE 5

Second example of second alternative of CSI-RS resource indexing for normal CP, frame structure type 1 and 2

| CSI-RS index | Frequency and time location (k', l') | $n_s$ mod 2 | OCC [$w_0$ $w_1$] |
|---|---|---|---|
| 1 | (0, 2) | 1 | [1 1] |
| 2 | (0, 2) | 1 | [1 −1] |
| 3 | (1, 2) | 1 | [1 1] |
| 4 | (1, 2) | 1 | [1 −1] |
| 5 | (2, 2) | 1 | [1 1] |
| 6 | (2, 2) | 1 | [1 −1] |
| 7 | (3, 2) | 1 | [1 1] |
| 8 | (3, 2) | 1 | [1 −1] |
| 9 | (4, 2) | 1 | [1 1] |
| 10 | (4, 2) | 1 | [1 −1] |
| 11 | (5, 2) | 1 | [1 1] |
| 12 | (5, 2) | 1 | [1 −1] |
| 13 | (6, 2) | 1 | [1 1] |
| 14 | (6, 2) | 1 | [1 −1] |
| 15 | (7, 2) | 1 | [1 1] |
| 16 | (7, 2) | 1 | [1 −1] |
| 17 | (8, 2) | 1 | [1 1] |
| 18 | (8, 2) | 1 | [1 −1] |
| 19 | (9, 2) | 1 | [1 1] |
| 20 | (9, 2) | 1 | [1 −1] |
| 21 | (10, 2) | 1 | [1 1] |
| 22 | (10, 2) | 1 | [1 −1] |
| 23 | (11, 2) | 1 | [1 1] |
| 24 | (11, 2) | 1 | [1 −1] |
| 25 | (2, 5) | 0 | [1 1] |
| 26 | (2, 5) | 0 | [1 −1] |
| 27 | (3, 5) | 0 | [1 1] |
| 28 | (3, 5) | 0 | [1 −1] |
| 29 | (8, 5) | 0 | [1 1] |
| 30 | (8, 5) | 0 | [1 −1] |
| 31 | (9, 5) | 0 | [1 1] |
| 32 | (9, 5) | 0 | [1 −1] |
| 33 | (2, 5) | 1 | [1 1] |
| 34 | (2, 5) | 1 | [1 −1] |
| 35 | (3, 5) | 1 | [1 1] |
| 36 | (3, 5) | 1 | [1 −1] |
| 37 | (8, 5) | 1 | [1 1] |
| 38 | (8, 5) | 1 | [1 −1] |
| 39 | (9, 5) | 1 | [1 1] |
| 40 | (9, 5) | 1 | [1 −1] |

It is noted that the principles described here can easily extend to other CSI-RS resource mapping defined in LTE Rel-10/11 (that is, mapping for extended CP and for other TDD mapping). It is also noted that the methods described here can easily extend to mapping of CSI-RS resources of multiple sub-frame configurations to CSI-RS indices, that is, the CSI-RS index is unique for CSI-RS resources from multiple sub-frame configurations. The CSI-RS index mapping can be applied for a DRS timing configuration which is associated with a group of DRS occasions or a group of CSI-RS resources.

In another approach to reduce the CSI-RS search space, the network signals, such as via higher layer signaling, piece-wise ranges of CSI-RS resource positions to be searched by the UE 116. A CSI-RS resource ordering in a sub-frame can be as previously described. For example, the network can signal that CSI-RS resources are from 1 to 5 and from 10 to 20 (assuming the first CSI-RS resource is labeled as 1).

After determining the possible locations for CSI-RS resources, the UE 116 tries to detect a presence of CSI-RS generated according to Section 6.10.5.1 of TS 36.211 V11.3.0, where the CSI-RS scrambling sequence generator is initialized by Equation 1:

$$c_{init}=2^{10} \cdot (7 \cdot (n_s+1)+1+1) \cdot (2 \cdot N_{ID}^{CSI}+1)+2 \cdot N_{ID}^{CSI}+N_{CP} \quad (1)$$

where the definitions of the variables can be found in TS 36.211 V11.3.0. $N_{ID}^{CSI}$ which is the same as the scrambling identity of the CSI-RS as defined in TS 36.331 V11.3.0, takes a value from 0 to 503 (or the scramblingIdentity-rxy above). For each possible CSI-RS resource location, the UE 116 tries to detect a presence of CSI-RS with $N_{ID}^{CSI}$ from 0 to 503 (with non-coherent detection techniques) or with a single indicated $N_{ID}^{CSI}$ value.

In one method to improve CSI-RS detection probability and reduce CSI-RS detection false alarm, the network reduces the possible $N_{ID}^{CSI}$ to be searched by the UE 116. For example, a range of $N_{ID}^{CSI}$ can be signaled, such as by higher layer signaling, given by a starting value and a range value. Alternatively, the UE 116 is signaled by higher layers an explicit set of $N_{ID}^{CSI}$ values.

Certain embodiments illustrate a relationship between the CSI-RS index and $N_{ID}^{CSI}$. The UE 116 is either signaled separately a set CSI-RS indices and a set of $N_{ID}^{CSI}$ to be searched or the UE 116 is configured to assume a valid range for each parameter without signaling. The UE 116 also can be signaled a mapping between a CSI-RS index and a $N_{ID}^{CSI}$ to a PCI (see TABLE 6 & TABLE 6a for two examples), such as via RRC signaling or via a predefined mapping table (cell identification table). Mapping of multiple CSI-RS resources to a PCI is also possible for certain deployment scenarios (such as, CoMP scenario 4 as described in REF 11) (see also TABLE 6b). When the CSI-RS to be searched can be in more than one sub-frame configuration, then the sub-frame configuration also is included in the mapping to PCI as illustrated in TABLE 8 (TABLE 7a and TABLE 7b illustrate when a mapping of multiple CSI-RS resources to a PCI is possible.) In these cases, the UE 116 also can be signaled a set of PCIs and the UE 116 is configured to determine the set of CSI-RS resources to be detected. The reverse is also true, that is, when the UE 116 detects a CSI-RS resource, the UE 116 is configured to determine the PCI detected, that is, the mapping of CSI-RS resource to PCI allows cell identification. When multiple CSI-RS resources are mapped to a PCI, as in CoMP scenario 4, transmission point identification can be achieved by combination of PCI and scrambling id and CSI-RS index.

TABLE 6

Mapping between a CSI-RS index and a $N_{ID}^{CSI}$ to a PCI

| CSI-RS resource | $N_{ID}^{CSI}$ | CSI-RS index | PCI |
|---|---|---|---|
| Resource 1 | Scrambling id 1 | 1 | PCI 1 |
| Resource 2 | Scrambling id 1 | 2 | PCI 2 |
| Resource 3 | Scrambling id 1 | 3 | PCI 3 |
| Resource 4 | Scrambling id 2 | 4 | PCI 4 |
| Resource 5 | Scrambling id 2 | 5 | PCI 5 |
| Resource 6 | Scrambling id 2 | 6 | PCI 6 |

TABLE 6a

Mapping between a CSI-RS index and a $N_{ID}^{CSI}$ to a PCI

| CSI-RS resource | $N_{ID}^{CSI}$ | CSI-RS index | PCI |
|---|---|---|---|
| Resource 1 | Scrambling id 1 | 1 | PCI 1 |
| Resource 2 | Scrambling id 2 | 2 | PCI 2 |
| Resource 3 | Scrambling id 3 | 3 | PCI 3 |
| Resource 4 | Scrambling id 4 | 4 | PCI 4 |
| Resource 5 | Scrambling id 5 | 5 | PCI 5 |
| Resource 6 | Scrambling id 6 | 6 | PCI 6 |

TABLE 6b

Mapping between a CSI-RS index and a $N_{ID}^{CSI}$ to a PCI (multiple CSI-RS resources mapping to a PCI is possible)

| CSI-RS resource | $N_{ID}^{CSI}$ | CSI-RS index | PCI |
|---|---|---|---|
| Resource 1 | Scrambling id 1 | 1 | PCI 1 |
| Resource 2 | Scrambling id 1 | 2 | PCI 1 |
| Resource 3 | Scrambling id 1 | 3 | PCI 1 |
| Resource 4 | Scrambling id 2 | 4 | PCI 2 |
| Resource 5 | Scrambling id 2 | 5 | PCI 2 |
| Resource 6 | Scrambling id 2 | 6 | PCI 2 |

TABLE 7a

Mapping between a CSI-RS sub-frame configuration, a CSI-RS index and a $N_{ID}^{CSI}$ to a PCI (multiple CSI-RS resources mapping to a PCI is possible)

| CSI-RS resource | Sub-frame config | $N_{ID}^{CSI}$ | CSI-RS index | PCI |
|---|---|---|---|---|
| Resource 1 | Sub-frame config 1 | Scrambling id 1 | 1 | PCI 1 |
| Resource 2 | Sub-frame config 1 | Scrambling id 1 | 2 | PCI 1 |
| Resource 3 | Sub-frame config 1 | Scrambling id 1 | 3 | PCI 1 |
| Resource 4 | Sub-frame config 1 | Scrambling id 2 | 4 | PCI 1 |
| Resource 5 | Sub-frame config 1 | Scrambling id 2 | 5 | PCI 1 |
| Resource 6 | Sub-frame config 1 | Scrambling id 2 | 6 | PCI 1 |
| Resource 7 | Sub-frame config 2 | Scrambling id 3 | 1 | PCI 2 |
| Resource 8 | Sub-frame config 2 | Scrambling id 3 | 2 | PCI 2 |
| Resource 9 | Sub-frame config 2 | Scrambling id 3 | 3 | PCI 2 |
| Resource 10 | Sub-frame config 2 | Scrambling id 4 | 4 | PCI 2 |
| Resource 11 | Sub-frame config 2 | Scrambling id 4 | 5 | PCI 2 |
| Resource 12 | Sub-frame config 2 | Scrambling id 4 | 6 | PCI 2 |

TABLE 7b

Mapping between a CSI-RS sub-frame configuration, a CSI-RS index and a $N_{ID}^{CSI}$ to a PCI (multiple CSI-RS resources mapping to a PCI is possible)

| CSI-RS resource | Sub-frame config | $N_{ID}^{CSI}$ | CSI-RS index | PCI | QCL type |
|---|---|---|---|---|---|
| Resource 1 | Sub-frame config 1 | Scrambling id 1 | 1 | PCI 1 | 2 |
| Resource 2 | Sub-frame config 1 | Scrambling id 1 | 2 | PCI 1 | 2 |
| Resource 3 | Sub-frame config 1 | Scrambling id 1 | 3 | PCI 1 | 2 |
| Resource 4 | Sub-frame config 1 | Scrambling id 2 | 4 | PCI 1 | 2 |
| Resource 5 | Sub-frame config 1 | Scrambling id 2 | 5 | PCI 1 | 2 |
| Resource 6 | Sub-frame config 1 | Scrambling id 2 | 6 | PCI 1 | 2 |
| Resource 7 | Sub-frame config 2 | Scrambling id 3 | 1 | PCI 2 | 1 |
| Resource 8 | Sub-frame config 2 | Scrambling id 4 | 2 | PCI 3 | 1 |
| Resource 9 | Sub-frame config 2 | Scrambling id 5 | 3 | PCI 4 | 1 |
| Resource 10 | Sub-frame config 2 | Scrambling id 6 | 4 | PCI 5 | 1 |
| Resource 11 | Sub-frame config 2 | Scrambling id 7 | 5 | PCI 6 | 1 |
| Resource 12 | Sub-frame config 2 | Scrambling id 8 | 6 | PCI 7 | 1 |

TABLE 8

Mapping between a CSI-RS sub-frame configuration, a CSI-RS index and a $N_{ID}^{CSI}$ to a PCI

| CSI-RS resource | Sub-frame config | $N_{ID}^{CSI}$ | CSI-RS index | PCI |
|---|---|---|---|---|
| Resource 1 | Sub-frame config 1 | Scrambling id 1 | 1 | PCI 1 |
| Resource 2 | Sub-frame config 1 | Scrambling id 1 | 2 | PCI 2 |
| Resource 3 | Sub-frame config 1 | Scrambling id 1 | 3 | PCI 3 |
| Resource 4 | Sub-frame config 1 | Scrambling id 2 | 4 | PCI 4 |
| Resource 5 | Sub-frame config 1 | Scrambling id 2 | 5 | PCI 5 |
| Resource 6 | Sub-frame config 1 | Scrambling id 2 | 6 | PCI 6 |
| Resource 7 | Sub-frame config 2 | Scrambling id 3 | 1 | PCI 7 |
| Resource 8 | Sub-frame config 2 | Scrambling id 3 | 2 | PCI 8 |
| Resource 9 | Sub-frame config 2 | Scrambling id 3 | 3 | PCI 9 |
| Resource 10 | Sub-frame config 2 | Scrambling id 4 | 4 | PCI 10 |
| Resource 11 | Sub-frame config 2 | Scrambling id 4 | 5 | PCI 11 |
| Resource 12 | Sub-frame config 2 | Scrambling id 4 | 6 | PCI 12 |

Quasi co-location of PSS/SSS/CRS/DM-RS ports associated with PCI and CSI-RS ports also can be defined using the mapping tables. For example, a CSI-RS resource 1 that is mapped to a PCI 1 means that PSS/SSS/CRS/DM-RS associated with PCI 1 can be assumed by the UE 116 to be quasi co-located with CSI-RS resource 1 in terms of delay spread, Doppler spread, Doppler shift, average gain, and average delay. In another example, a CSI-RS resource 1 that is mapped to a PCI 1 means that PSS/SSS/CRS/DM-RS associated with PCI 1 can be assumed by the UE 116 to be quasi co-located with CSI-RS resource 1 in terms of Doppler shift and average delay. Further signaling support can be provided if there is a need to address deployment scenarios such as CoMP scenario 4. In one approach, Quasi-co-location (QCL) type signaling can be provided to indicate if the QCL linkage between a CSI-RS resource and PSS/SSS/CRS/DM-RS associated with a PCI is based on a first type (Type 1) or a second type (Type 2) (see TABLE 7b). For example:

Type 1: The UE 116 is configured to assume the antenna ports 0-3, 7-14 and ports 15-22 linked by the table are quasi co-located with respect to delay spread, Doppler spread, Doppler shift, and average delay; and Type 2: The UE 116 is configured to assume the antenna ports 0-3, 7-14 and ports 15-22 linked by the table are quasi co-located with respect to Doppler spread and Doppler shift.

QCL linkage can improve reception performance of CSI-RS resource by exploiting the QCL relationship with detected PSS/SSS/CRS/DM-RS and vice versa. The CSI-RS resource can include RSRP measurement based on CSI-RS.

Figures 13A, 13B:
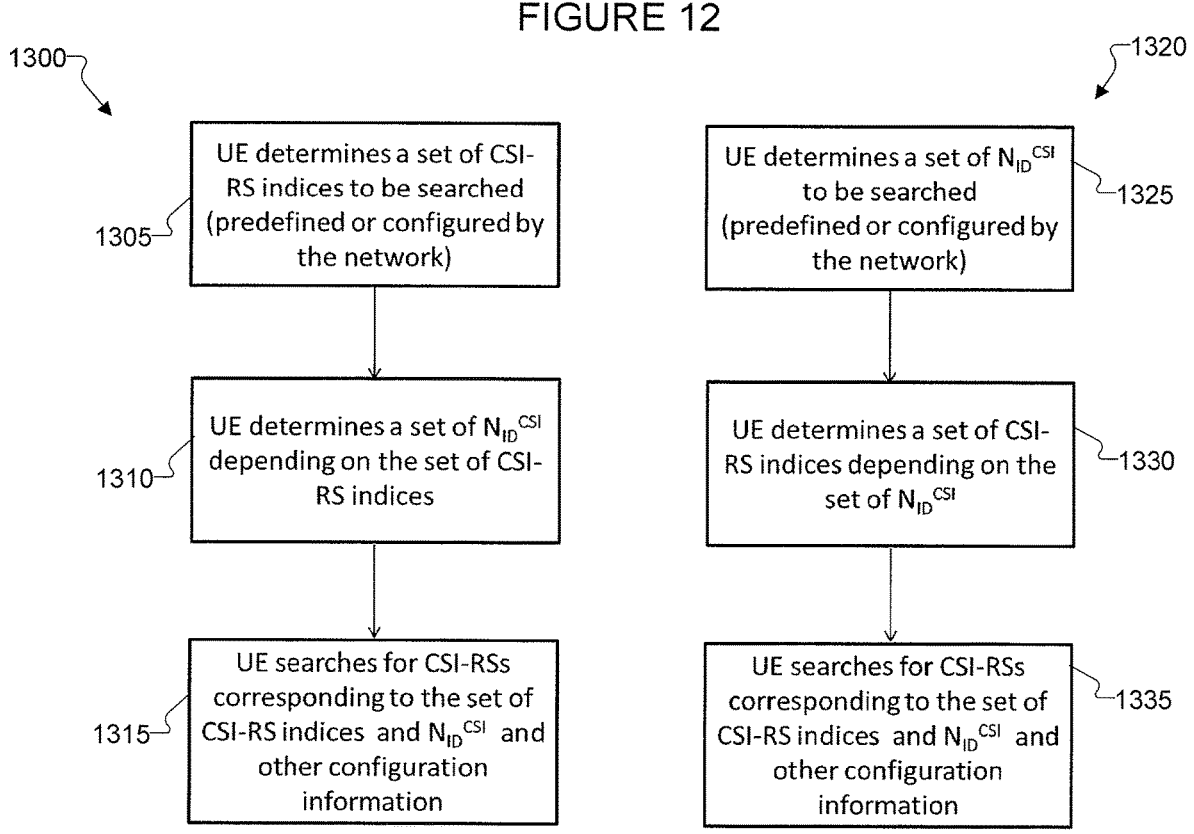
FIG. 13A illustrates a process to determine a set of values to be searched from a set of CSI-RS indices according to this disclosure.
FIG. 13B illustrates a process to determine a set of CSI-RS indices to be searched from a set of values according to this disclosure.

FIG. 13A illustrates a process 1300 to determine as set of values to be searched from a set of CSI-RS indices according to this disclosure. FIG. 13B illustrates a process 1305 to determine a set of CSI-RS indices to be searched from a set of values according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a mobile station or a base station.

In certain embodiments, relation/mapping between CSI-RS index and $N_{ID}^{CSI}$ is defined to save signaling overhead such that the UE 116 is able to determine a set of CSI-RS indices to be searched from the signaling of a set of $N_{ID}^{CSI}$ and vice versa as shown in FIGS. 13A and 13B.

In one method for CSI-RS index and scrambling identity mapping, the CSI-RS index is determined from $N_{ID}^{CSI}$ of the corresponding CSI-RS. Additionally, the possible values for $N_{ID}^{CSI}$ can be determined from a given CSI-RS index. For example, assuming a CSI-RS index labeling as in TABLE 2 or TABLE 4, $N_{ID}^{CSI}$ values that are associated with CSI-RS index i can be determined by $N_{ID}^{CSI}$ mod N=i, where N is a maximum possible value for i (such as N=40). The network can either signal a range or a set of $N_{ID}^{CSI}$ values to be detected by a UE 116, as well as the sub-frame configuration. In block 1305, the UE 116 is configured to determine a set of CSI-RS resources in the corresponding sub-frames for detection and measurement. In block 1310, the network signals a range or a set of CSI-RS indices to be detected by the UE 116 as well as the sub-frame configuration. The UE 116 also is configured to determine the scrambling identities (e.g., $N_{ID}^{CSI}$) to attempt CSI-RS detection for a given CSI-RS index in block 1325. Extension of this method to map CSI-RS index defined uniquely over multiple sub-frame configurations to $N_{ID}^{CSI}$ in block 1330. The mapping of CSI-RS index over multiple sub-frame configurations to $N_{ID}^{CSI}$ is straightforward. This method has an advantage of reducing the CSI-RS searching complexity for the UE 116 in block 1335, improving detection performance by reducing the number of candidates as well as reducing signaling over X2 or between the eNB 103 and the UE 116. If N is less than the number of possible values for $N_{ID}^{CSI}$ there is more than one $N_{ID}^{CSI}$ value that is mapped to a same CSI-RS index, e.g. if N=40 and the number of possible values for $N_{ID}^{CSI}$ is 504, there are 12 or 13 possible $N_{ID}^{CSI}$ values for each CSI-RS index. The UE 116 can blindly detect $N_{ID}^{CSI}$ of the CSI-RS corresponding to the CSI-RS index in block 1315.

Configuration of ZP-CSI-RS

In certain embodiments, the resource elements configured, or potentially configured, for CSI-RS transmission are configured by the network to be zero-power CSI-RS resources for UEs, such that UE 116 does not assume an existence of other useful physical signals in the corresponding resource elements. Symbols for physical channels, such as PDSCH and EPDCCH, are not mapped onto the configured zero-power CSI-RS resources.

Methods of Network Signaling

In certain embodiments, for all methods of CSI-RS detection configuration, configuration messages are delivered in a UE-dedicated RRC signaling. Alternatively, to enable CSI-RS detection for a UE in RRC idle mode, configuration messages are delivered in a broadcast channel (as part of an existing or new System Information Block).

On Demand Measurement Report Request

Certain embodiments provide, for all methods of CSI-RS detection configuration, support for on-demand measurement report request to allow the network the flexibility to obtain an up-to-date measurement report in a timely manner, such as for deciding if a cell that has been in dormant state, but is still transmitting the discovery signal, should be turned on or not. To enable this on-demand measurement reporting, the UE 116 can be signaled a request to prepare for an on-demand measurement report via paging or dynamic control channel (PDCCH/EPDCCH). Upon receiving the request, a discovery signal is expected by the UE 116 to be transmitted in a predetermined later time (such as 10 ms after the reception of the request). The timing of the discovery transmission upon reception of a request can either be predefined (fixed) or can be configurable by the network. The UE 116 is configured to attempt to detect and measure the discovery signals at the time determined and report its measurement results and the identities of the discovery signals detected.

Handover

In certain embodiments, for all methods of CSI-RS detection configuration, configuration messages are also included in a handover command. Therefore, the UE 116 is able to perform CSI-RS detection as soon as possible during or after a handover procedure.

CSI-RS Resource or TP Identification in UE Measurement Report

Certain embodiments, for all methods of CSI-RS or TP detection configuration, define how an identity of a CSI-RS resource or TP is defined in a measurement report. Depending upon a method of CSI-RS detection configuration and procedure, an identity of a CSI-RS resource (which allows the network to identify uniquely the cell detected) to be included in the measurement report can be different.

When a CSI-RS resource is uniquely identified by its CSI-RS resource configuration (resourceConfig-rxy), its scrambling identity (scramblingIdentity-rxy) and its OCC index (such as Method 1 of CSI-RS detection configuration), the UE 116 reports the CSI-RS resource configuration, the scrambling identity and OCC index, together with the measurement result (e.g. RSRP/RSRQ), in a measurement report for the detected CSI-RS.

When a CSI-RS resource is uniquely identified only by its CSI-RS index (such as, Method 2 of CSI-RS detection configuration), the UE 116 reports the CSI-RS index and the corresponding measurement results. The measurement results can be, for example, the RSRP/RSRQ.

When the network ensures that scrambling identities (or virtual cell id) of every CSI-RS that can be detected by the UE 116 are different, the UE 116 reports the scrambling identity and the corresponding measurement results, such as RSRP/RSRQ. When the scrambling identities can be reused in different group of CSI-RS resources (representing different small cell cluster or a different group of transmission points in CoMP scenario 4) (that is, a CSI-RS scrambling identity is only unique within a CSI-RS group), the PCI of the PSS/SSS used as coarse time and frequency synchronization for the CSI-RS detection also is reported. Alternatively, the CSI-RS group index can be reported. In another alternative, the sub-frame configuration of the detected CSI-RS can be reported.

In certain embodiments, the CSI-RS resource is uniquely identified by a combination of its CSI-RS index and its scrambling identity. In this case, the UE 116 reports the CSI-RS index as well as the scrambling identity and the corresponding measurement results, such as RSRP/RSRQ. If a mapping between a combination of a CSI-RS index and a scrambling identity to a PCI is commonly known at the eNB 103 and the UE 116, via RRC signaling or via a predetermined mapping table (TABLE 6), then the UE 116 can just report the PCI and the corresponding measurement results, such as RSRP/RSRQ.

In certain embodiments, the CSI-RS resource is uniquely identified by a combination of its CSI-RS index, its scrambling identity and its sub-frame configuration. In this case, the UE 116 reports the CSI-RS index, the scrambling identity, the sub-frame configuration and the corresponding measurement results, such as RSRP/RSRQ. If a mapping between a combination of a CSI-RS index, a scrambling identity and sub-frame configuration to a PCI is commonly known at the eNB 103 and the UE 116, via RRC signaling or via a predetermined mapping table (TABLE 8), then the UE 116 is configured to report the PCI and the corresponding measurement results, such as RSRP/RSRQ.

When the above unique identification is only valid within a group of cells and CSI-RS detection configurations for more than one group can be configured, then the identity of the group or clusters also is included in the measurement report. The measurement report can include, for example, CSI-RS-CommonConfigNZPId-rxy of Method 1 or CSI-RS-GroupConfigNZPId-rxy of Method 2, as described above.

In certain embodiments, for all the above CSI-RS resource identification methods, when mapping of a CSI-RS resource identity and PCI is provided, via RRC signaling or via a predetermined mapping table, the UE 116 is configured to just report the PCI and the corresponding measurement results, such as RSRP/RSRQ, when the mapping is one-to-one. Otherwise, the UE 116 is configured to report additional information pertaining to the CSI-RS resource, which also needs to be reported. That is, the UE 116 can report the CSI-RS index, a CSI-RS scrambling id, a virtual id, or a combination thereof.

In certain embodiments, a CSI-RS resource id or a TP id can be uniquely assigned to each CSI-RS resource or TP, as shown in the first column of TABLE 6, TABLE 6a, TABLE 6b, TABLE 7a, TABLE 7b and TABLE 8. The UE 116 is configured to just report CSI-RS resource id or TP id and the corresponding measurement results, such as RSRP/RSRQ.

In certain embodiments ("Embodiment 2"—Time and frequency reference for CSI-RS): when significant time and/or frequency offsets are present at a receiver in UE 116 when receiving a signal, the receiver performance will be degraded if the offsets are not compensated. In general, it may not be possible for a network to ensure that CSI-RS detectable by the UE 116 are synchronized sufficiently in time (such as <±3 μs) and/or frequency (such as <±0.1 ppm) with respect to the serving cell in order to meet the minimum performance requirement for detection and measurement. However, it is possible that a group of cells interconnected with high capability backhaul, such as a fiber optic connection or the like, can be sufficiently synchronized to a reference cell, which may not be the serving cell of the UE 116. Therefore, in order to facilitate accurate detection and measurement performance by the UE 116, embodiments of the present disclosure provide a reference cell for synchronization for either time or frequency or both time and frequency, that the UE 116 is configured to assume when measuring a CSI-RS signal. In one option, the UE 116 is configured to assume that a target cell and its reference cell are synchronized to an extent to provide sufficiently accurate RRM measurement. For example, a timing difference is within <±3 μs and frequency difference is within +0.1 ppm. However, the synchronization of the target cell and its reference cell may not be enough to meet the minimum performance requirement for data demodulation or the signals from the target cell and its reference cell may not be assumed to quasi co-located in terms of some large scale channel properties, which includes one or more of delay spread, Doppler spread, Doppler shift, average gain, and average delay. For example, the UE 116 is configured to assume that the signals from the target cell and its reference cell are only quasi co-located in terms of Doppler shift and average delay. In another option, the UE 116 is configured to assume that the target cell and its reference cell are synchronized to an extent that can meet the minimum performance requirement for data demodulation. Alternatively, the UE 116 is configured to assume that the signals from the target cell and its reference cell are quasi co-located in terms of some large scale channel properties, which includes one or more of delay spread, Doppler spread, Doppler shift, average gain, and average delay.

In certain deployment scenarios, such as a clustered small cell deployment, the UE may only reliably detects few small cells using PSS/SSS/CRS. In certain embodiments, a small cell, such as FBS 160, that cannot be easily detected by the UE 116, transmits CSI-RS to facilitate detection by the UE 116. Typically, small cells in a cluster can be sufficiently synchronized in time and/or frequency. Therefore, UE 116 is configured to use one or multiple PSS/SSS/CRSs detected from any small cells in the cluster as the reference for detecting a CSI-RS of a small cells that otherwise cannot be detected by the UE 116 through only PSS/SSS/CRS. When more than one reference PSS/SSS/CRS for a CSI-RS are detected, the UE 116 uses the strongest PSS/SSS/CRS signals as the reference or combines the reference signals detected to derive the reference time/frequency. As such, in certain embodiments for the cell discovery procedure, UE 116 is configured to assume multiple signals are transmitted, where a first signal or signals is the PSS/SSS/CRS, and the second signal is the CSI-RS (or other physical signals that can replace CSI-RS).

Figure 14:
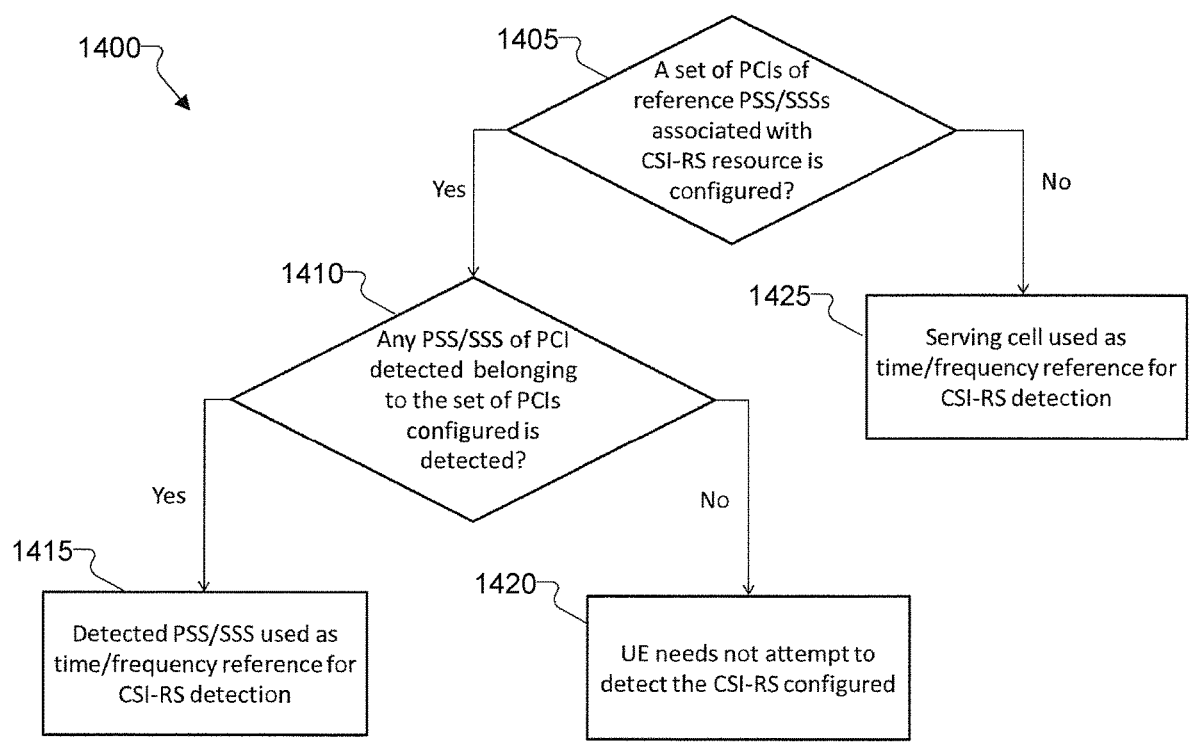
FIG. 14 illustrates a UE process for determining a reference time or reference frequency for CSI-RS detection according to this disclosure.

FIG. 14 illustrates a UE process 1400 for determining a reference time or reference frequency for CSI-RS detection according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a receiver chain or processing circuitry in, for example, a mobile station.

In one method, the network provides a physical cell identity or a set of physical cell identities of the reference PSS/SSS for each or for a set of CSI-RS resources to be detected by UE 116. The set of CSI-RS resources to be searched by a UE can be as described herein above in Embodiment 1, with respect to FIGS. 5 through 9. The PCIs of the reference PSS/SSS/CRS can be the same as the PCIs associated with the CSI-RS resources to be searched, such as illustrated in TABLE 6. For example, the PCI of the reference PSS/SSS/CRS for each CSI-RS resource can be the same as the PCI associated with the CSI-RS resource such as illustrated in TABLE 6, TABLE 6a, TABLE 6b, TABLE 7a, TABLE 7b and TABLE 8. In another example, the set of PCIs of the reference PSS/SSS/CRS for each CSI-RS resource can be the same as all or a subset of PCIs included in the mapping table such as illustrated in TABLE 6a, TABLE 6b, TABLE 7a, TABLE 7b and TABLE 8, which can be advantageous if all CSI-RS resources are from the same cell cluster and hence are approximately synchronized (for example, the reference PSS/SSS/CRS and the corresponding CSI-RS are quasi co-located in terms of average delay and Doppler shift). If cell clusters are separated by the sub-frame configuration, then the PCIs of the reference PSS/SSS/CRS for a cell can be the same as the PCIs associated with CSI-RS resources belonging to the same sub-frame configuration. For example, referring to TABLE 9, PCI 1-6 are the references for any CSI-RS resource 1-6 and PCI 7-12 are the references for any CSI-RS resource 7-12. The PCIs of reference PSS/SSS/CRS also can be explicitly signaled by the network, such as via RRC, as shown in TABLE 9, where each CSI-RS resource has a set of reference PCIs. Another example is illustrated in TABLE 10a in which the RRC signaling indicates the mapping of a set of CSI-RS resources to a set of reference PCIs. Another example is illustrated in TABLE 10b in which the RRC signaling indicates the mapping of a set of CSI-RS resources to a single reference PCI. The example shown in TABLE 10b can be suitable for deployment scenarios where multiple transmission points are associated with the same PCI (such as CoMP scenario 4).

TABLE 9

| Reference PCIs signaling | |
| --- | --- |
| CSI-RS resource | Reference PCIs |
| 1 | 1-6 |
| 2 | 1-6 |
| 3 | 1-6 |
| 4 | 1-6 |
| 5 | 1-6 |
| 6 | 1-6 |
| 7 | 7-12 |

TABLE 9-continued

| Reference PCIs signaling | |
| --- | --- |
| CSI-RS resource | Reference PCIs |
| 8 | 7-12 |
| 9 | 7-12 |
| 10 | 7-12 |
| 11 | 7-12 |
| 12 | 7-12 |

TABLE 10a

| Reference PCIs signaling | |
| --- | --- |
| CSI-RS resource | Reference PCIs |
| 1-6 | 1-6 |
| 7-12 | 7-12 |

TABLE 10b

| Reference PCIs signaling | |
| --- | --- |
| CSI-RS resource | Reference PCIs |
| 1-6 | 1 |
| 7-12 | 2 |

In block 1405, the UE 116 is configured with a set of PCIs of reference PSS/SSS/CRSs associated with CSI-RS resource. Upon receiving the signaling of the reference PSS/SSS/CRS PCIs for a CSI-RS resource in block 1405, the UE 116 is configured to assume a same time and/or frequency reference for receiving a corresponding CSI-RS based on PSS/SSS/CRSs detected with a same PCI (for example, the reference PSS/SSS/CRS and the corresponding CSI-RS are quasi co-located in terms of average delay and Doppler shift). When more than one reference PSS/SSS/CRS for a CSI-RS are detected in block 1410, the UE 116 can use the strongest PSS/SSS/CRS signals as the reference or combine the reference signals detected to derive the reference time/frequency in block 1415. For example, UE 116 can use PSS/SSS detected for coarse time synchronization, and use CRS detected for coarse frequency synchronization. When none of PSS/SSS/CRS of indicated PCIs has been detected by the UE 116 in block 1410, the UE 116, in block 1420, does not attempt to detect the CSI-RS configured. That is, in block 1420, the UE 116 can skip detecting corresponding CSI-RS resources as this may imply that the cells concerned belong to small cells that are beyond coverage from where the UE 116 is located. This is the case if one or more cell within a cluster always exists to transmit the PSS/SSS(/CRS) or if the PSS/SSS/CRS are part of the DRS as shown in FIGS. 5 through 9. When the UE 116 is not configured with the reference PSS/SSS/CRS PCIs for a CSI-RS resource in block 1405, the UE 116 proceeds to block 1425 and uses the eNB 103 (the serving cell) as a time/frequency reference for CSI-RS detection.

Figure 15:
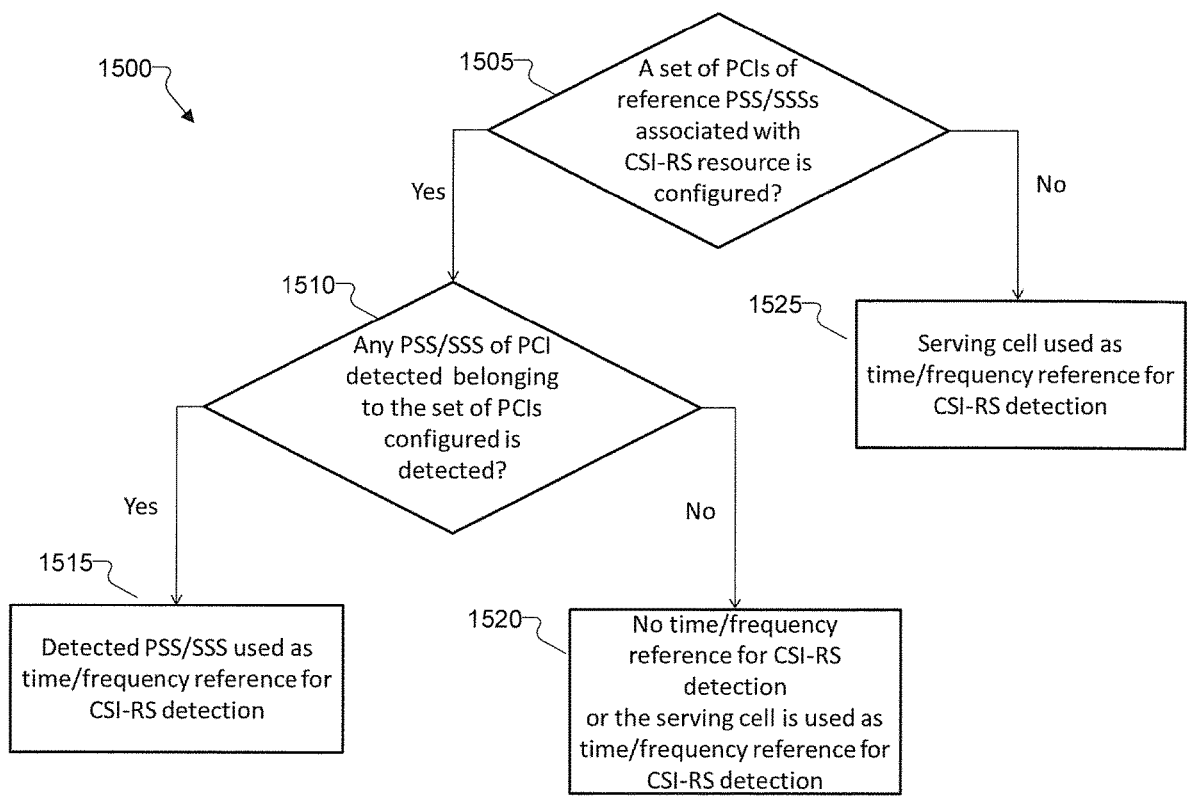
FIG. 15 illustrates another UE process for determining a reference time or reference frequency for CSI-RS detection according to this disclosure.

FIG. 15 illustrates 1500 another UE process for determining a reference time or reference frequency for CSI-RS detection according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a receiver chain or processing circuitry in, for example, a mobile station.

In a second scenario, the UE 116 is configured with a set of PCIs of reference PSS/SSS/CRSs associated with CSI-RS resource in block 1505. The UE 116 attempts to detect PSS/SSS of PCI belonging to the set of PCIs in block 1510. When more than one reference PSS/SSS/CRS for a CSI-RS are detected in block 1510, the UE 116 can use the strongest PSS/SSS/CRS signals as the reference or combine the reference signals detected to derive the reference time/frequency in block 1515. For example, UE 116 can use PSS/SSS detected for coarse time synchronization, and use CRS detected for coarse frequency synchronization. When not detecting any PSS/SSS/CRS of indicated PCIs in block 1510, which may mean that all the cells concerned are currently in dormant mode, the UE 116 is configured to not assume any reference for the CSI-RS resources in block 1520. Alternatively in block 1520, the serving cell can be used as the time/frequency reference for the CSI-RS resources, or that the appropriate assumption can be configurable by the network. To support both the first and the second scenarios, the UE 116 is configured to detect CSI-RS without a time/frequency reference or using the serving cell as the reference if none of PSS/SSS/CRS of reference PCIs has been detected by the UE 116. Alternatively, to support both the first and the second scenarios, network signaling can be provided to assist the UE 116 in distinguishing the two scenarios. For example, signaling can be provided to indicate that currently all the cells concerned are OFF or in dormant mode, in which case the UE 116 is required to detect the CSI-RS resources even though none of PSS/SSS/CRS of reference PCIs has been detected by a UE 116. Finally, if a reference PSS/SSS/CRS PCI is not signaled in 1505, the UE 116 is configured to assume that time and/or frequency reference follows that of the serving cell in 1525. The method also provides benefits for the network by enabling the network to determine CSI-RS resources for detection to be configured to a UE by the PCI reported by the UE 116.

In certain embodiments, the UE 116 is configured to implement a CSI-RS detection algorithm that allows the UE 116, configured with one or more time/frequency references, to skip coarse synchronization and detect the CSI-RS without a time/frequency reference. In one example, the UE 116 is configured to maintain a timer that determines the time window during which previously obtained coarse time/frequency synchronization is assumed to remain valid and during which the UE 116 can directly attempt to detect CSI-RS resources without a reference.

In certain embodiments, the UE 116 is configured to implement a CSI-RS detection algorithm that allows the UE 116, configured with one or more CSI-RS resources, to skip detection of CSI-RS or time/frequency reference resources depending upon previously detected IDs associated with CSI-RS resources or detected time/frequency reference signals. In one method, the UE 116 is configured to determine whether to skip detection of CSI-RS resources based on the received signal quality (e.g. RSRP) of the previously detected CSI-RS resources and/or time/frequency reference signals. In another method, the UE 116 is configured to determine whether to skip detection of CSI-RS resources based on the identity of the previously detected CSI-RS resources and/or time/frequency reference signals. In one example, if the UE 116 detects any of the reference PCIs within a set as configured in TABLE 9, the UE 116 is configured to not attempt to detect CSI-RS resources corresponding to a different set of reference PCIs. In a second example, if the UE 116 detects any of the CSI-RS resources corresponding to a set of reference PCIs in TABLE 9, the UE 116 is configured to not attempt to detect CSI-RS resources corresponding to a different set of reference PCIs. This alternative is beneficial in reducing UE power consumption by skipping the detection of CSI-RS or time/frequency references which are highly probable to fall below a desired reception quality. For example the UE 116 can be configured to detect resources corresponding to two geographically separated small cell clusters of which the UE 116 can typically only acquire the resources of the closest cluster.

When the UE 116 reports the discovery signals detected, the UE 116 includes the PCI, or reference PSS/SSS or PCI set indicator, used for reference of detection, such as the strongest one, as well as information pertaining to the detected CSI-RS resource, such as CSI-RS scrambling id, virtual id, CSI-RS index, sub-frame configuration, or a combination thereof, in the UE report. Inclusion of reference PCI in the report allows differentiation of CSI-RS resource that could be reused in multiple cell clusters. If a CSI-RS resource id or a TP id is uniquely assigned to each CSI-RS resource or TP, then the UE 116 can report the detected CSI-RS resource id or TP id and the corresponding measurement results, such as RSRP/RSRQ.

Embodiments of the above methods also are applicable if another physical signal is used instead of CSI-RS. For example, the other physical signal can include a PRS, a new synchronization signals, and the like.

An example of ASN.1 code (based on Method 1 of Embodiment 1) where ss-refList-rxy refers to the list of reference primary/secondary synchronization signals is:

```
-- ASN1START
CSI-RS-ConfigNZP-rxy ::=          SEQUENCE {
    csi-RS-ConfigNZPId-rxy                CSI-RS-ConfigNZPId-rxy,
    resourceConfig-rxy                    INTEGER (0..31),
    Sub-frameConfig-rxy                   INTEGER (0..154),
    scramblingIdentity-rxy                INTEGER (0..503),
    orthogonalCoverCodeIndex-rxy  INTEGER (0..1),
    ss-refList-rxy                        PhysCellIdRange,
    ...
}
-- ASN1STOP
``` ss-refList-rxy can be a common configuration for a group of cells if the network can ensure the time and/or frequency is sufficiently synchronized for all cells in the group. In this case, ss-refList-rxy can be included in CSI-RS-GroupConfigNZP-rxy or CSI-RS-CommonConfigNZP-rxy in Embodiment 1.

Figure 16:
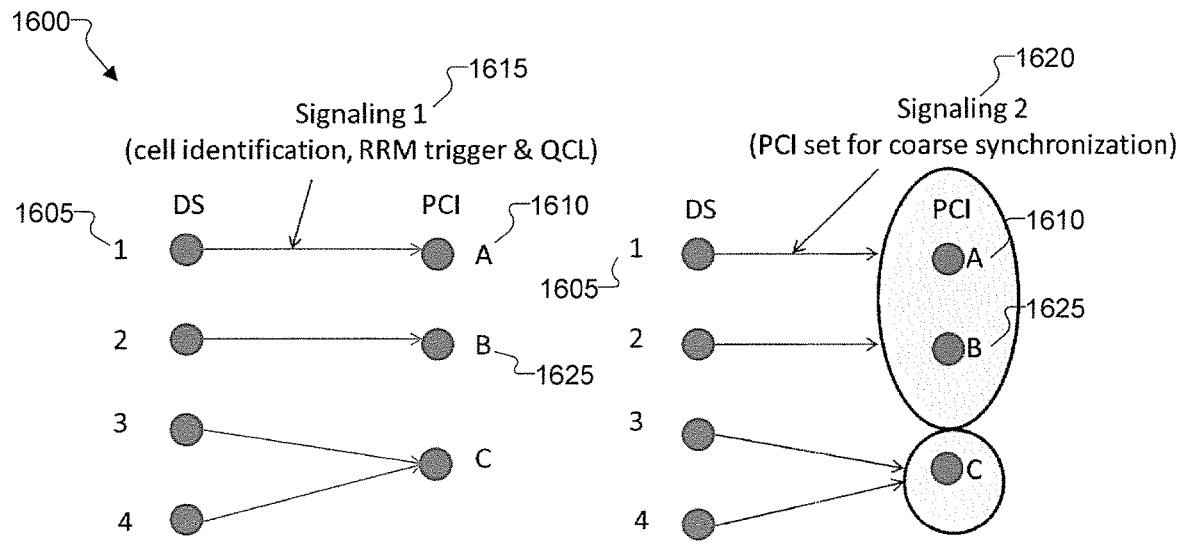
FIG. 16 illustrates signaling for DRS according to this disclosure.

FIG. 16 illustrates signaling for DRS according to this disclosure. The embodiment of the DRS signaling 1600 shown in FIG. 16 is for illustration only. Other embodiments could be used without departing from the scope of the present disclosure.

In certain embodiments, the CSI-RS to PCI mapping signaling, as illustrated in Embodiment 1 with respect to FIGS. 5 through 9 and referred to as Signaling-1, can be separate from the signaling of PSS/SSS/CRS for coarse synchronization purpose as proposed in Embodiment 2, which also is referred to as Signaling-2. However, a physical relationship exists between the two signaling types. For example, if a PCI is linked with a CSI-RS resource based on Signaling-1, then the same PCI should also be included in Signaling-2. That is, DS-1 1605 is linked with PCI-A 1610 in Signaling-1 1615 and Signaling-2 1620. However the reverse is not necessarily true. That is, although DS-1 1605 is not linked with PCI-B 1625 in Signaling-1 1615, DS-1 1605 is linked with PCI-B 1625 in Signaling-2 1620.

In certain embodiments, to simplify network signaling, only Signaling-2 1620 is provided by the network. To largely achieve the purpose for Signaling-1 1615 from Signaling-2 1620, the UE 116 attempts to search for all cells with PCIs associated with a discovery signal via Signaling-2 1620 upon detection of the discovery signal (where a reference PCI has been beforehand). CRS-based RRM measurement procedure is triggered upon detection of the associated PCIs. However, the UE 116 may not be able to assume full QCL between the discovery signal and the associated PSS/SSS/CRS due to the lack of Signaling-1 1615. Nonetheless, since the discovery signal is mainly for cell detection and RRM purpose, the lack of full QCL assumption support may not result in significant system performance degradation.

Figure 17:
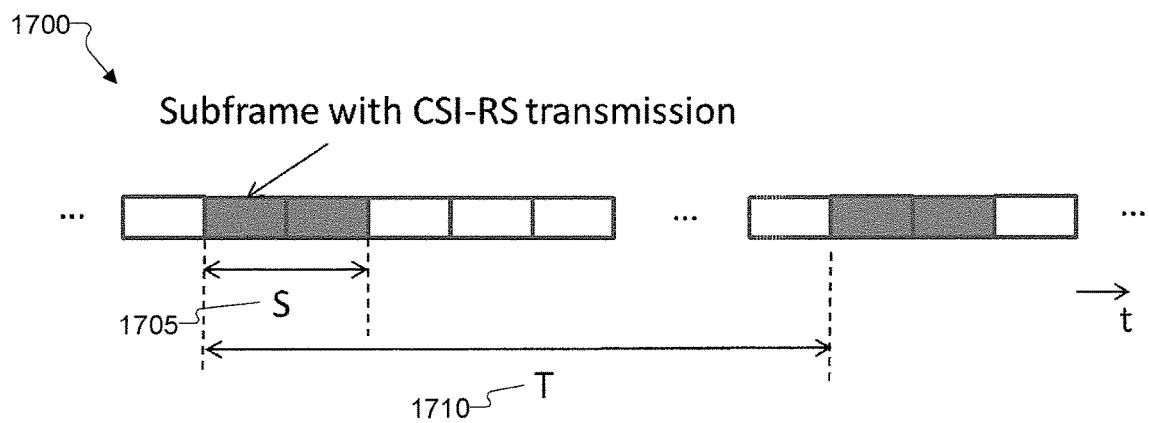
FIG. 17 illustrates consecutive sub-frame CSI-RS transmissions with periodicity of T sub-frames according to this disclosure.

FIG. 17 illustrates consecutive sub-frame CSI-RS transmissions with periodicity of T sub-frames according to this disclosure. The embodiment of the consecutive sub-frame CSI-RS transmissions 1700 shown in FIG. 17 is for illustration only. Other embodiments could be used without departing from the scope of the present disclosure.

Certain embodiments (also referenced as "Embodiment 3"—CSI-RS enhancement), increase the RE density for CSI-RS transmission to improve a detection probability and a measurement accuracy. Increasing RE density for CSI-RS transmission to improving a detection probability and measurement accuracy is particularly beneficial if the CSI-RS is also used to signal a quality measurement such as RSRP/RSRQ. For LTE Rel-10/11, the CSI-RS is transmitted periodically as determined by the sub-frame configuration.

In certain embodiments, to enhance detectability and measurement accuracy of CSI-RS, the CSI-RS transmission at the same time and frequency location is repeated for S consecutive sub-frames 1705. The S consecutive sub-frames 1705 with CSI-RS transmission occur periodically with a period T 1710. Values for S and T can either be predefined or configurable by a network. The CSI-RS RE mapping for a PRB can be either the LTE Rel-10/11 mapping or an enhanced frequency density mapping as described in Embodiment 1.

Figure 18:
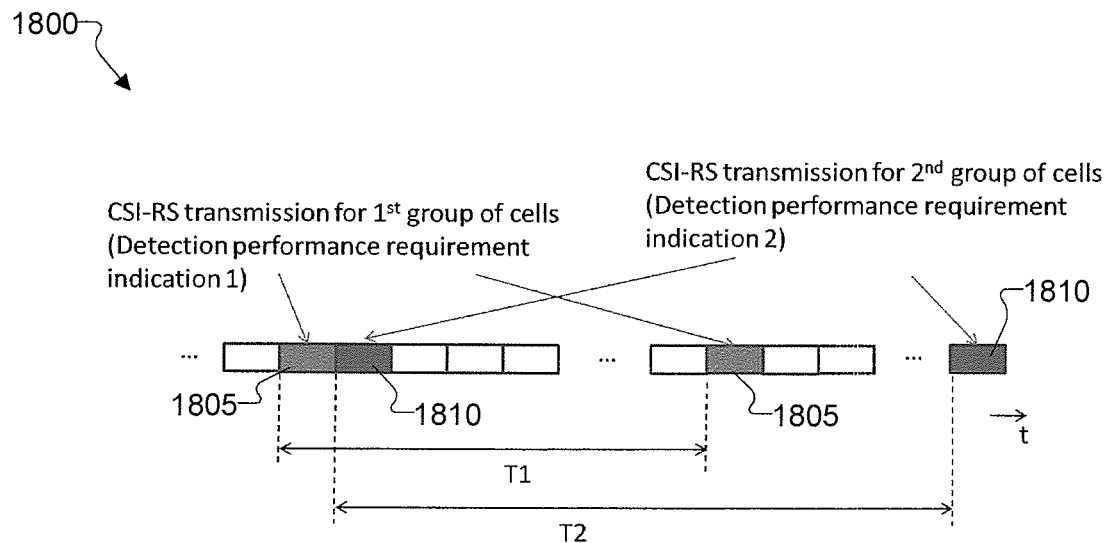
FIG. 18 illustrates a set of CSI-RS resources subject to different cell detection performance requirements according to this disclosure.

FIG. 18 illustrates a set of CSI-RS resources subject to different cell detection performance requirements according to this disclosure. The embodiment of the set of CSI-RS resources 1800 shown in FIG. 18 is for illustration only. Other embodiments could be used without departing from the scope of the present disclosure.

Certain embodiments (referenced as "Embodiment 4") provide CSI-RS resource-specific performance requirement indication. A cell detection performance requirement is defined by cell detection latency conditioned on a cell's signal quality satisfying a predefined criterion. Depending upon a location of the UE 116 in the cellular network 100, the UE 116 may not need to detect all CSI-RS with a same latency. For example, if the UE 116 is able to detect cells in a 1$^{st}$ group 1805 and is able to detect cells in a 2$^{nd}$ group 1810, where the 1$^{st}$ group of cells and 2$^{nd}$ group of cells are geographically clustered together separately, and the UE 116 is physically located among the cells in the 1$^{st}$ group, the cell detection performance requirement for the 2nd group of cells 1810 can be more relaxed compared to that of the first group of cells 1805. This knowledge of group-specific performance requirement is useful for UE 116 to optimize its signal processing resources by prioritizing detection of the 1$^{st}$ group of cells. Embodiments of the present disclosure provide a system and method to indicate this information to the UE 116.

Figure 19:
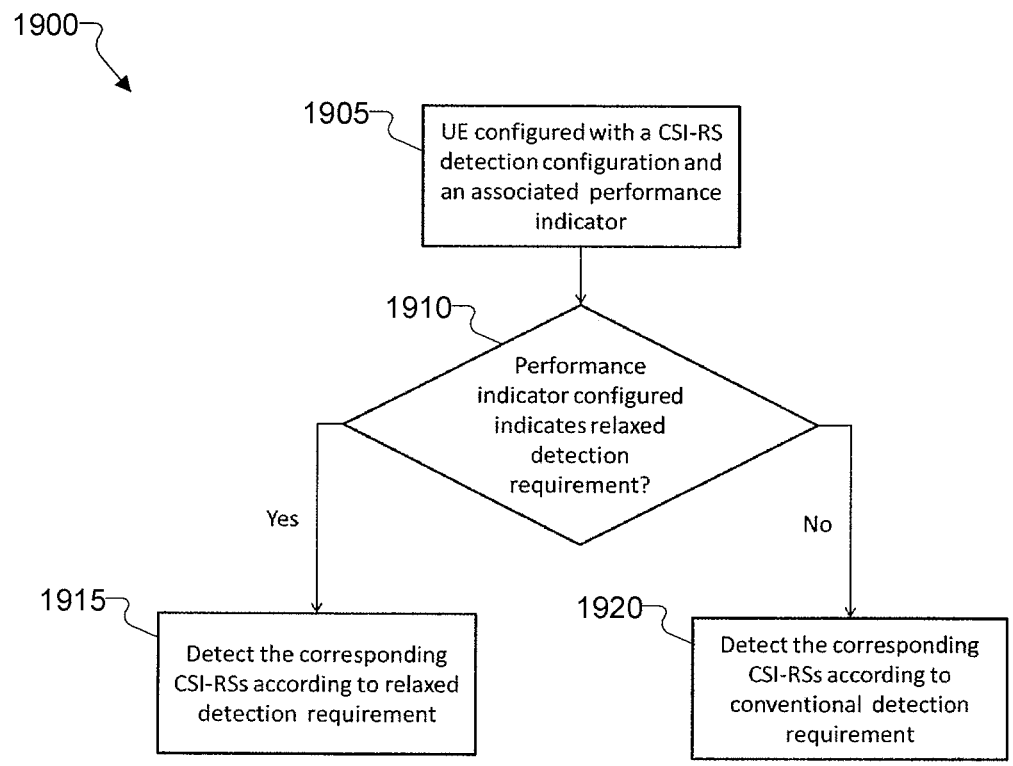
FIG. 19 illustrates a process to determine CSI-RS resource specific performance requirements according to this disclosure.

FIG. 19 illustrates a process 1900 to determine CSI-RS resource specific performance requirements according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a receiver chain or processing circuitry in, for example, a mobile station.

In certain embodiments, the UE 116 is signaled a detection performance requirement indicator for a subset of configured CSI-RS resources in block 1905. For example (referring to Method 2 of Embodiment 1), a performance indicator (performanceIndicator-rxy) can be included in CSI-RS-GroupConfigNZP-rxy. An example ASN.1 code is shown below. The performance indicator value can take a value of either 0 or 1 where 0 means that normal performance requirement is applied for a detection of a corresponding CSI-RS and 1 means that a relaxed performance requirement is applied. In block 1910, the UE 116 determines whether the performance indicator indicates a relaxed detection requirement. For example, the UE 116 can determine whether the performance indicator value is 0 or 1. In certain embodiments, a CSI-RS group Id (csi-RS-GroupConfigNZPId-rxy) can be used as a performance requirement indicator. For example, the smallest group Id means that normal performance requirement is applied for a detection of a corresponding CSI-RS while any other value means that relaxed performance requirement is applied. In certain embodiments, the performance requirement can be implicity determined by the UE 116. Based on the UE 116 determination in block 1910, the UE 116 detects the corresponding CSI-RSs according to a relaxed detection requirement in block 1915 or detects the corresponding CSI-RSs according to a conventional detection requirement in block 1920. In one example, the UE 116 can apply a performance requirement to a set of CSI-RS resources based on the CSI-RS configuration, including sub-frame configuration. In a second example the performance requirement can be applied differently based on the current UE state, including whether the UE is RRC_CONNECTED or RRC_IDLE or depending on the level of mobility. The example ASN.1 code is:

| | |
|---|---|
| -- ASN1START | |
| CSI-RS-GroupConfigNZP-rxy ::= | SEQUENCE { |
|     csi-RS-GroupConfigNZPId-rxy | CSI-RS-GroupConfigNZPId-rxy, |
|     Sub-frameConfig-rxy | INTEGER (0..154), |
|     performanceIndicator-rxy | INTEGER (0..1), |
|     ... | |
| } | |
| -- ASN1STOP | |

Figure 20:
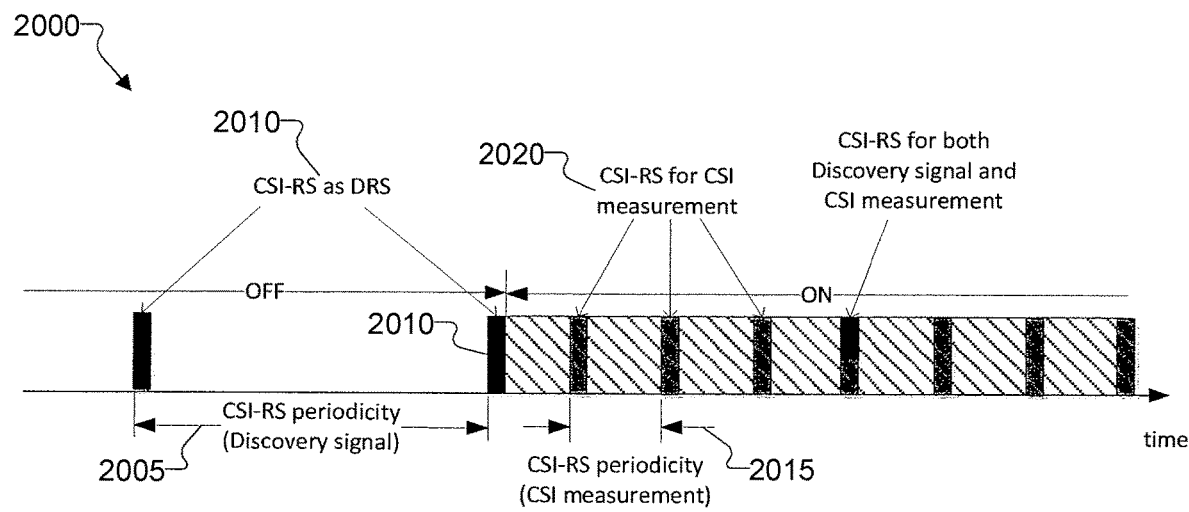
FIG. 20 illustrates a CSI-RS for discovery signal and CSI-RS for CSI measurement according to this disclosure.

FIG. 20 illustrates a CSI-RS for discovery signal and CSI-RS for CSI measurement according to this disclosure. The embodiment of the CSI-RS 2000 shown in FIG. 20 is for illustration only. Other embodiments could be used without departing from the scope of the present disclosure.

Certain embodiments (referenced as "Embodiment 5") provide a relationship of CSI-RS as discovery signal and CSI-RS for CSI measurement. An advantage for using CSI-RS as discovery signal is that it is a backward compatible solution since CSI-RS as discovery signal can be configured as zero-power CSI-RS resources for legacy UEs. CSI-RS based discovery signal results in lower overall RS overhead when discovery signal is configured for an ON cell since the CSI-RS as discovery signal can be a part of CSI-RS for CSI measurement purpose. The relationship of CSI-RS for discovery signal and the CSI-RS for CSI measurement is shown in the example illustrated in FIG. 20, where the periodicity 2005 of CSI-RS 2010 for discovery signal can be configured by the network to be an integer multiple of the CSI-RS periodicity 2015 for CSI measurement 2020. However, from a perspective of the UE 116, the configuration for the two types of CSI-RS still can be independent. In one example, the number of ports configured for CSI-RS of DRS and for CSI-RS for CSI measurement can be different. For example, 2 ports can be configured for CSI-RS for DRS and 4 ports can be configured for CSI-RS for CSI measurement. When the CSI-RS of a multi-sub-frame DRS occasion is transmitted in multiple sub-frames of the same DRS occasion, the UE 116 uses the additional CSI-RS resources to improve the CSI measurement.

Certain embodiments (referenced as "Embodiment 6") provide DRS configuration information. A DRS configuration for a frequency can include information for a set of DRS occasions that share a common set of properties. For example, a DRS configuration can include information such as: 1) the starting sub-frame of DRS occasions and duration of DRS occasions (e.g. 1, 2, . . . , 5 ms or sub-frames); 2) the sub-frame location of PSS and SSS; 3) the frame structure of DRS occasions, i.e. either TDD or FDD (if it is not present, the UE has to blindly detect the frame structure); 4) timing offset that indicates the CSI-RS sub-frame location within the DRS occasions wherein the information is only present if CSI-RS is configured as DRS and the information may not be needed if CSI-RS is assumed present in every DRS sub-frame; 5) a list that indicates CSI-RS indices (optional); 6) a list that indicates the reference PCI for synchronization for CSI-RS detection/measurement (optional, if absent and CSI-RS is configured, serving cell's PSS/SSS/CRS is the reference for synchronization); and 7) a list that indicates the cell ids for measurement of CRS of DRS, wherein, in one option, the list can be the same as the list indicating the reference PCI for synchronization and this list can also indicate the PSS/SSS to be detected. There can be multiple DRS configurations configured to UE 116 for the same frequency.

Depending upon the measurement reference signal, such s the legacy CRS, the new CRS of DRS or the new CSI-RS of DRS, the RRM measurement procedure and performance requirement can be different. For example, the measurement accuracy requirement and measurement latency can be different.

For RRM measurement on a given frequency, there can be a cell id list from the legacy RRC measurement configuration, a cell id list from the CRS measurement of the DRS occasions and a list of CSI-RS virtual cell ids. This can be beneficial if there are legacy cells as well as cells transmitting DRS on the same frequency. UE RRM measurement behavior according to the configured lists can be as follows. If a cell belonging to the legacy cell id is detected, the UE 116 performs RRM measurement for the detected cell according to the legacy procedure. If a cell belonging to the cell id list for measurement of CRS of DRS is detected, the UE 116 performs RRM measurement for the detected cell according to the procedure and performance requirement specified for the CRS of DRS. If a cell or TP belonging to the list of CSI-RS virtual cell ids is detected, the UE 116 performs RRM measurement for the detected cell or TP according to the procedure and performance requirement specified for the CSI-RS of DRS. Lastly, if a cell belonging to none of the lists is detected, the UE 116 performs RRM measurement for the detected cell according to the legacy procedure.

Figure 21:
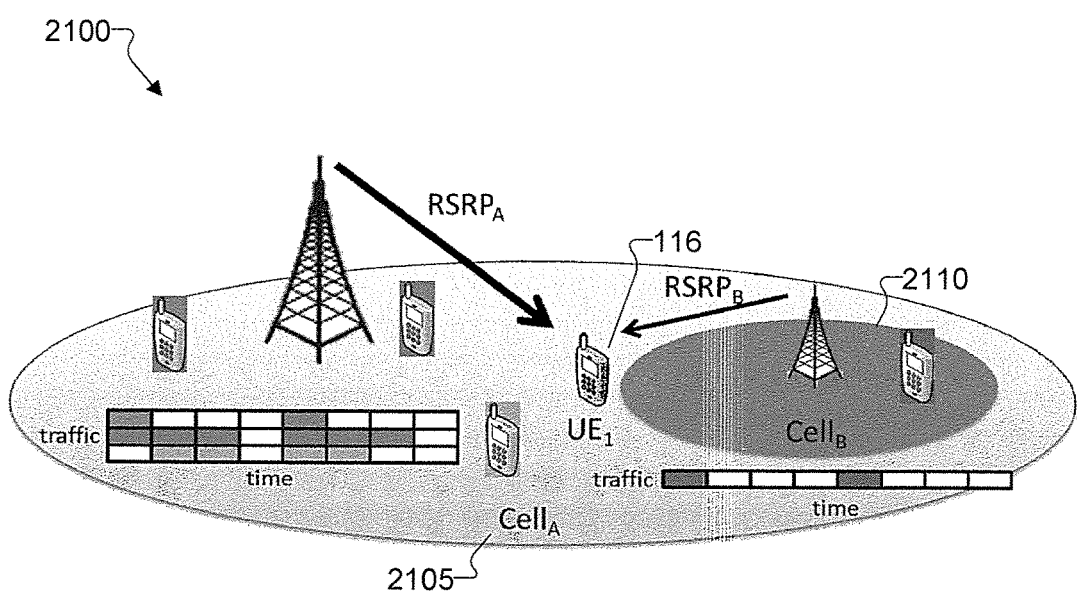
FIG. 21 illustrates traffic and signal quality metrics for cell association in a Heterogeneous Network according to this disclosure.

FIG. 21 illustrates traffic and signal quality metrics for cell association in a Heterogeneous Network according to embodiments of this disclosure. The embodiment of the traffic and signal quality metrics 2100 shown in FIG. 21 is for illustration only. Other embodiments could be used without departing from the scope of the present disclosure.

When small cells are deployed in a cluster in order to handle the traffic in a hotzone, traffic dynamics may be frequently changing and also in the case of user mobility, the set of potential cells for connection may also be varying. The network decision of which cell to associate a particular user with may depend on multiple factors including traffic type, network load, and especially UE measurements including RSRP and RSRQ. FIG. 21 depicts a two-cell scenario highlighting the multiple factors that need to be considered for efficient user association and load balancing. At the boundaries of macro Cell A 2105 and small Cell B 2110, UE 116 is taking measurements to determine its cell association. The RSRP of Cell A 2105 is greater than Cell B 2110, however there are significantly more active users being served by Cell A 2105 and Cell B 2110. Thus, signal strength alone may not be sufficient to make the most beneficial association decision from a throughput perspective because depending on what resources and duration UE 116 takes measurements, varying levels of signal quality and/or resource utilization may be observed.

Enhancement to cell association can be achieved by adapting measurement procedures to provide more accurate and frequent reports which may be used by the network. Embodiments of the present disclosure illustrate procedures and methods for the adaptation of measurement for cell detection and association.

In order to provide a network with the results of the measurements taken during a given measurement period, there is a configurable relationship between a set of measurement configurations and reporting configurations as stated in REF 7:

The UE reports measurement information in accordance with the measurement configuration as provided by E-UTRAN. E-UTRAN provides the measurement configuration applicable for a UE in RRC_CONNECTED by means of dedicated signalling, i.e. using the RRCConnectionReconfiguration message.

"The UE can be requested to perform the following types of measurements:

Intra-frequency measurements: measurements at the downlink carrier frequency(ies) of the serving cell(s).

Inter-frequency measurements: measurements at frequencies that differ from any of the downlink carrier frequency(ies) of the serving cell(s).

Inter-RAT measurements of UTRA frequencies.

Inter-RAT measurements of GERAN frequencies.

Inter-RAT measurements of CDMA2000 HRPD or CDMA2000 1×RTT frequencies.

The measurement configuration includes the following parameters:

1. Measurement objects: The objects on which the UE shall perform the measurements.

For intra-frequency and inter-frequency measurements a measurement object is a single E-UTRA carrier frequency. Associated with this carrier frequency, E-UTRAN can configure a list of cell specific offsets and a list of 'blacklisted' cells. Blacklisted cells are not considered in event evaluation or measurement reporting.

For inter-RAT UTRA measurements a measurement object is a set of cells on a single UTRA carrier frequency.

For inter-RAT GERAN measurements a measurement object is a set of GERAN carrier frequencies.

For inter-RAT CDMA2000 measurements a measurement object is a set of cells on a single (HRPD or 1xRTT) carrier frequency. NOTE 1: Some measurements using the above mentioned measurement objects, only concern a single cell, e.g. measurements used to report neighboring cell system information, PCell UE Rx-Tx time difference.

2. Reporting configurations: A list of reporting configurations where each reporting configuration consists of the following:

Reporting criterion: The criterion that triggers the UE to send a measurement report. This can either be periodical or a single event description.

Reporting format: The quantities that the UE includes in the measurement report and associated information (e.g. number of cells to report).

3. Measurement identities: A list of measurement identities where each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

4. Quantity configurations: One quantity configuration is configured per RAT type. The quantity configuration defines the measurement quantities and associated filtering used for all event evaluation and related reporting of that measurement type. One filter can be configured per measurement quantity.

5. Measurement gaps: Periods that the UE may use to perform measurements, i.e. no (UL, DL) transmissions are scheduled.

E-UTRAN only configures a single measurement object for a given frequency, i.e. it is not possible to configure two or more measurement objects for the same frequency with different associated parameters, e.g. different offsets and/or blacklists. E-UTRAN may configure multiple instances of the same event e.g. by configuring two reporting configurations with different thresholds.

The UE maintains a single measurement object list, a single reporting configuration list, and a single measurement identities list. The measurement object list includes measurement objects, that are specified per RAT type, possibly including intra-frequency object(s) (i.e. the object(s) corresponding to the serving frequency(ies)), inter-frequency object(s) and inter-RAT objects. Similarly, the reporting configuration list includes E-UTRA and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The serving cell(s)—these are the PCell and one or more SCells, if configured for a UE supporting CA.
2. Listed cells—these are cells listed within the measurement object(s).
3. Detected cells—these are cells that are not listed within the measurement object(s) but are detected by the UE on the carrier frequency(ies) indicated by the measurement object(s).

For E-UTRA, the UE measures and reports on the serving cell(s), listed cells and detected cells."

Different maximum UE measurement periods have been specified in 3GPP standards specification for intra-frequency and inter-frequency measurement taking into account tradeoffs between UE complexity/capability and the required RSRP/RSRQ measurement accuracy as stated in REF 8. For example, a longer measurement period is needed in the case of inter-frequency measurement to allow a UE with measurement gap to obtain sufficient number of samples to meet the RSRP/RSRQ measurement accuracy requirement. For intra-frequency measurement (including measurement of multiple carrier frequencies aggregated in a carrier aggregation operation), a maximum of 200 ms measurement period is defined assuming measurement of 6 physical resource blocks without the DRX (Discontinuous Reception) feature configured. For inter-frequency measurement, a maximum of 480 ms per carrier frequency is defined for the same assumption.

Figure 22:
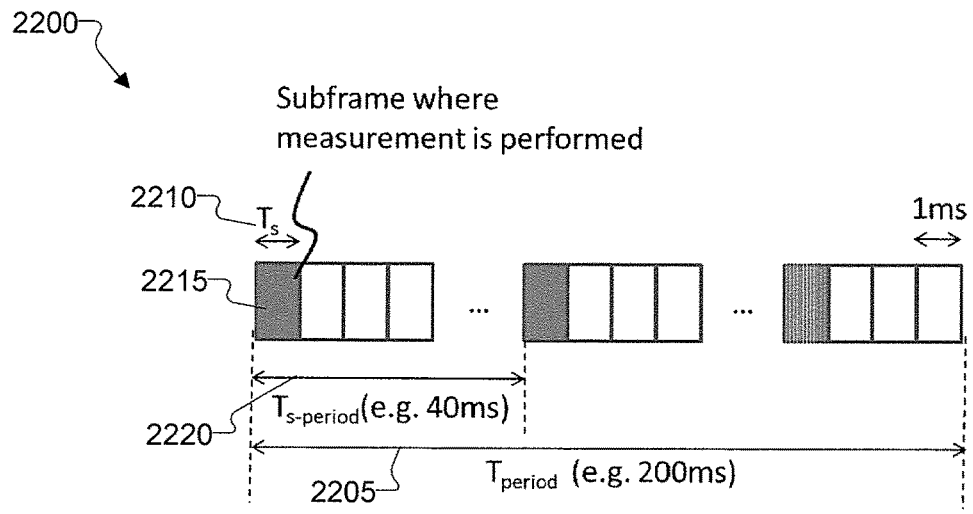
FIG. 22 illustrates a measurement sampling during UE measurement period without a measurement gap according to this disclosure.

FIG. 22 illustrates a measurement sampling during UE measurement period without a measurement gap according to this disclosure. The embodiment of the measurement sampling without a measurement gap 2200 shown in FIG. 22 is for illustration only. Other embodiments could be used without departing from the scope of the present disclosure.

As an illustrative example, the UE 116 may have a measurement period of $T_{period}$ 2205 and may utilize N sampling intervals of $T_s$ 2210 (e.g. 1 ms) to obtain a sufficiently accurate measurement (e.g. RSRP/RSRQ) for every measurement period. In the example shown in FIG. 22, a measurement period $T_{period}$ 2205 wherein the UE performs the measurement of $T_s$ sub-frame 2215 with sampling periodicity of $T_{s\text{-}period}$ 2220. For example, when $T_{period}$=200 ms, $T_{s\text{-}period}$=40 ms and $T_s$=1 ms, the L1 measurement result is generated with five measurement sub-frames 2215 over the measurement period. Typically, measurement samples are spread over the measurement period. For example, in 200 ms measurement period, the UE 116 measures a sub-frame every 40 ms for a total of five samples.

Figure 23:
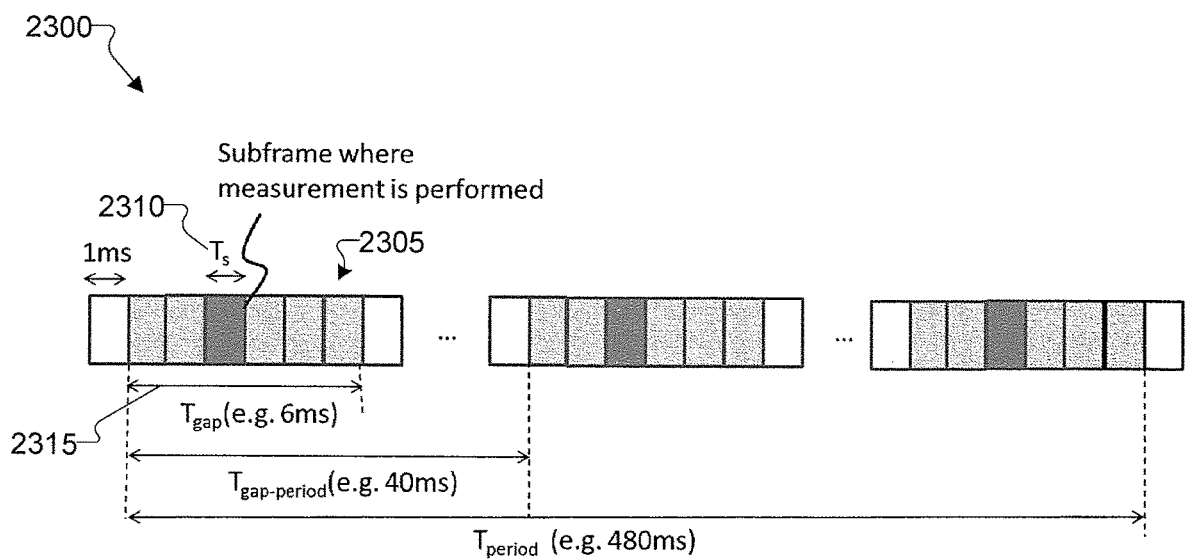
FIG. 23 illustrates a measurement sampling during UE measurement period with a configured measurement gap according to this disclosure.

FIG. 23 illustrates a measurement sampling during UE measurement period with a configured measurement gap according to this disclosure. The embodiment of the measurement sampling with a measurement gap 2300 shown in FIG. 23 is for illustration only. Other embodiments could be used without departing from the scope of the present disclosure.

In a second example, the UE 116 utilizes non-consecutive sampling in the event a measurement gap pattern 2305 is configured. This is beneficial in the case of inter-frequency measurement for example, when the UE 116 needs to switch its RF front end to a different frequency and cannot receive or transmit on the current serving frequency. In the example shown in FIG. 23 a measurement period 2310 wherein the UE 116 performs the sampling every $T_{gap}$ ms 2315, where $T_{gap}$ is derived from a configured measurement gap pattern 2305. For inter-frequency measurement with measurement gap pattern 2305 configured, UE 116 can perform consecutive measurement sampling within a measurement gap.

For the purpose of assisting load shifting and cell association, embodiments of the present disclosure provide novel Radio Resource Measurement (RRM) methods. The physical signals used for RRM can be the Cell-Specific Reference Signal (CRS), the Positioning Reference Signal (PRS), the Channel State Information Reference Signal (CSI-RS), or a modified existing or newly designed physical signal. Hereafter the physical signal used for RRM are referred to as RRM RS.

Embodiments of the presen disclosure enhance cell detection, load shifting between cells, and dual connectivity Scell activation/deactivation. In certain embodiments (referred to as Embodiment 7)—Measurement Period Configuration is provided.

The network can configure the UE 116 to measure RRM RS from multiple cells to generate a signal quality measurement such as RSRP and/or RSRQ and/or SINR of each cell. For a small cell deployment scenario, the cells to be measured by the UE 116 can be from a same cluster of small cells or can be from multiple clusters of small cells. The UE 116 reports measurement results to a network when a reporting criterion is met. For example, measurement reporting can be triggered when a RSRP value is greater than a threshold. The threshold can be configured by the network and stored in a memory of the UE 116. If the UE 114 does not have a PUSCH transmission, the UE 116 transmits a service request in a PUCCH to request scheduling from the network for a PUSCH transmission in order to report measurement results. In certain embodiments, the network configures the UE 116 with a PUCCH resource or a PUSCH resource to use for reporting measurement results. That resource is valid only for a sub-frame occurring after sub-frame(s) of transmissions of RRM RS and therefore an associated overhead for reporting measurement results is low.

In one example use case, RRM measurement is beneficial to assist the network in load shifting or cell association for the UE 116 for a non-co-channel heterogeneous network. Assuming full-buffer traffic for all UEs (that is, an infinitely long packet size), all cells in a heterogeneous network would be fully loaded. In this case, the length of the RRM measurement period has an impact on the measurement accuracy only. Further assuming perfect measurement accuracy, the RSRP and the RSRQ measurements of a stationary UE do not change with time as they are only determined by the large-scale propagation losses of cells.

In certain embodiments, under a realistic non-full buffer traffic assumption, the load and signal energy on each layer can vary with each transmission time interval (TTI). Furthermore, in a heterogeneous network, the extent of this time variation of signal energy observed at the UE 116 receiver may also be different for different layers. Intuitively, long measurement period tends to disregard this short-term time variation by averaging out the short term variation, producing a slow time-varying RSRQ. Alternatively, a shorter measurement period results in a faster time-varying RSRQ and may better reflect the short term signal energy fluctuation of a layer.

The appropriate measurement period is closely related to the serving time of a packet. For a packet that requires long service time, cell association based on short measurement period may not be beneficial. As a result further improvement over existing mechanisms may be possible if the measurement period can be adapted according to the traffic condition, the signal strength of the cell as well as the packet size of the UE. Accordingly, embodiments of the present disclosure provide a method to enable association of a measurement period duration and a cell to be measured for RRM in a UE-specific manner.

In one method of measurement period configuration (Method B1), the network configures the UE 116 with a measurement period configuration corresponding to a measurement object. Each measurement object configured contains a set of cell IDs for the indicated carrier frequency on which the UE 116 will report measurements. The measurement period corresponding to a measurement object is indicated to the UE 116 via RRC signaling as an information element (IE) in MeasObjectEUTRA or a new IE, which specifies information applicable for intra-frequency or inter-frequency E-UTRA cells. Example ASN.1 code that is based on MeasObjectEUTRA is shown below. MeasPeriodConfig is applicable to all cells listed (can correspond to those included in cellsToAddModList or alternatively a new list) or all cells belonging to the carrier frequency indicated in the measurement object.

```
-- ASN1START
MeasObjectEUTRA ::=          SEQUENCE {
    carrierFreq                  ARFCN-ValueEUTRA,
    allowedMeasBandwidth         AllowedMeasBandwidth,
    presenceAntennaPort1         PresenceAntennaPort1,
    neighCellConfig              NeighCellConfig,
    offsetFreq                   Q-OffsetRange              DEFAULT dB0,
    -- Cell list
    cellsToRemoveList            CellIndexList              OPTIONAL,
    -- Need ON
    cellsToAddModList            CellsToAddModList          OPTIONAL,
    -- Need ON
    -- Black list
    blackCellsToRemoveList       CellIndexList              OPTIONAL,
    -- Need ON
    blackCellsToAddModList       BlackCellsToAddModList     OPTIONAL,
    -- Need ON
    cellForWhichToReportCGI      PhysCellId                 OPTIONAL,
    -- Need ON
    ...,
    [[measCycleSCell-r10          MeasCycleSCell-r10         OPTIONAL,
    -- Need ON
```

-continued

```
        measSubframePatternConfigNeigh-r10    MeasSubframePatternConfigNeigh-r10
        OPTIONAL                                                          -- Need ON
        ]]
        [[measPeriodConfig-rxy        MeasPeriodConfig        OPTIONAL    -- Need ON
        ]]
}
-- ASN1STOP
```

In certain embodiments, the MeasPeriodConfig contains a single configured periodDuration value applicable to all cells listed or all cells belonging to the carrier frequency indicated in the measurement object. An example ASN.1 code is shown below where periodDuration is an integer that takes a value from 1 to maxPeriodDuration which is also an integer. In this example, a periodDuration value corresponds to a measurement period. For example, a periodDuration of 1 corresponds to measurement period of 10 ms, and periodDuration of 2 corresponds to measurement period of 50 ms as shown in TABLE 11.

```
MeasPeriodConfig ::=SEQUENCE {
        periodDuration              INTEGER
                                    (1..maxPeriodDuration),
}
```

TABLE 11

Mapping between periodDuration and measurement period

| periodDuration | Measurement period |
|---|---|
| 1 | 10 ms |
| 2 | 50 ms |
| 3 | 100 ms |
| 4 (maxPeriodDuration) | 150 ms |

In certain embodiments, the MeasPeriodConfig contains multiple configured periodDuration values applicable to all cells listed or all cells belonging to the carrier frequency indicated in the measurement object.

```
MeasPeriodConfig ::=SEQUENCE {
        periodDuration              CHOICE {
             mp0                    INTEGER (1.. maxPeriodDuration),
             mp1                    INTEGER (1.. maxPeriodDuration),
             ...
        }
}
```

When multiple configured periodDuration values exist, the UE 116 applies a single or multiple measurement periods for the cells listed in the measurement object. Methods for indicating which duration to apply or map to a given measurement reporting configuration will be discussed herein below.

In certain embodiments, the MeasPeriodConfig contains one or more configured periodDuration values. The configured periodDuration values are specific to individual or a subset of cells listed in the measurement object.

```
MeasPeriodConfig ::=SEQUENCE {
        periodDuration              CHOICE {
             mp0                    INTEGER (1.. maxPeriodDuration),
             mp1                    INTEGER (1.. maxPeriodDuration),
             ...
        }
        mp0CellMapping ::=          SEQUENCE {
             cellIndex              INTEGER (1..maxCellMeas),
        }
        mp1CellMapping ::=          SEQUENCE {
             cellIndex              INTEGER (1..maxCellMeas),
        }
        ...
}
```

In the case of the above ASN.1 example, the cellIndex of the to-be-measured cells are associated with either the first or second measurement period configuration. The physical cell Id (physCellId) may be provided instead of a cell index.

In certain embodiments, a bitmap is utilized to indicate which measurement configuration is applied to a given physical cell ID. As in the example below, the bitmap indicates either a first (bit=0) or second (bit=1) configuration is applied and the position in a bitmap corresponds to a cellIndex as indicated in a measurement object.

```
MeasPeriodConfig ::=SEQUENCE {
            periodDuration          CHOICE {
                mp0                     INTEGER (1.. maxPeriodDuration),
                mp1                     INTEGER (1.. maxPeriodDuration),
                ...
            }
        mpCellMapping       BIT STRING(SIZE (maxCellMeas)) ...
}
```

In another method of measurement period configuration (Method B2), the measurement period configuration is applied to all measurement objects associated with a measurement configuration and is provided as part of the measurement configuration IE MeasConfig or as a new IE. An example ASN.1 code that is based on MeasConfig is given below:

```
-- ASN1START
MeasConfig ::=                                          SEQUENCE {
        -- Measurement objects
        measObjectToRemoveList                          MeasObjectToRemoveList
            OPTIONAL,    -- Need ON
        measObjectToAddModList                          MeasObjectToAddModList
            OPTIONAL,    -- Need ON
        -- Reporting configurations
        reportConfigToRemoveList                        ReportConfigToRemoveList
        OPTIONAL,    -- Need ON
        reportConfigToAddModList                        ReportConfigToAddModList
        OPTIONAL,    -- Need ON
        -- Measurement identities
        measIdToRemoveList                              MeasIdToRemoveList
            OPTIONAL,    -- Need ON
        measIdToAddModList                              MeasIdToAddModList
                        OPTIONAL,    -- Need ON
        -- Other parameters
        quantityConfig                                  QuantityConfig
                        OPTIONAL,    -- Need ON
        measGapConfig                                   MeasGapConfig
                        OPTIONAL,    -- Need ON
        s-Measure                                       RSRP-Range
                        OPTIONAL,    -- Need ON
        preRegistrationInfoHRPD                         PreRegistrationInfoHRPD
            OPTIONAL,    -- Need OP
        speedStatePars              CHOICE {
            release                                     NULL,
            setup                                       SEQUENCE {
                    mobilityStateParameters
        MobilityStateParameters,
                    timeToTrigger-SF
        SpeedStateScaleFactors
            }
        }                           OPTIONAL,    -- Need ON
        ...,
        [[      measObjectToAddModList-v9e0                     MeasObjectToAddModList-
v9e0        OPTIONAL -- Need ON
        ]]
        [[      measPeriodConfig-vxy        MeasPeriodConfig                OPTIONAL   --
Need ON
        ]]
}
MeasIdToRemoveList ::=              SEQUENCE (SIZE (1..maxMeasId)) OF
MeasId
MeasObjectToRemoveList ::=          SEQUENCE (SIZE (1..maxObjectId)) OF
```

```
MeasObjectId
ReportConfigToRemoveList ::=    SEQUENCE (SIZE (1..maxReportConfigId)) OF
ReportConfigId
-- ASN1STOP
```

The values the measurement period(s) indicated in measPeriodConfig can be according to any of the embodiments of Method B1.

In another method of measurement period configuration (Method B3), the network configures the UE 116 with a measurement period configuration corresponding to a report configuration. The measurement period corresponding to a report configuration is indicated to the UE 116 via RRC signaling as an information element (IE) in ReportConfigEUTRA or as a new IE, which specifies criteria for triggering of an E-UTRA measurement reporting event. An Example ASN.1 code is shown below. The values the measurement period(s) indicated in measPeriodConfig may be according to the embodiments of Method B1. Upon configuration of measPeriodConfig, the UE 116 performs measurement on cells associated with the reporting configuration assuming the configured measurement period for evaluation of event triggering according to the configured criterion.

```
-- ASN1START
ReportConfigEUTRA ::=                       SEQUENCE {
    triggerType                                 CHOICE {
        event                                       SEQUENCE {
            eventId                                     CHOICE {
                eventA1                                     SEQUENCE {
                    a1-Threshold                                ThresholdEUTRA
                },
                eventA2                                     SEQUENCE {
                    a2-Threshold                                ThresholdEUTRA
                },
                eventA3                                     SEQUENCE {
                    a3-Offset                                   INTEGER (-30..30),
                    reportOnLeave                               BOOLEAN
                },
                eventA4                                     SEQUENCE {
                    a4-Threshold                                ThresholdEUTRA
                },
                eventA5                                     SEQUENCE {
                    a5-Threshold1                               ThresholdEUTRA,
                    a5-Threshold2                               ThresholdEUTRA
                },
                ...,
                eventA6-r10                                 SEQUENCE {
                    a6-Offset-r10                               INTEGER (-30..30),
                    a6-ReportOnLeave-r10                        BOOLEAN
                }
            },
            hysteresis                                  Hysteresis,
            timeToTrigger                               TimeToTrigger
        },
        periodical                                  SEQUENCE {
            purpose                                     ENUMERATED {
                                                            reportStrongestCells, reportCGI}
        }
    },
    triggerQuantity                             ENUMERATED {rsrp, rsrq},
    reportQuantity                              ENUMERATED
                                                    {sameAsTriggerQuantity, both},
    maxReportCells                              INTEGER
                                                    (1..maxCellReport),
    reportInterval                              ReportInterval,
```

```
    reportAmount                                ENUMERATED {r1, r2, r4, r8, r16,
r32, r64, infinity},
        ...,
        [[    si-RequestForHO-r9               ENUMERATED {setup}
        OPTIONAL,  -- Cond reportCGI
            ue-RxTxTimeDiffPeriodical-r9       ENUMERATED {setup}
        OPTIONAL   -- Need OR
        ]],
        [[    includeLocationInfo-r10          ENUMERATED {true}
        OPTIONAL,  -- Need OR
            reportAddNeighMeas-r10             ENUMERATED {setup}
        OPTIONAL,  -- Need OR
        ]]
[[ measPeriodConfig-vxy    MeasPeriodConfig   OPTIONAL   -- Need ON
]]
}
ThresholdEUTRA ::=                              CHOICE{
        threshold-RSRP                                    RSRP-Range,
        threshold-RSRQ                                    RSRQ-Range
}
-- ASN1STOP
```

Figure 24:
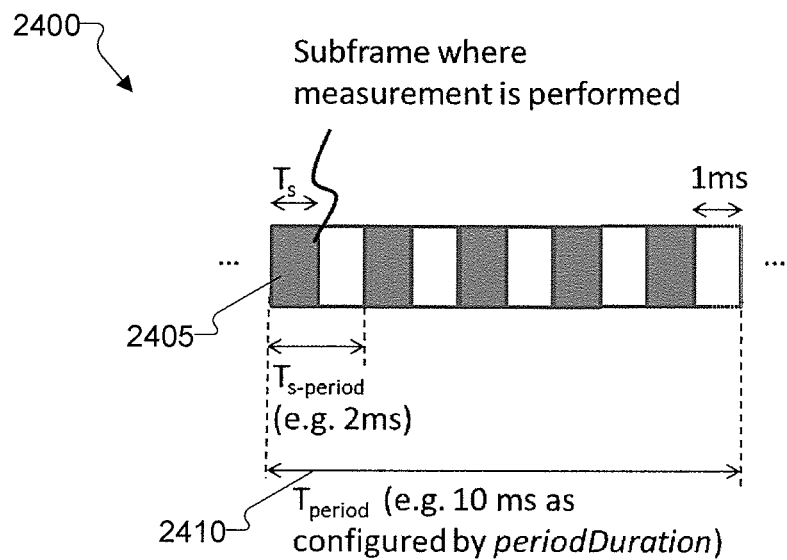
FIG. 24 illustrates a UE measurement behavior for 10 ms measurement period according to this disclosure.

FIG. 24 illustrates a UE measurement behavior for 10 ms measurement period according to this disclosure. The embodiment of the UE measurement 2400 shown in FIG. 24 is for illustration only. Other embodiments could be used without departing from the scope of the present disclosure.

For the embodiments illustrated herein, including methods B1 through B3, described above, when MeasPeriodConfig is configured, the UE 116 performs RRM measurement 2405 for the corresponding cells assuming the measurement period as indicated by the configured periodDuration 2410. That is, RSRP/RSRQ/SINR other RRM metric is produced by sampling and averaging measurement within the measurement period. Alternatively, when MeasPeriodConfig is configured, the UE 116 performs RRM measurement 2405 for the corresponding cell assuming the measurement period as indicated by the configured periodDuration 2410, in addition to performing RRM measurement according to the legacy RRM measurement period. That is for a measurement metric, multiple measurement results, each corresponding to different measurement period is produced. One example of shortened RRM measurement 2405 is depicted in FIG. 24 where the periodDuration 2410 indicates a measurement period of 10 ms. In this example, the UE 116 samples sub-frames for measurement at a rate of one sampling every two sub-frames so as to maintain measurement accuracy by averaging over a total of five measurement sub-frames (same number of measurement sub-frames for 200 ms measurement period with sampling of 40 ms). However, how the measurement sampling is performed within the configured measurement period can varied by UE and implemented in different ways. Alternatively, network signaling to determine the sampling rate within the configured measurement period can also be provided.

Figure 25:
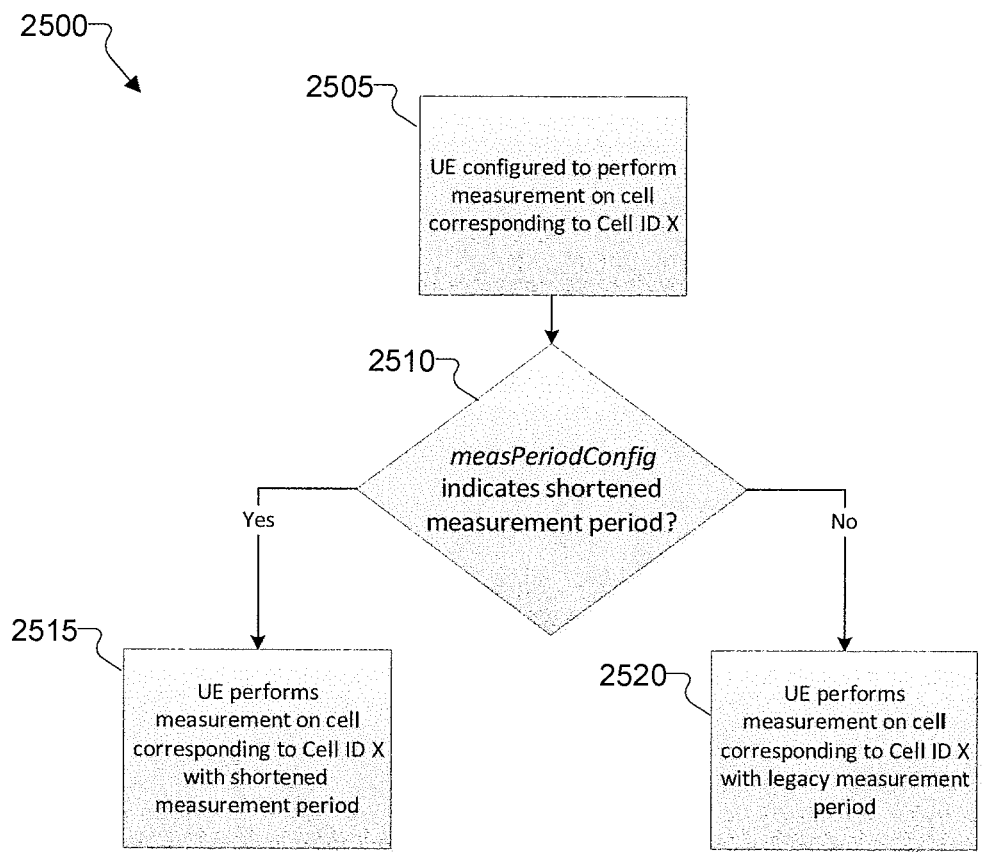
FIGS. 25 and 26 illustrate UE RRM measurement processes according to this disclosure.
Figure 26:
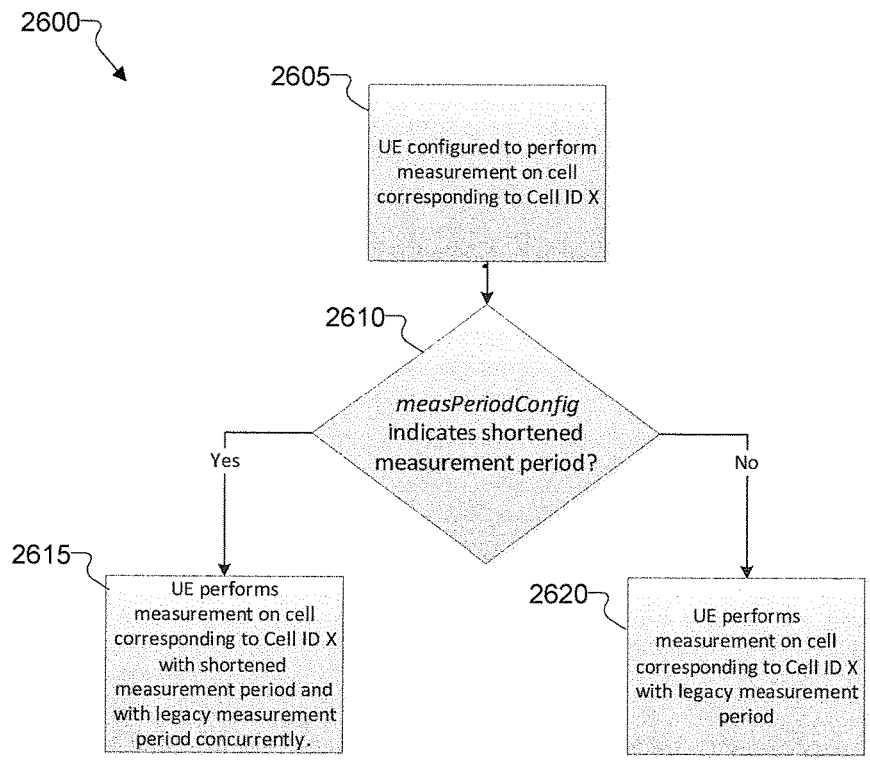

FIGS. 25 and 26 illustrate UE RRM measurement processes according to embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the example depicted depend upon the configuration of measPeriodConfig and are implemented by a receiver chain or processing circuitry in, for example, a mobile station.

In the UE RRM measurement process 2500, one cell is measured with only one measurement period. In block 2505, the UE 116 is configured to perform measurement on a cell corresponding to Cell ID X. In block 2510, the UE 116 determines whether the configuration of measPeriodConfig indicates a shortened measurement period or not. If the configuration of measPeriodConfig indicates a shorted measurement period, in block 2515, the UE 116 performs measurement on the cell corresponding to Cell ID X with a shortened measurement period. If the configuration of measPeriodConfig does not indicate a shorted measurement period, in block 2520, the UE 116 performs measurement on the cell corresponding to Cell ID X with a legacy measurement period.

In the UE RRM measurement process 2600, one cell is measured with multiple measurement periods. In block 2605, the UE 116 is configured to perform measurement on a cell corresponding to Cell ID X. In block 2610, the UE 116 determines whether the configuration of measPeriodConfig indicates a shortened measurement period or not. If the configuration of measPeriodConfig indicates a shorted measurement period, in block 2615, the UE 116 performs measurement on the cell corresponding to Cell ID X with a shortened measurement period and with a legacy measurement period. If the configuration of measPeriodConfig does not indicate a shorted measurement period, in block 2620, the UE 116 performs measurement on the cell corresponding to Cell ID X with a legacy measurement period.

For the embodiments illustrated herein, including methods B1 through B3, described above, the measurement period configuration can also be included in a System Information Block, such as in SIB3 or SIB4 or in a new SIB. Upon reception of the measurement period configuration in SIB, UE 116 is in RRC idle mode For the embodiments illustrated herein, including methods B1 through B3, described above, the physical signal type to be measured can also be included in the configuration message. The UE 116 performs RRM measurement on the indicated physical signal according to the indicated measurement period.

The embodiments illustrated herein, including methods B1 through B3 as described above can also be applied for LTE/LTE-Advanced network deployed on unlicensed spectrum, lightly licensed spectrum, licensed shared spectrum and the like. For example, a first measurement period method such as the legacy method can be configured for a carrier on licensed spectrum and a second measurement period method such as methods B1 through B3 can be configured for a carrier on unlicensed spectrum.

Certain embodiments of the present disclosure enhance existing cell discovery mechanism by introducing new discovery reference signals in wireless resources where intercell interference can be effectively reduced. Methods to enable efficient discovery reference signal multiplexing are also provided through frequency-domain and time-domain multiplexing methods. Finally, methods to enable compact dynamic scheduling of high order modulation data and channel state information feedback are described.

Certain embodiments (referred to as "Embodiment 8") provide new discovery reference signals. To improve cell detection performance, the new discovery reference signals (DRS) are transmitted by an eNB or cell in OFDM symbols or physical resource blocks where zero-power CSI-RS resources can be configured to a UE. As a zero-power CSI-RS resource occupies resources from two OFDM symbols in a subframe, the DRS of one or multiple cells also occupy resources from two OFDM symbols in a sub-frame (DRS symbols). The advantage for a cell to transmit DRS in the locations where zero-power CSI-RS resources can be configured to the UE 116 is that the resource elements concerned can be muted by other (neighboring) cells so that the interference to the DRS can be reduced.

In particular, for an LTE FDD or TDD system with normal CP, the DRS of one or multiple cells can be transmitted in the 3rd and the 4th OFDM symbols of a second slot of a sub-frame. For an LTE TDD system with normal CP, the DRS of one or multiple cells can alternatively be transmitted in the 2nd and the 4th OFDM symbols of a second slot of a sub-frame. For an LTE FDD or TDD system with extended CP, the DRS of one or multiple cells can be transmitted in either the 5th and the 6th OFDM symbols of the first slot of a sub-frame, or the 5th and the 6th OFDM symbols of the second slot of a sub-frame. For an LTE TDD system with extended CP, the DRS of one or multiple cells can alternatively be transmitted in the 2nd and the 3rd OFDM symbols of a second slot of a sub-frame.

The sub-frame index or indices that are used to transmit the DRS of one or multiple cells can be predefined, such as sub-frame #5 in a radio frame or configurable by the eNB 103. The advantage of transmitting DRS of one or multiple cells in sub-frame #5 is that it is a DL sub-frame for all TDD configurations as defined in Rel-11 LTE; hence a common DRS design is possible for both FDD and TDD systems. Another advantage is that sub-frame #5 is also the sub-frame where the conventional PSS/SSS may also be transmitted; this allows the UE 116 to detect the conventional PSS/SSS as well as the DRS of one or multiple cells in the same sub-frame. However, the conventional PSS and SSS may not be transmitted for a cell; for example if the cell is in an OFF state. The periodicity of the DRS transmission of one or multiple cells can also be predefined or configurable by the eNB 103.

For the rest of the embodiment, the UE 116 is configured to assume that the DRS is transmitted in sub-frame #5 for the sake of simplicity. However, in certain embodiments, the UE 116 is configured to assume that the DRS transmission occurs in other sub-frame indices. In certain embodiments, the DRS of a cell are transmitted in both DRS symbols.

Figure 27:
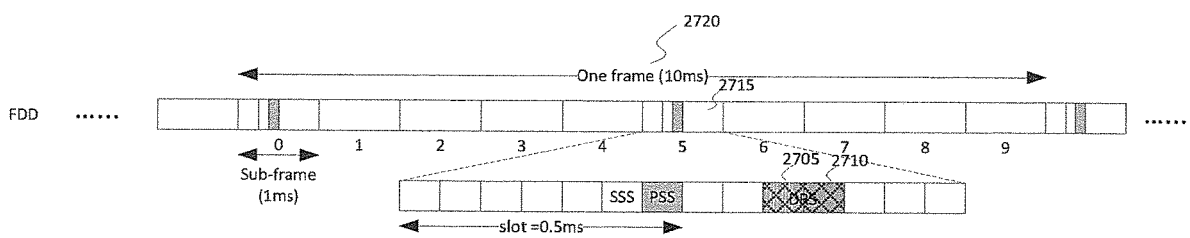
FIG. 27 illustrates a first approach of the DRS mapping in a sub-frame according to this disclosure.

FIG. 27 illustrates a first approach of the DRS mapping in a sub-frame according to this disclosure. The embodiment of the approach and frame shown in FIG. 27 is for illustration only. Other embodiments could be used without departing from the present disclosure. As shown in the example illustrated in FIG. 27, the DRS of a cell is transmitted in the $3^{rd}$ OFDM symbol 2705 and the $4^{th}$ OFDM symbol 2710 of a second slot of sub-frame #5 2715 in a radio frame 2720.

Figure 28:
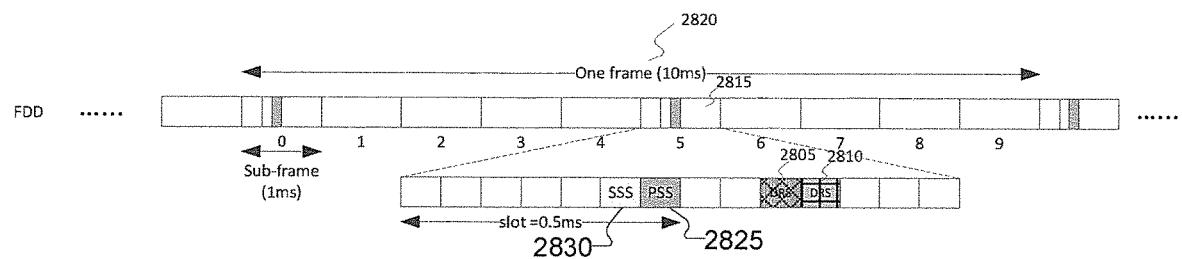
FIG. 28 illustrates the second approach of the DRS mapping in a sub-frame according to this disclosure.

FIG. 28 illustrates the second approach of the DRS mapping in a sub-frame according to this disclosure. The embodiment of the approach and frame shown in FIG. 28 is for illustration only. Other embodiments could be used without departing from the present disclosure.

In the second approach, the DRS of a cell is transmitted in one of the DRS symbols. The DRS of a first cell is transmitted in the $3^{rd}$ OFDM symbol 2805 and the DRS of a second cell is transmitted in the $4^{th}$ OFDM symbol 2810, of a second slot of sub-frame #5 2815 620 in a radio frame 2820 630.

In order to reuse UE implementation of conventional cell detection, the DRS can be the PSS 2825 or the SSS 2830 with signal sequences as defined in LTE Rel 8-11. In the following, four alternatives for DRS design based on the PSS 2825, the SSS 2830, or both, are described. For simplicity, an FDD system with normal CP is assumed. The resource element mappings of the DRS for the other system configurations, such as an extended CP and TDD, are straightforward following the principle described in this disclosure and are therefore omitted.

In a first alternative, in a sub-frame where the DRS is transmitted, a new SSS is transmitted in a first OFDM symbol and a new PSS is transmitted in a second OFDM symbol of the DRS symbols. In this alternative, the new PSS and the new SSS correspond to the DRS of a single cell. Assuming FDD/TDD with normal CP, the first OFDM symbol is the $3^{rd}$ OFDM symbol of the second slot of the sub-frame and the second OFDM symbol is the $4^{th}$ OFDM symbol of the second slot of the sub-frame. The UE 116 is configured to at least report the PCI of the DRS (0, 1, 2, . . . 503) to the eNB 103 upon detection of the DRS.

Figure 29:
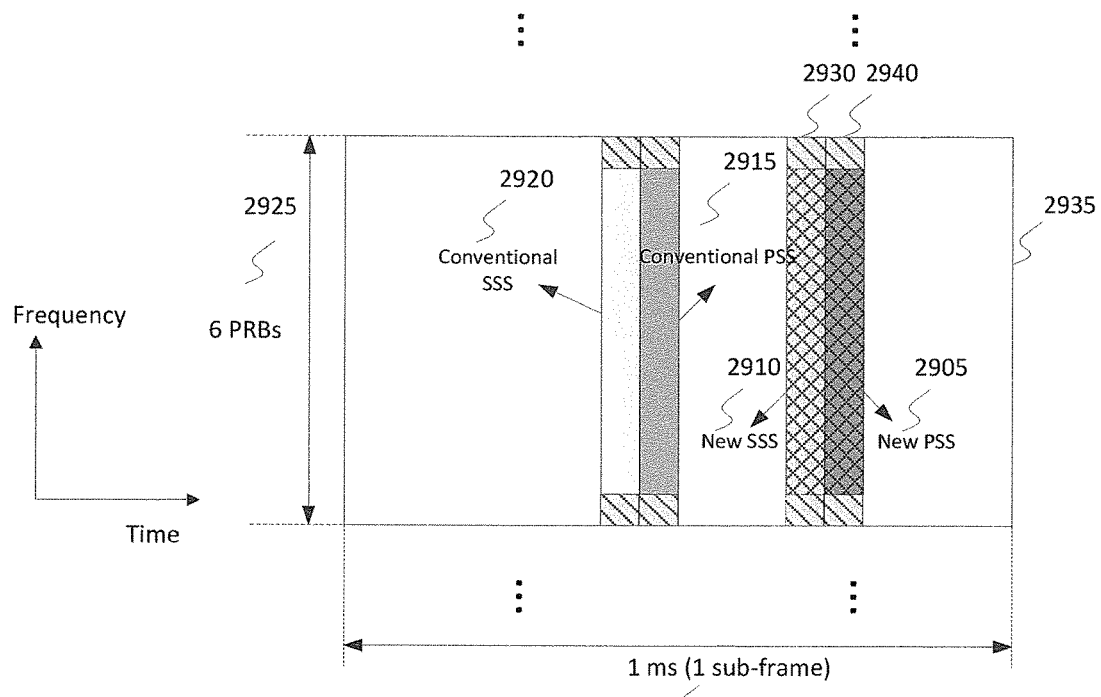
FIG. 29 illustrates a first alternative of DRS according to this disclosure.

FIG. 29 illustrates a first alternative of DRS according to this disclosure. The embodiment of the DRS shown in FIG. 29 is for illustration only. Other embodiments could be used without departing from the present disclosure.

The DRS in the form of new PSS 2905 and new SSS 2910 is assumed transmitted in a sub-frame 2900 where the conventional PSS 2915 and SSS 2920 also can be transmitted. The new PSS 2905 and the new SSS 2910 are transmitted in the same set of frequency resources as the conventional PSS/SSS, that is, in the middle 6 PRBs 2925 of the system bandwidth. The new SSS 2910 is transmitted in the $3^{rd}$ OFDM symbol 2930 of the second slot 2935 of the sub-frame 2900 and the new PSS 2905 is transmitted in the $4^{th}$ OFDM symbol 2940 of the second slot 2935 of the sub-frame 2900.

Figure 30:
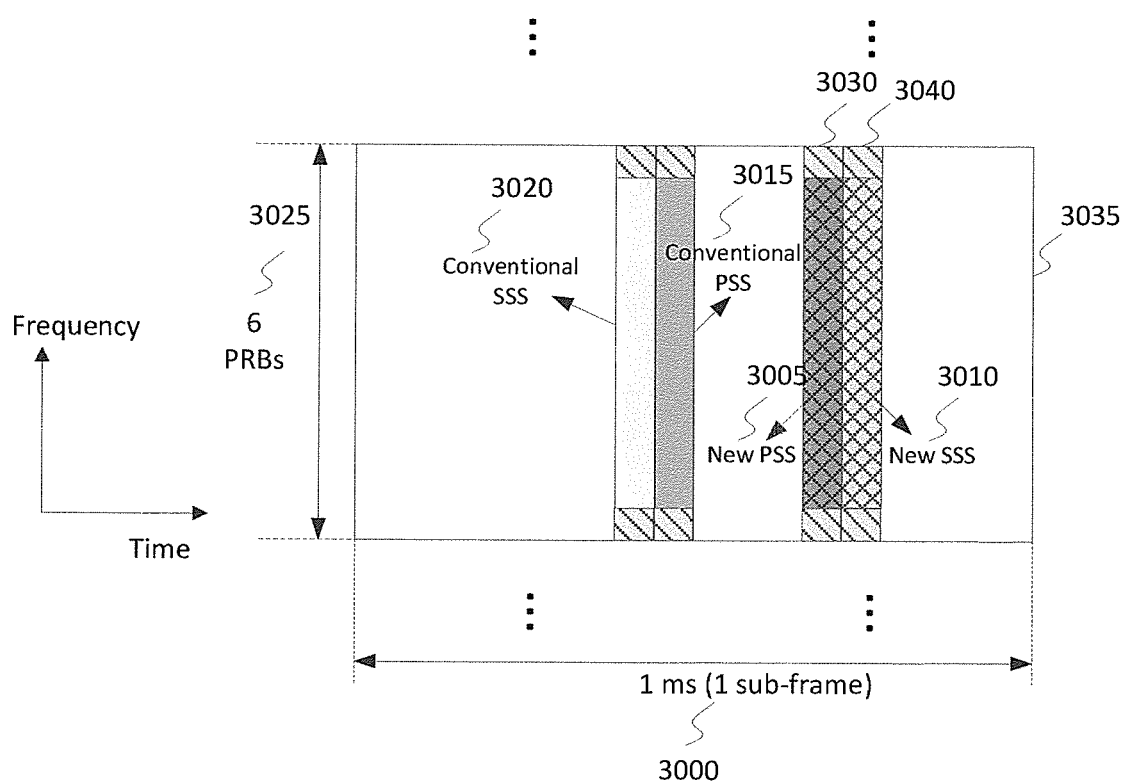
FIG. 30 illustrates a second alternative of DRS according to this disclosure.

FIG. 30 illustrates a second alternative of DRS according to this disclosure. The embodiment of the DRS shown in FIG. 30 is for illustration only. Other embodiments could be used without departing from the present disclosure.

In the second alternative, in a sub-frame 3000 in which the DRS is transmitted, a new PSS 3005 is transmitted in the $3^{rd}$ OFDM symbol and a new SSS 3010 is transmitted in the $4^{th}$ OFDM symbol of the DRS symbols. In this alternative, the new PSS and the new SSS correspond to the DRS of a single cell. Transmitting the new PSS 3005 before the new SSS 3010 allows the UE 116 to avoid buffering the new SSS symbol before detecting the new PSS. Additionally, having a different relative location for the new PSS 3005 and new SSS 3010 also allows the UE 116 to quickly distinguish the type of PSS/SSS detected, such as when an SSS is detected to be located before a PSS, the conventional PSS 3015 and conventional SSS 3020 are detected; and if a PSS is detected to be located before the SSS, the DRS are detected. The UE 116 is configured to at least report the PCI of the DRS (0, 1, 2, . . . 503) to the eNB 103 upon detection of the DRS.

The DRS in the form of new PSS 3005 and new SSS 3010 is assumed transmitted in a sub-frame 3000 where the conventional PSS 3015 and conventional SSS 3020 also can be transmitted. The new PSS 3005 and the new SSS 3010 are transmitted in the same set of frequency resources as the conventional PSS/SSS, that is, in the middle 6 PRBs 3025 of the system bandwidth. The new PSS 3005 is transmitted in the $3^{rd}$ OFDM symbol 3030 of the second slot 3035 of the sub-frame 3000 and the new SSS 3010 is transmitted in the $4^{th}$ OFDM symbol 3040 of the second slot 3035 of the sub-frame 3000.

Figure 31:
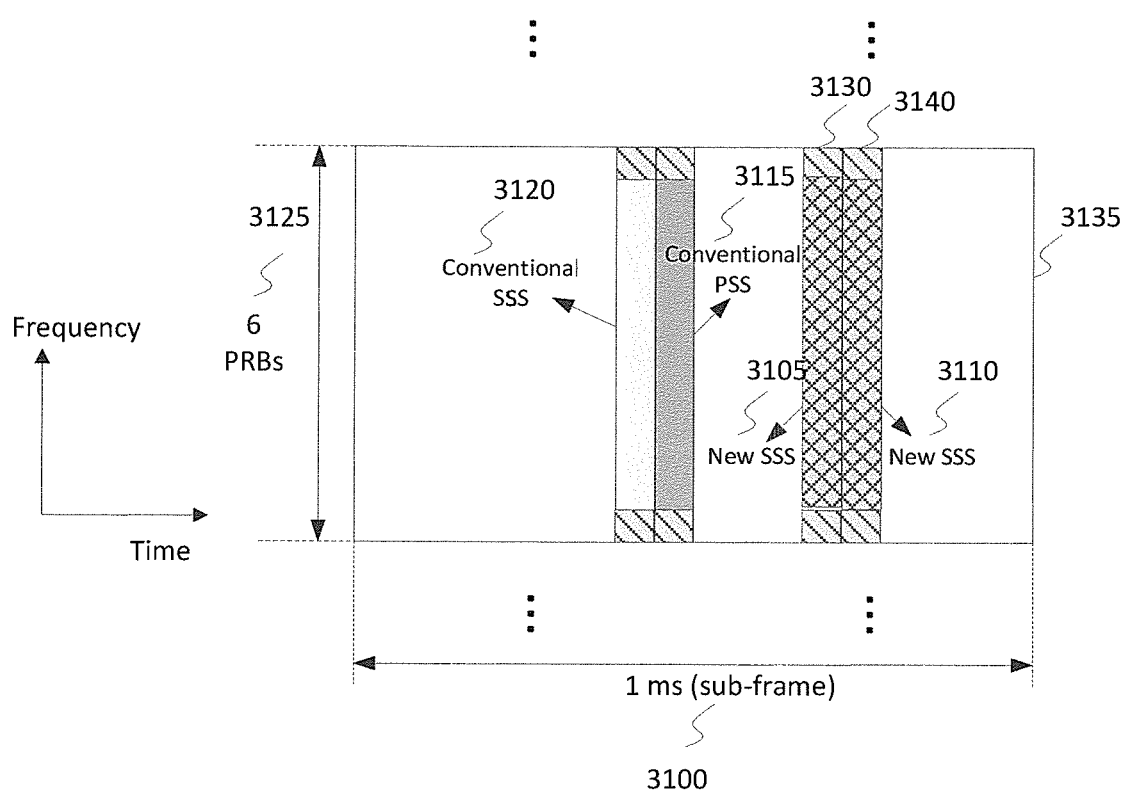
FIG. 31 illustrates a third alternative of DRS according to this disclosure.

FIG. 31 illustrates a third alternative of DRS according to this disclosure. The embodiment of the DRS shown in FIG. 31 is for illustration only. Other embodiments could be used without departing from the present disclosure.

In a third alternative, in a sub-frame 3100 in which the DRS is transmitted, two new SSS are transmitted in the $3^{rd}$ OFDM symbol and the $4^{th}$ OFDM symbol of the DRS symbols. Unlike the first two alternatives where the new PSS and the new SSS correspond to a single cell, for the third alternative the first new SSS (if detected) corresponds to a first cell and the second new SSS (if detected) corresponds to a second cell. This implies that the two new SSS are scrambled by different scrambling ids. The DRS multiplexing capacity of the third alternative is better than the first or second alternative. Another option for the third alternative is that the two new SSS correspond to a single cell. This has an advantage that the UE 116 can combine two new SSS to achieve better cell detection performance. Whether the two new SSS in the 6 PRBs correspond to a single or two cells can either be predefined in the LTE specification or can be configured by the network. Similar as the second alternative, the third alternative also allows the UE 116 to quickly distinguish the type of PSS/SSS detected, such as when an SSS is detected to be located before a PSS, the conventional PSS and SSS are detected; and if only an SSS is(are) detected, the DRS is(are) detected. The UE 116 is configured to at least report the SSS scrambling id (0, 1, 2, . . . 167) to the eNB 103 upon detection of the DRS.

The first new SSS 3105 and a second new SSS 3110 can be transmitted in a sub-frame 3100 where the conventional PSS 3115 and SSS 3120 also can be transmitted. The first new SSS 3105 and the second new SSS 3110 can be transmitted in the same set of frequency resources as the conventional PSS/SSS, that is, in the middle 6 PRBs 3125 of the system bandwidth. When transmitted by the eNB 103, the first new SSS 3105 is located in the $3^{rd}$ OFDM symbol 3130 of the second slot 3135 of the sub-frame 3100; and when transmitted by the eNB 103, the second new SSS 3110 is located in the $4^{th}$ OFDM symbol 3140 of the second slot 3135 of the sub-frame 3100.

Figure 32:
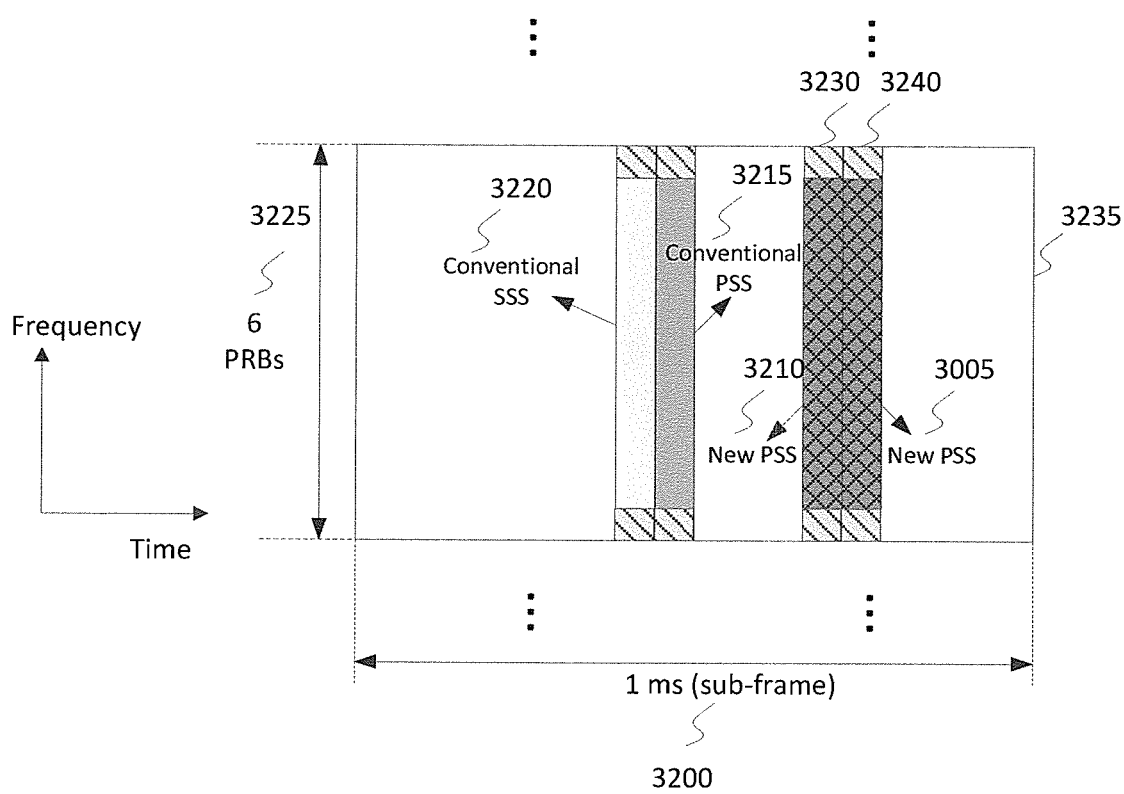
FIG. 32 illustrates a fourth alternative of DRS according to this disclosure.

FIG. 32 illustrates a fourth alternative of DRS according to this disclosure. The embodiment of the DRS shown in FIG. 32 is for illustration only. Other embodiments could be used without departing from the present disclosure.

In a fourth alternative, in a sub-frame 3200 in which the DRS is transmitted, two new PSS are transmitted in the $3^{rd}$ OFDM symbol and the $4^{th}$ OFDM symbol of the DRS symbols. Unlike the first two alternatives in which the new PSS and the new SSS correspond to a single cell, for the third alternative the first new PSS 3105 (if detected) corresponds to a first cell and the second new PSS 3110 (if detected) corresponds to a second cell. Similar to the second alternative, the fourth alternative also allows the UE 116 to quickly distinguish the type of PSS/SSS detected, such as when an SSS is detected to be located before a PSS, the conventional PSS and SSS are detected; and when two PSS are detected, the DRS are detected. The UE 116 is configured to at least report the PSS scrambling id (0, 1, 2) to the eNB 103 upon detection of the DRS.

The DRS in the form of a first new PSS 3205 and a second new PSS 3210 is assumed transmitted in a sub-frame 3200 in which the conventional PSS 3215 and SSS 3220 also can be transmitted. The first new PSS 3205 and the new second PSS 3210 are transmitted in the same set of frequency resources as the conventional PSS/SSS, that is, in the middle 6 PRBs 3225 of the system bandwidth. The first new PSS 3205 is transmitted in the $3^{rd}$ OFDM symbol 3230 of the second slot 3235 of the sub-frame 3200 and the second new PSS 3210 is transmitted in the $4^{th}$ OFDM symbol 3240 of the second slot 3235 of the sub-frame 3200.

Certain embodiments (referenced as "Embodiment 9") provide for DRS multiplexing. The system bandwidth can be partitioned into non-overlapping bands of 6 physical resource blocks where in each band, a DRS can be transmitted. For example, for a system bandwidth of 20 MHz or 100 physical resource blocks, there can be up to 3 non-overlapping bands of 6 physical resource blocks. The total number of cells that can be multiplexed in an orthogonal or a non-overlapping manner in time or frequency depends on the system bandwidth as well as the type of approach for DRS transmission as described in Embodiment 8. A DRS resource is defined as the amount of resource required by a cell for DRS transmission in a sub-frame. Then for a system bandwidth of 20 MHz or 100 physical resource blocks, there can be up to 3 non-overlapping DRS resources for the first approach of Embodiment 8 and 6 non-overlapping DRS resources for the second approach of Embodiment 8. Multiplexing the DRS of different cells, particularly cells that are close by, in different DRS resources can reduce the inter-cell interference among the DRS of different. In addition, frequency-domain multiplexing of DRS can also reduce system resource wastage since resource elements that have been configured as zero-power CSI-RS can be reused as DRS resource elements.

Figure 33:
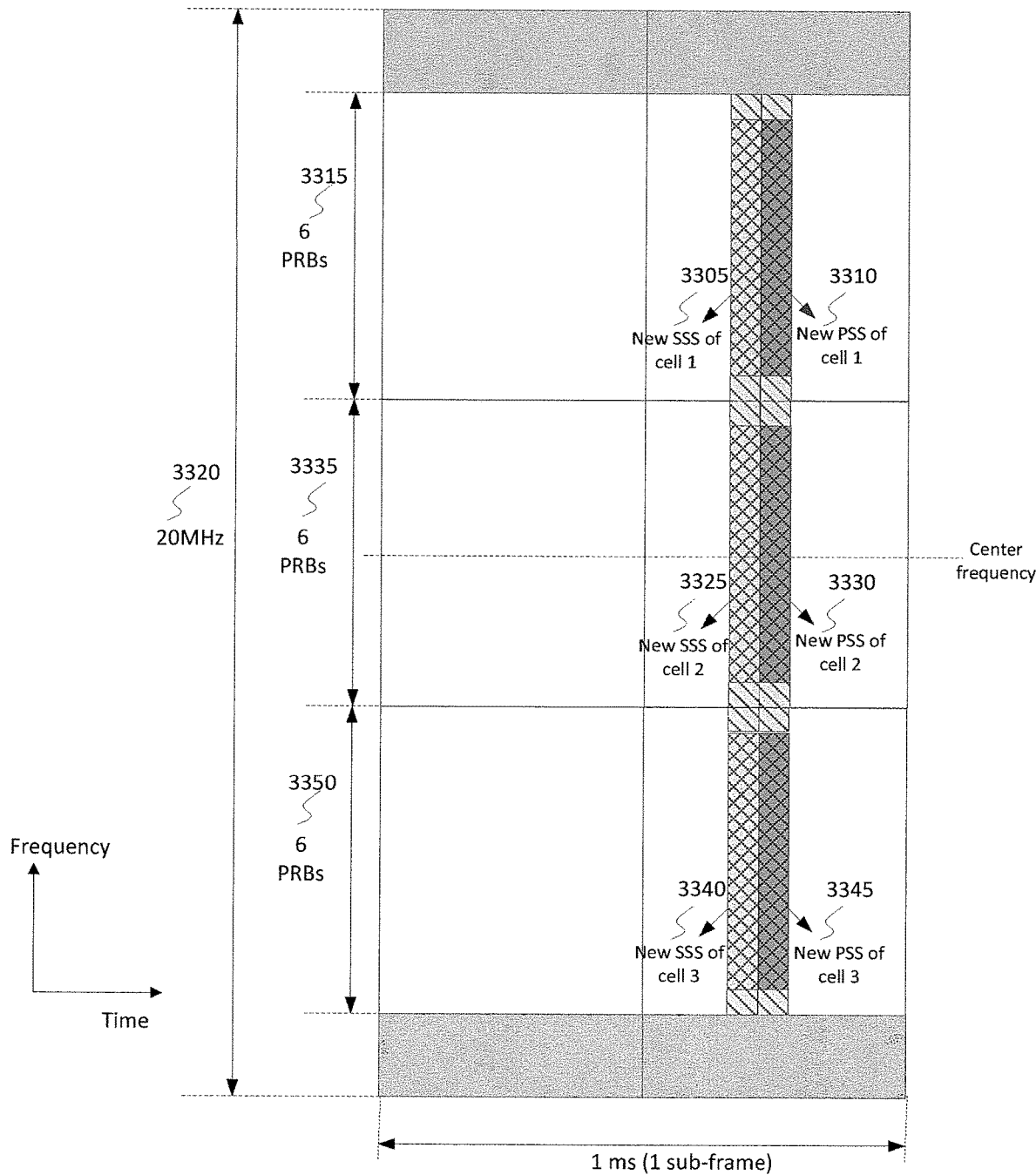
FIG. 33 illustrates a frequency-domain multiplexing of DRS assuming the first approach of Embodiment 8 according to this disclosure.

FIG. 33 illustrates a frequency-domain multiplexing of DRS assuming the first approach of Embodiment 8 according to this disclosure. The embodiment of the frequency-domain multiplexing of DRS shown in FIG. 33 is for illustration only. Other embodiments could be used without departing from the present disclosure.

In certain embodiments employing the first approach (first alternative) of Embodiment 8, the DRS of a first cell, that is the new $SSS_{cell1}$ 3305 and new $PSS_{cell1}$ 3310, is transmitted in the DRS resource of the first band of 6 PRBs 3315 of the system bandwidth 3320, the DRS of a second cell, that is the new $SSS_{cell2}$ 3325 and new $PSS_{cell2}$ 3330, is transmitted in the DRS resource of a second band of 6 PRBs 3335 of the system bandwidth 3320, and the DRS of a third cell, that is the new $SSS_{cell3}$ 3340 and new $PSS_{cell3}$ 3345, is transmitted in the DRS resource of a third band of 6 PRBs 3350 of the system bandwidth 3320. Although the DRS of the first alternative is shown, the signals that are transmitted as DRS can be of any alternatives applicable for the first approach, as described in Embodiment 8.

Figure 34:
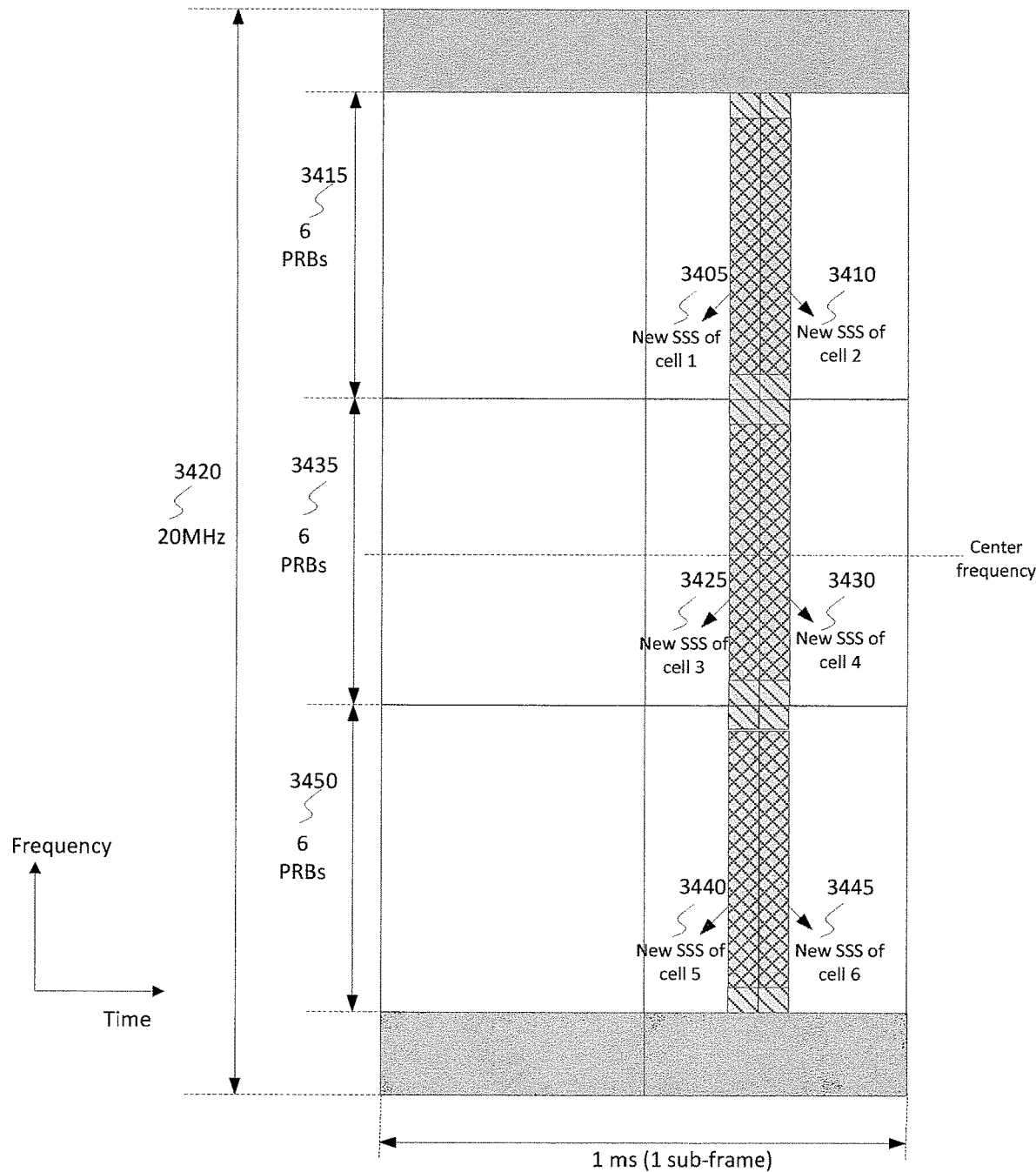
FIG. 34 illustrates a shows frequency-domain multiplexing of DRS assuming the second approach of Embodiment 8 according to this disclosure.

FIG. 34 illustrates a shows frequency-domain multiplexing of DRS assuming the second approach of Embodiment 8 according to this disclosure. The embodiment of the frequency-domain multiplexing of DRS shown in FIG. 34 is for illustration only. Other embodiments could be used without departing from the present disclosure.

In certain embodiments employing the second approach (third alternative) of Embodiment 8, the DRS of a first cell 3405 and a second cell 3410 are transmitted in the DRS resource of the first band 3415 of 6 PRBs of the system bandwidth 3420, the DRS of a third cell 3425 and a fourth cell 3430 are transmitted in the DRS resource of a second band of 6 PRBs 3435 of the system bandwidth 3420, and the DRS of a fifth cell 3440 and a sixth cell 3445 are transmitted in the DRS resource of a third band of 6 PRBs 3450 of the system bandwidth. Although DRS of the second alternative is shown, the signals that are transmitted as DRS can be of any alternatives applicable for the second approach as described in Embodiment 8.

Inter-cell coordination or Self-Organizing Network (SON) techniques can be deployed to facilitate selection of DRS resources among neighboring cells. To enable more cells' DRS to be multiplexed with tolerable inter-cell interference, time domain multiplexing can also be utilized. The possible time locations of the DRS can de either predefined or configured by the eNB 103. Time-domain multiplexing can be used without frequency-domain multiplexing. This is applicable such as for narrow system bandwidth. The use of both frequency and time-domain multiplexing is also possible.

Figure 35:
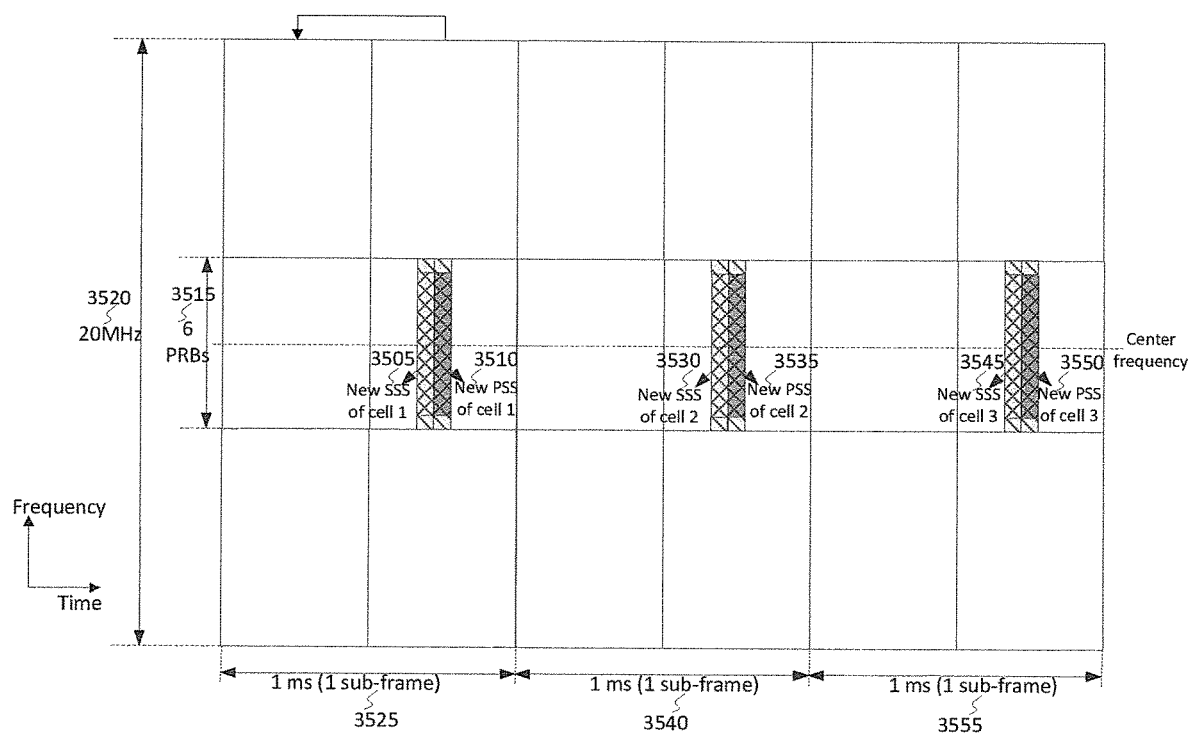
FIG. 35 illustrates a shows time-domain multiplexing of DRS, assuming the first approach of Embodiment 8 according to this disclosure.

FIG. 35 illustrates a shows time-domain multiplexing of DRS, assuming the first approach of Embodiment 8 according to this disclosure. The embodiment of the time-domain multiplexing of DRS shown in FIG. 35 is for illustration only. Other embodiments could be used without departing from the present disclosure.

The DRS of a first cell, that is the new $SSS_{cell1}$ 3505 and new $PSS_{cell1}$ 3510, is transmitted in the DRS resource of the center 6 PRBs 3515 of the system bandwidth 3520 in a first sub-frame 3525, the DRS of a second cell, that is the new $SSS_{cell2}$ 3530 and new $PSS_{cell2}$ 3535, is transmitted in the DRS resource of the center 6 PRBs 3515 of the system bandwidth 3520 in a second sub-frame 3540, and the DRS of a third cell, that is the new $SSS_{cell3}$ 3545 and new $PSS_{cell3}$ 3550, is transmitted in the DRS resource of the center 6 PRBs 3515 of the system bandwidth 3520 in a third sub-frame 3555. Although DRS of the first alternative of the first approach is shown in the example depicted in FIG. 35, the signals that are transmitted as DRS can be of any alternatives as described in Embodiment 8.

Two cells also can transmit their DRS in the same time-frequency location if the cells are geographically sufficiently far apart. The two cells also can transmit their DRS in the same time-frequency location if the number of cells in their DRS that are in the same time-frequency location is kept sufficiently small so that the resulting inter-cell interference can be kept below a tolerable level.

To facilitate fast cell searching process such as for the third alternatives of DRS design as described in Embodiment 8, a physical signal can be transmitted by one or multiple cells in the area using one or more of the DRS resources. The physical signal can be a signal such as the PSS that serves as a coarse time/frequency synchronization signal for the DRS of cells in an area.

Figure 36:
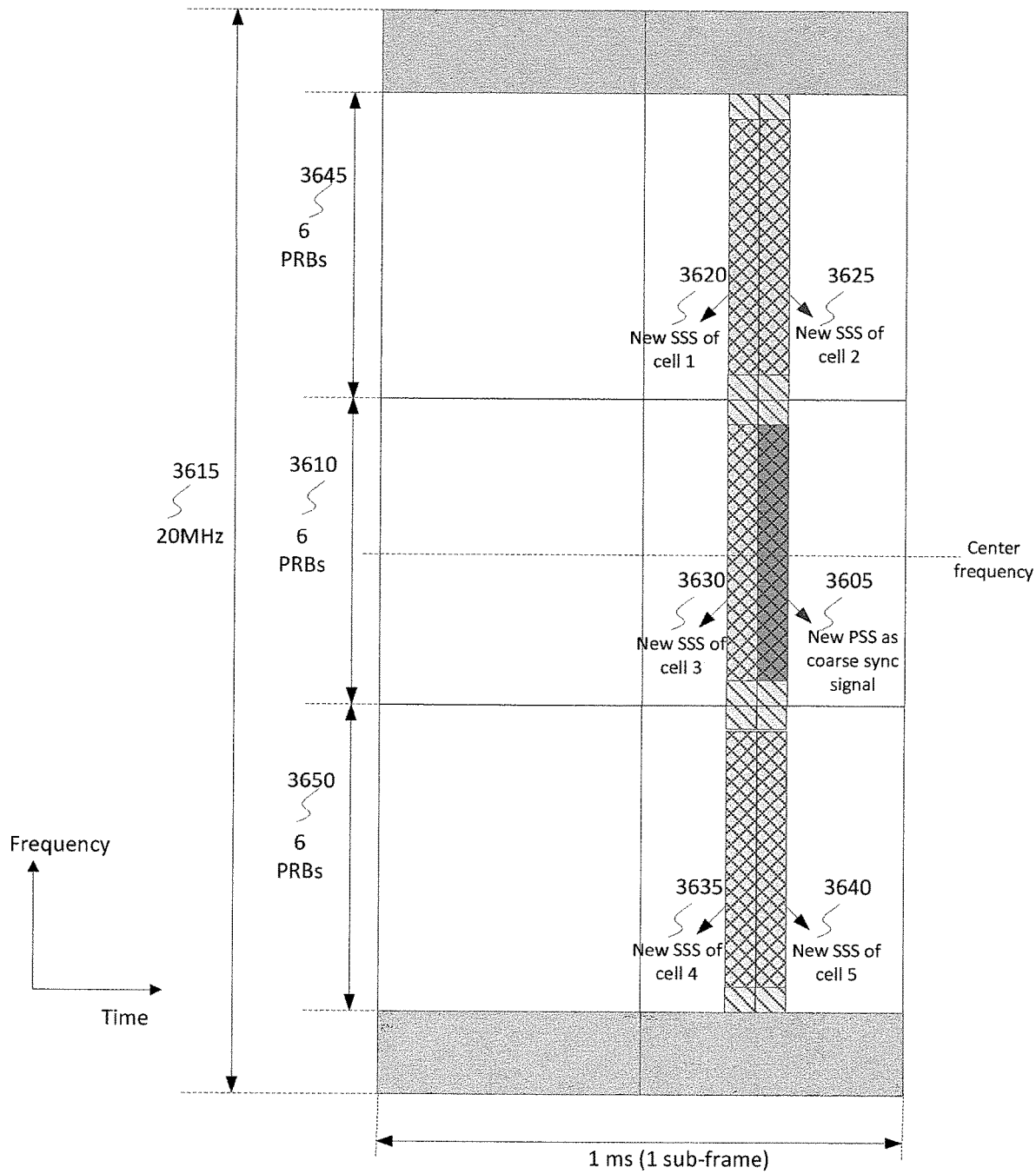
FIG. 36 illustrates a new PSS used as a coarse time/frequency synchronization signal for multiple DRS according to this disclosure.

FIG. 36 illustrates a new PSS used as a coarse time/ frequency synchronization signal for multiple DRS according to this disclosure. The embodiment of the new PSS shown in FIG. 36 is for illustration only. Other embodiments could be used without departing from the present disclosure.

A new PSS used as a coarse time/frequency synchronization signal is transmitted in a DRS resource 3605 in the center 6 PRBs 3610 of the system bandwidth 3615. The DRS of cells 1, 2, 3, 4, and 5 are transmitted as SSS in DRS resources 3620, 3625, 3630, 3635 and 3640, respectively. That is, the DRS for cell 1 is transmitted as a new SSS in a first DRS resource 3620 in a first band 3645 of 6 PRBs. The DRS for cell 2 is transmitted as a new SSS in a second DRS resource 3625 in the first band 3645 of 6 PRBs. The DRS for cell 3 is transmitted as a new SSS in a third DRS resource 3630 in the center 6 PRBs 3610. The DRS for cell 4 is transmitted as a new SSS in a fourth DRS resource 3635 in the third band 3650 of 6 PRBs. The DRS for cell 5 is transmitted as a new SSS in a fifth DRS resource 3640 in the third band 3650 of 6 PRBs.

In certain embodiments for a cell search procedure the UE 116 first searches for the new PSS to acquire a coarse time/frequency. Upon detection of the new PSS, the UE 116 uses the coarse time/frequency obtained to search for DRSs. In this example, the new SSSs can occur in all possible DRS locations.

In another method, a legacy PSS/SSS also can be used as the coarse synchronization signal, that is, the UE 116 is configured to first search for the legacy PSS/SSS to acquire a coarse time/frequency. Upon detection of the legacy PSS/SSS, the UE 116 uses the coarse time/frequency obtained to search for DRSs. In this example, the new SSSs can occur in all possible DRS locations.

Certain embodiments (referenced as "Embodiment 10") provide High Order Modulation support. As illustrated herein above, in order to support the introduction of 256 QAM for LTE, a new table for Modulation and TBS index table for PDSCH that include entries for 256QAM is to be defined, which results in a different MCS field interpretation in a downlink DCI for a UE when the support for the high order modulation is configured. It is assumed that there is a RRC configuration by an eNB that indicates the high order modulation operation is in place. However, even when a UE is configured with high order modulation operation, not all PDSCH assigned to the UE should assume the new Modulation and TBS index table and there is a need to define when a UE is and is not allowed to refer to the new Modulation and TBS index table for interpretation of the MCS field in a DCI.

In a first approach, assuming the UE 116 has been configured, such as by RRC, to assume high order modulation operation, the UE 116 refers to the new Modulation and TBS index table for interpretation of the MCS field in a DCI for a unicast downlink assignment if one of the following conditions is true:

a) The DCI format for downlink assignment is not DCI format 1A; or b) The DCI format for downlink assignment is DCI format 1A and DM-RS port(s) (such as port 7 or 8) is(are) used as the reference signals for demodulation.

Otherwise, the UE 116 refers to the legacy Modulation and TBS index table for interpretation of the MCS field in the DCI, including the case where a downlink assignment is scheduled using DCI format 1A and CRS port(s) is(are) used as the reference signals for demodulation.

Figure 37:
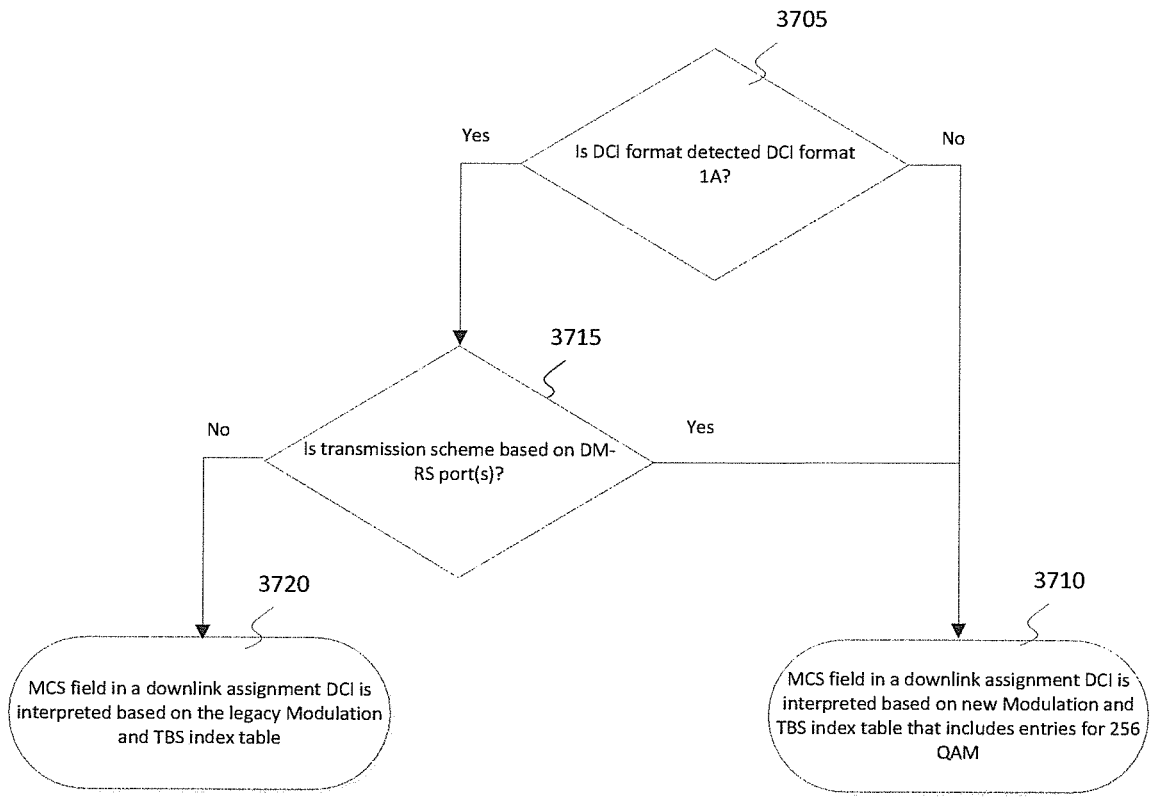
FIG. 37 illustrates a UE procedure to determine the Modulation and TBS index table based on the DCI format and the transmission scheme according to this disclosure.

FIG. 37 illustrates a UE procedure to determine the Modulation and TBS index table based on the DCI format and the transmission scheme according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a mobile station or a base station.

In block 3705, the DCI format type is first determined. If it is not DCI format 1A, the MCS field in a downlink assignment DCI is interpreted based on new Modulation and TBS index table that includes entries for 256 QAM in block 3710. If it is DCI format 1A, then the transmission scheme is determined to be based on DM-RS or not in block 3715. When it is based on DM-RS, the MCS field in a downlink assignment DCI is interpreted based on new Modulation and TBS index table that includes entries for 256 QAM in block 3710. Otherwise, when it is not based on DM-RS, the MCS field in a downlink assignment DCI is interpreted based on the legacy Modulation and TBS index table in block 3720. Other variation of the illustrated procedure is possible. In one example, UE 116 can first determine if a transmission scheme is based on DM-RS or not, followed by the DCI format type determination. In this case, if the transmission scheme is based on DM-RS, the MCS field in a downlink assignment DCI is interpreted based on new Modulation and TBS index table that includes entries for 256 QAM. Alternatively, if DCI format is not format 1A, the MCS field in a downlink assignment DCI is interpreted based on new Modulation and TBS index table that includes entries for 256 QAM; otherwise the MCS field in a downlink assignment DCI is interpreted based on the legacy Modulation and TBS index table. In another example, the condition on transmission scheme and DCI format is determined jointly by the UE 116.

An advantage of the first approach is that the more compact DCI format 1A is available for 256QAM PDSCH scheduling using DM-RS port(s) (ports 7-14). The relative small size of DCI format 1A compared to the other DCI formats, such as DCI format 2, allows more PDCCHs to be scheduled in the same sub-frame, which in turns allow more PDSCHs to be scheduled in the same sub-frame. As a result, peak and average data rate of a cell can be increased. At the same time, "fallback" operation using DCI format 1A with CRS ports can still be supported with the legacy table. For an example, during RRC modification period where an eNB may not be certain about the RRC configuration status of a UE, downlink communication with the UE can still be maintained using DCI format 1A with CRS ports.

In a second approach, assuming the UE 116 has been configured, such as by RRC, to assume high order modulation operation, the UE 116 refers to the new Modulation and TBS index table for interpretation of the MCS field in a DCI for a unicast downlink assignment if one of the following conditions is true:

a) The DCI format for downlink assignment is not DCI format 1A; or b) The DCI format for downlink assignment is DCI format 1A and the corresponding PDSCH is scheduled is a MBSFN sub-frame.

Otherwise, the UE 116 refers to the legacy Modulation and TBS index table for interpretation of the MCS field in the DCI, including the case where a downlink assignment is scheduled using DCI format 1A and the corresponding PDSCH is scheduled is a non-MBSFN sub-frame.

As also illustrated herein above, certain embodiments define conditions that determine when the UE is and is not allowed to use the new CQI table that includes entries for 256 QAM for a CQI reporting. A UE can be configured to report CSI based on the new CQI table by high layer signaling, such as by RRC. The higher layer signaling that enables the use of the new CQI table can be separate from the higher layer signaling that enables the use of the new Modulation and TBS index table or the new TBS table. This is because an eNB may want to determine whether it is suitable to configure a UE with 256QAM operation using UE's CSI report before scheduling the UE with 256QAM data. A CSI can be sent to an eNB by means of aperiodic CSI reporting on PUSCH and periodic CSI reporting on PUCCH.

In one method for aperiodic CSI reporting, aperiodic CSI request field in a DCI format (e.g. DCI formats 0, 4) can be used to indicate the CQI table that shall be assumed by the UE 116 for aperiodic CQI reporting. Specifically, if higher layer signaling indicates the use of the new CQI table, a first value of CSI request field indicates that an aperiodic CSI report based on a first CQI table is triggered and a second value of CSI request field indicates that an aperiodic CSI report based on a second CQI table is triggered. The first CQI table can be Table 7.2.3-1 in REF 3 and the second CQI table can be the new CQI table that includes entries for 256QAM. A 2-bit CSI request field can be defined to indicate up to 4 request values.

TABLE 12 illustrates an example interpretation of a 2-bit CSI request field. A CSI request field value of '00' indicates that no aperiodic CSI report is triggered; CSI request field value of '01' indicates that aperiodic CSI report based on a first CQI table (such as Table 7.2.3-1 in REF 3) is triggered; CSI request field value of '10' indicates that aperiodic CSI report based on a second CQI table (such as the new CQI table that includes entries for 256QAM) is triggered; and CSI request field value of '11' can be reserved.

TABLE 12

CSI Request field for PDCCH/EPDCCH with uplink DCI format in UE specific search space

| Value of CSI request field | Description |
|---|---|
| '00' | No aperiodic CSI report is triggered |
| '01' | Aperiodic CSI report based on a first CQI table is triggered |
| '10' | Aperiodic CSI report based on a second CQI table is triggered |
| '11' | reserved |

When UE 116 is not configured with Carrier Aggregation or Transmission Mode 10 with multiple CSI processes, the CSI request field in a DCI occupies one information bit. However, the UE 116 is configured to assume the CSI request field in a DCI is 2 bits when higher layer signaling indicates the use of the new CQI table.

Figure 38:
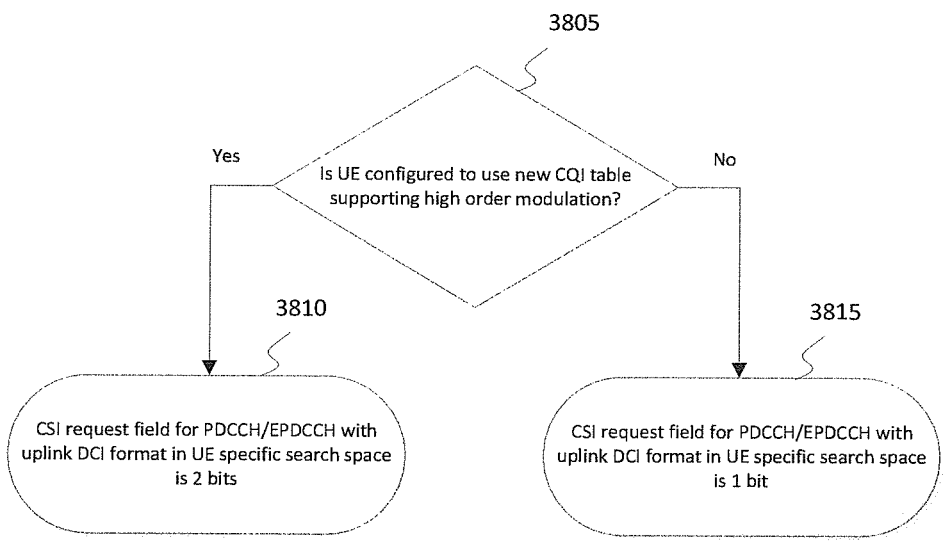
FIG. 38 illustrates an example UE procedure to determine the number of bits for CSI request field in Uplink DCI format according to this disclosure.

FIG. 38 illustrates an example UE procedure to determine the number of bits for CSI request field in Uplink DCI format according to this disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The processes depicted in the examples depicted are implemented by a transmitter chain in, for example, a mobile station or a base station.

UE-Specific Search Space.

When the UE is configured to use the new CQI table to support CSI feedback for 256QAM in block 3805, the CS request field for PDCCH/EPDCCH with uplink DCI format in UE-specific search space is 2 bits in block 3810. When the UE is configured to use the new CQI table to support CSI feedback for 256QAM in block 3805, the CS request field for PDCCH/EPDCCH with uplink DCI format in UE-specific search space is 1 bit in block 3815.

When a UE is configured with Carrier Aggregation or Transmission Mode 10 with multiple CSI processes, the CQI table indication can be jointly coded with the existing information configuration. TABLE 13 and TABLE 14 illustrate examples of joint coding of the CQI table indication and the serving cell set indication, and the CSI process set indication, respectively.

TABLE 13

CSI Request field for PDCCH/EPDCCH with uplink DCI format in UE specific search space (Carrier Aggregation)

| Value of CSI request field | Description |
| --- | --- |
| '00' | No aperiodic CSI report is triggered |
| '01' | Aperiodic CSI report is triggered for serving cell c and for an indicated CQI table |
| '10' | Aperiodic CSI report is triggered for a $1^{st}$ set of serving cells and for an indicated CQI table configured by higher layers |
| '11' | Aperiodic CSI report is triggered for a $2^{nd}$ set of serving cells and for an indicated CQI table configured by higher layers |

TABLE 14

CSI Request field for PDCCH/EPDCCH with uplink DCI format in UE specific search space (Transmission Mode 10 with multiple CSI processes (and Carrier Aggregation))

| Value of CSI request field | Description |
| --- | --- |
| '00' | No aperiodic CSI report is triggered |
| '01' | Aperiodic CSI report is triggered for a set of CSI process(es) and for an indicated CQI table configured by higher layers for serving cell c |
| '10' | Aperiodic CSI report is triggered for a $1^{st}$ set of CSI process(es) and for an indicated CQI table configured by higher layers |
| '11' | Aperiodic CSI report is triggered for a $2^{nd}$ set of CSI process(es) and for an indicated CQI table configured by higher layers |

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for reporting a measurement report in a communication system, the method comprising:
   receiving channel state information reference signal (CSI-RS) configuration information for measurement on a CSI-RS, the CSI-RS configuration information including a CSI-RS resource index and information on a synchronization signal;
   measuring the CSI-RS based on the CSI-RS configuration information but not monitoring for the CSI-RS at the CSI-RS resource index when the synchronization signal is not detected; and
   transmitting the measurement report based on the measurement on the CSI-RS,
   wherein a timing for the CSI-RS is based on a cell timing for a cell based on the information on the synchronization signal,
   wherein the CSI-RS configuration information further includes information on a periodicity and an offset for the CSI-RS, and
   wherein the timing for the CSI-RS is based on a cell timing of a serving cell when the CSI-RS configuration information does not include the information on the synchronization signal.

2. The method of claim 1, wherein the information indicating a quasi-co-location relation between the CSI-RS and the synchronization signal comprises a higher layer parameter.

3. The method of claim 1, wherein the CSI-RS configuration information includes information indicating a quasi-co-location relation between the CSI-RS and the synchronization signal.

4. The method of claim 1, wherein the CSI-RS configuration information further includes information on a periodicity and an offset for the CSI-RS.

5. The method of claim 1, further comprising: not measuring the CSI-RS when the synchronization signal is not received.

6. A communication system reporting a measurement report, the communication system comprising:
   a receiver configured to receive channel state information reference signal (CSI-RS) configuration information for measurement on a CSI-RS, the CSI-RS configuration information including a CSI-RS resource index and information on a synchronization signal;
   a controller configured to measure the CSI-RS based on the CSI-RS configuration information but to not monitor for the CSI-RS at the CSI-RS resource index when the synchronization signal is not detected; and
   a transmitter configured to transmit the measurement report based on the measurement on the CSI-RS,
   wherein a timing for the CSI-RS is based on a cell timing for a cell based on the information on the synchronization signal,
   wherein the CSI-RS configuration information further includes information on a periodicity and an offset for the CSI-RS, and
   wherein the timing for the CSI-RS is based on a cell timing of a serving cell when the CSI-RS configuration information does not include the information on the synchronization signal.

7. The communication system of claim 6, wherein the information indicating a quasi-co-location relation between the CSI-RS and the synchronization signal comprises a higher layer parameter.

8. The communication system of claim 6, wherein the CSI-RS configuration information includes information indicating a quasi-co-location relation between the CSI-RS and the synchronization signal.

9. The communication system of claim 6, wherein the CSI-RS configuration information further includes information on a periodicity and an offset for the CSI-RS.

10. The communication system of claim 6, further comprising: not measuring the CSI-RS when the synchronization signal is not received.

11. A communication system receiving a measurement report, the communication system comprising:
   a transmitter configured to transmit channel state information reference signal (CSI-RS) configuration information for measurement on a CSI-RS, the CSI-RS configuration information including a CSI-RS resource index and information on a synchronization signal;

a receiver configured to receive a measurement report for measurement of the CSI-RS based on the CSI-RS configuration information but not monitoring for the CSI-RS at the CSI-RS resource index when the synchronization signal is not detected, wherein a timing for the CSI-RS is based on a cell timing for a cell based on the information on the synchronization signal, wherein the CSI-RS configuration information further includes information on a periodicity and an offset for the CSI-RS, and wherein the timing for the CSI-RS is based on a cell timing of a serving cell when the CSI-RS configuration information does not include the information on the synchronization signal.

12. The communication system of claim 11, wherein the information indicating a quasi-co-location relation between the CSI-RS and the synchronization signal comprises a higher layer parameter.

13. The communication system of claim 11, wherein the CSI-RS configuration information includes information indicating a quasi-co-location relation between the CSI-RS and the synchronization signal.

14. The communication system of claim 11, wherein the CSI-RS configuration information further includes information on a periodicity and an offset for the CSI-RS.

* * * * *